United States Patent [19]

Bellamy et al.

[11] 4,253,146
[45] Feb. 24, 1981

[54] MODULE FOR COUPLING COMPUTER-PROCESSORS

[75] Inventors: Clifford J. Bellamy, Malvern, Australia; John O. Besemer, Cerritos, Calif.

[73] Assignee: Burroughs Corporation, Detroit, Mich.

[21] Appl. No.: 971,677

[22] Filed: Dec. 21, 1978

[51] Int. Cl.³ .............................................. G06F 15/16
[52] U.S. Cl. .................................................... 364/200
[58] Field of Search .................... 364/200 MS File

[56] References Cited

U.S. PATENT DOCUMENTS

| 3,566,363 | 2/1971 | Driscoll, Jr. | 364/200 |
| 3,568,160 | 3/1971 | Talarczyk | 364/200 |

Primary Examiner—Raulfe B. Zache
Attorney, Agent, or Firm—Alfred W. Kozak; Nathan Cass; Kevin R. Peterson

[57] ABSTRACT

A Global Memory Module (GMM) and a system hierarchy of processors is described which provides access to a plurality of addressable memory storage units. A multiple number of processors or computer systems are connected to one or more Global Memory Modules whereby memory resources may be shared by multiple processor systems and where control and communications are provided between the processors through the Global Memory Modules. The Global Memory Module may be organized into a hierarchy of Global Memory Module systems whereby processors attached to "lower level" GMM systems may access memory in "higher level" GMM systems. Means are provided whereby a processor in one GMM system may send commands and messages to a processor in another GMM system. Means are provided by which one processor can address another specific processor in the system network or whereby one processor can address an "available" processor in a system designated under a system name, and the network will choose the processor which is "idle" or, if there is no idle processor available, will then choose a processor which is "not engaged", that is to say, a processor which when it finishes its currently scheduled activities, will then be available for processing of a received command and message.

The Global Memory Module has input ports for connection to a local individual processor or to another Global Memory Module. The GMM has (1) a Global Memory Control Section for handling requests for access to memory and (2) a Global System Control Section for control of messages between a processor and its GMM.

14 Claims, 47 Drawing Figures

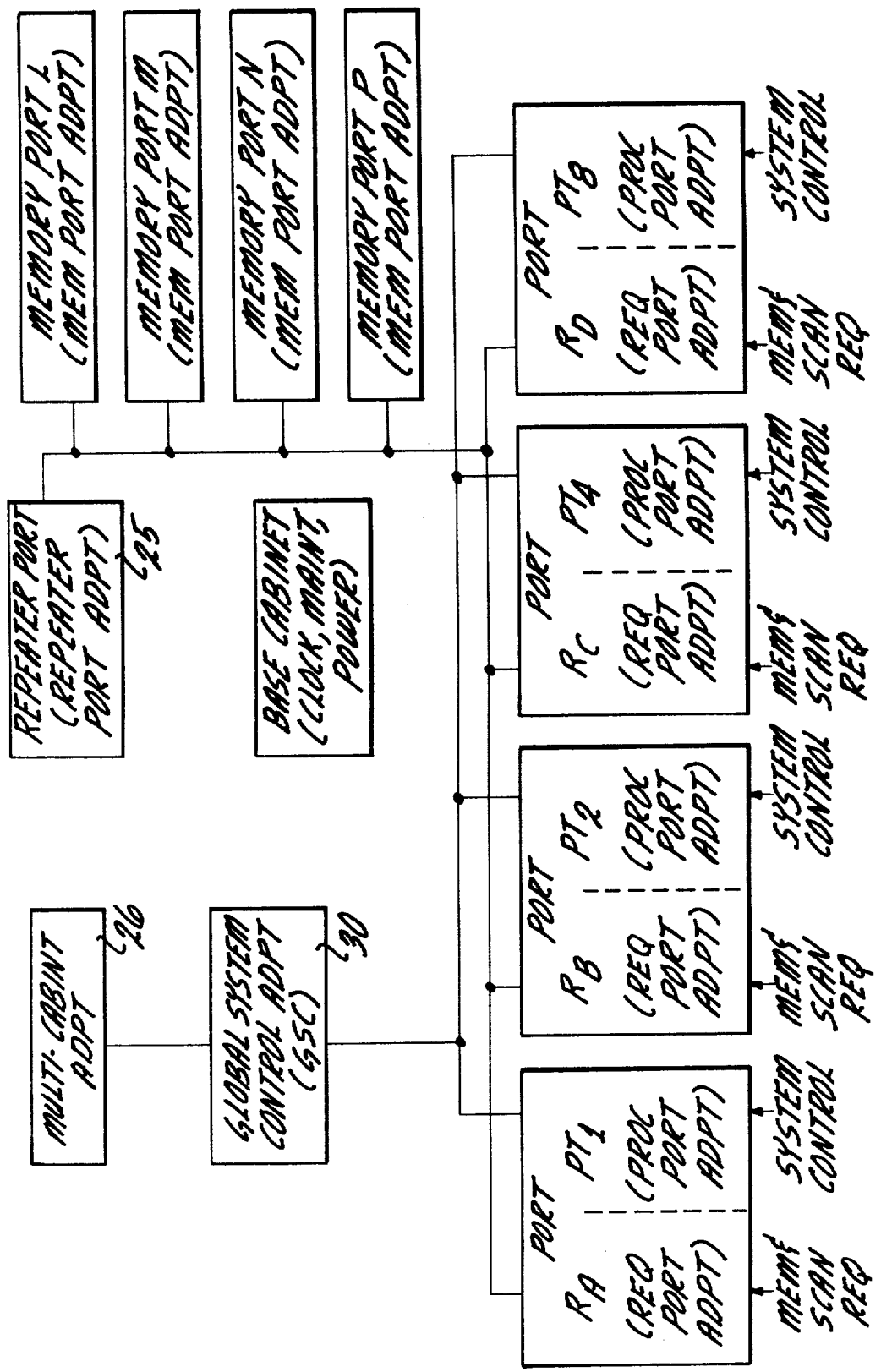
FIG. 2B  6MM BASE AND ADAPTERS

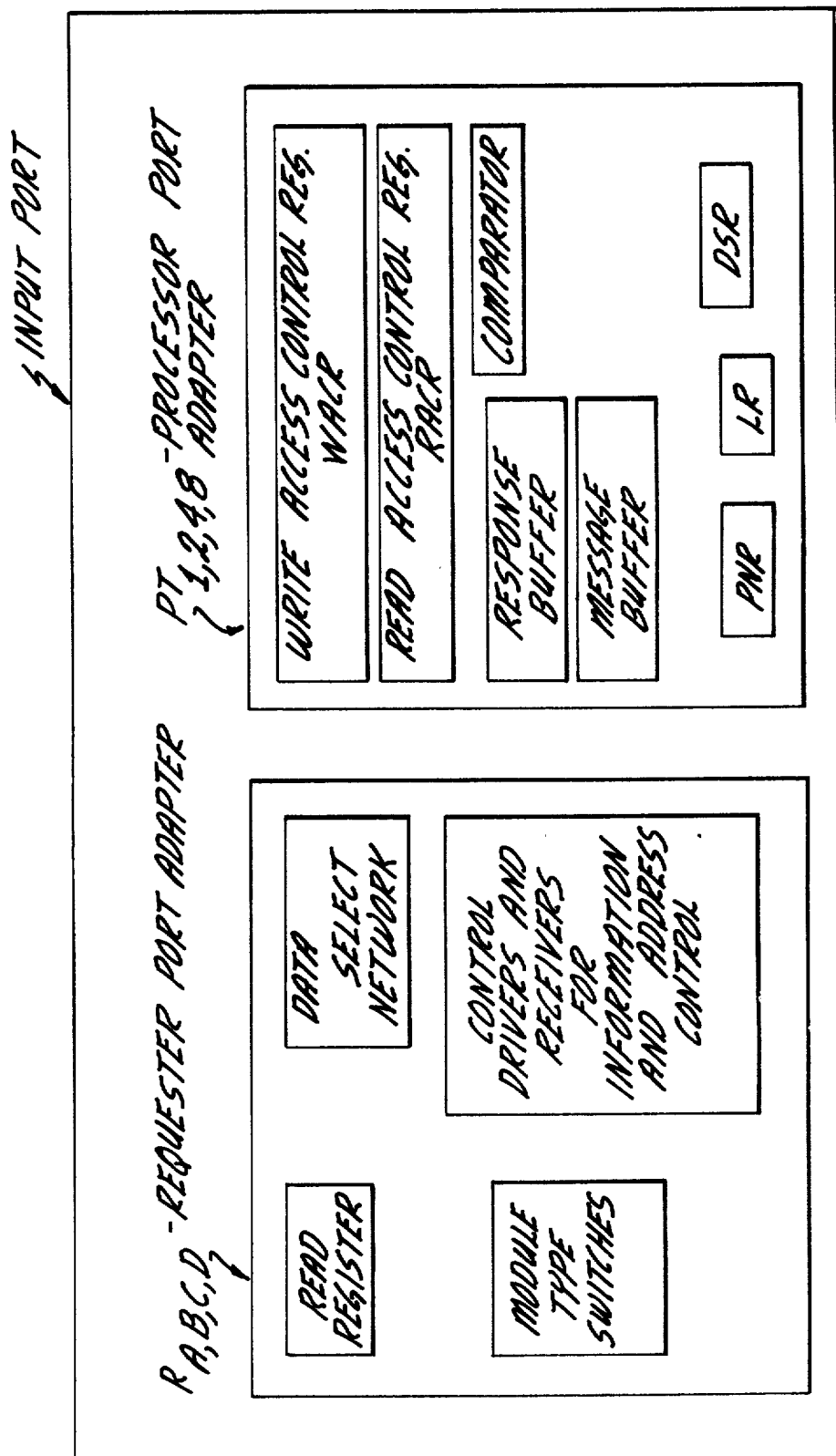

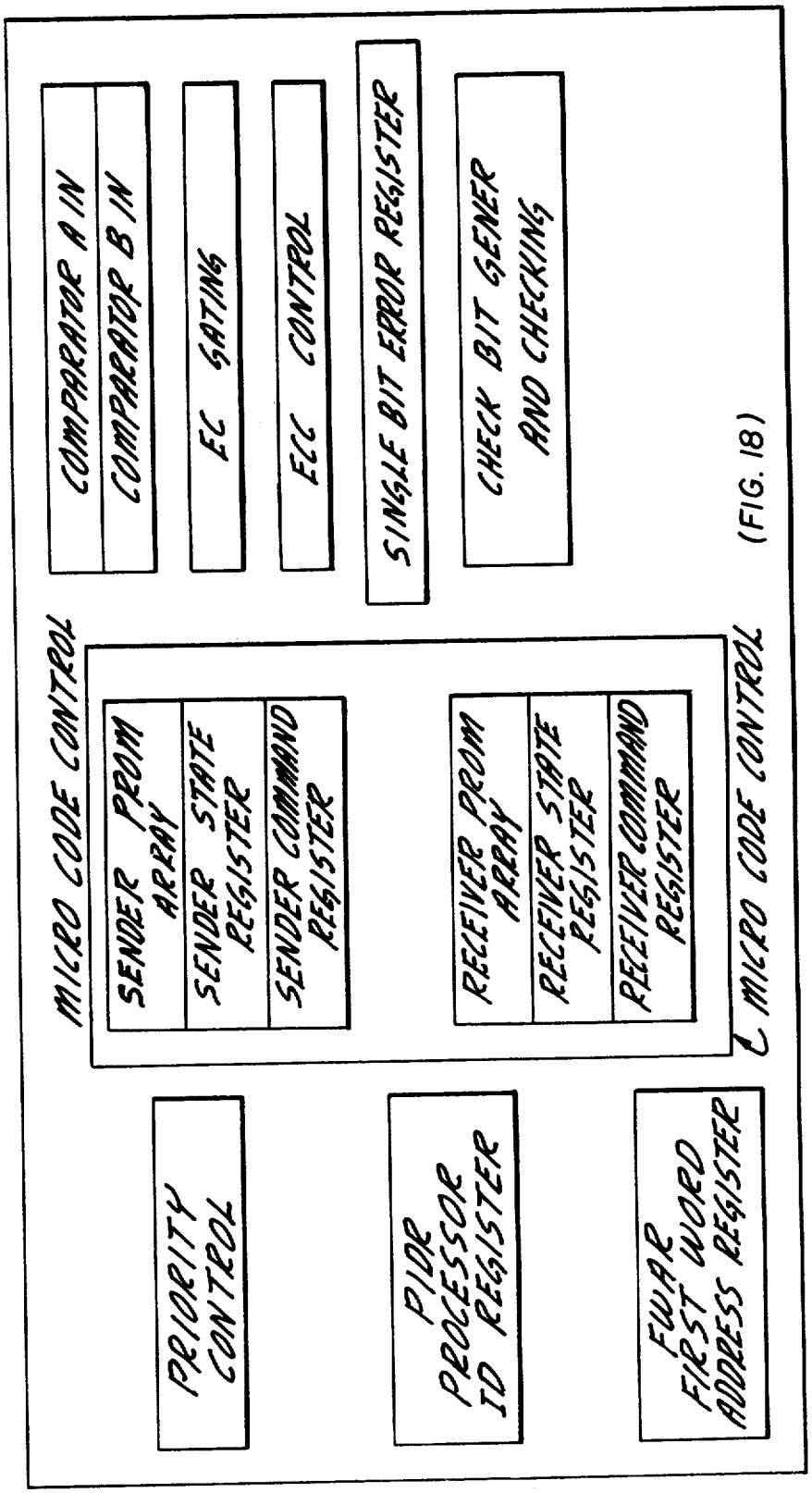
FIG. 4 GSC ADAPTER

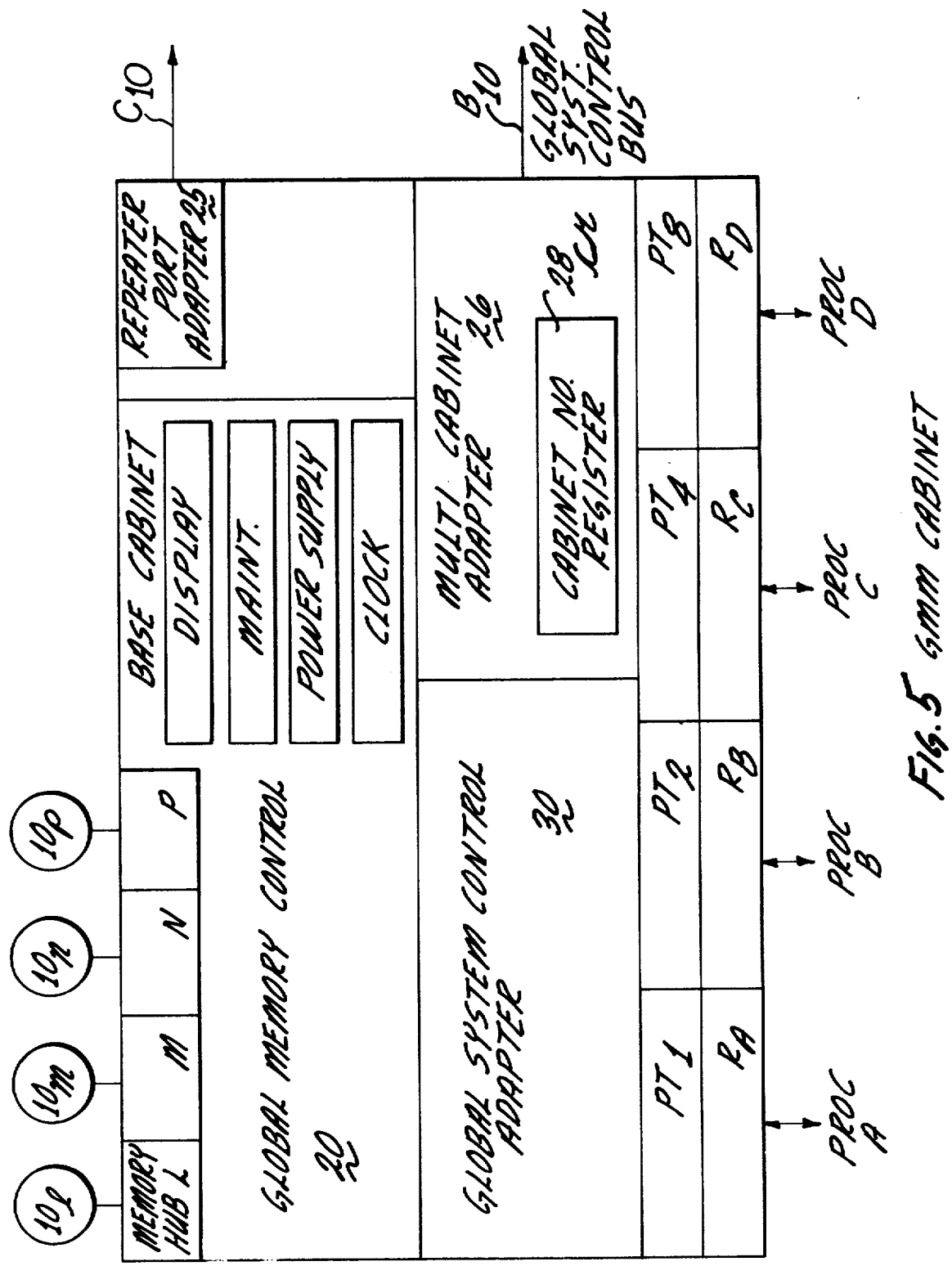
Fig. 5 6MM CABINET

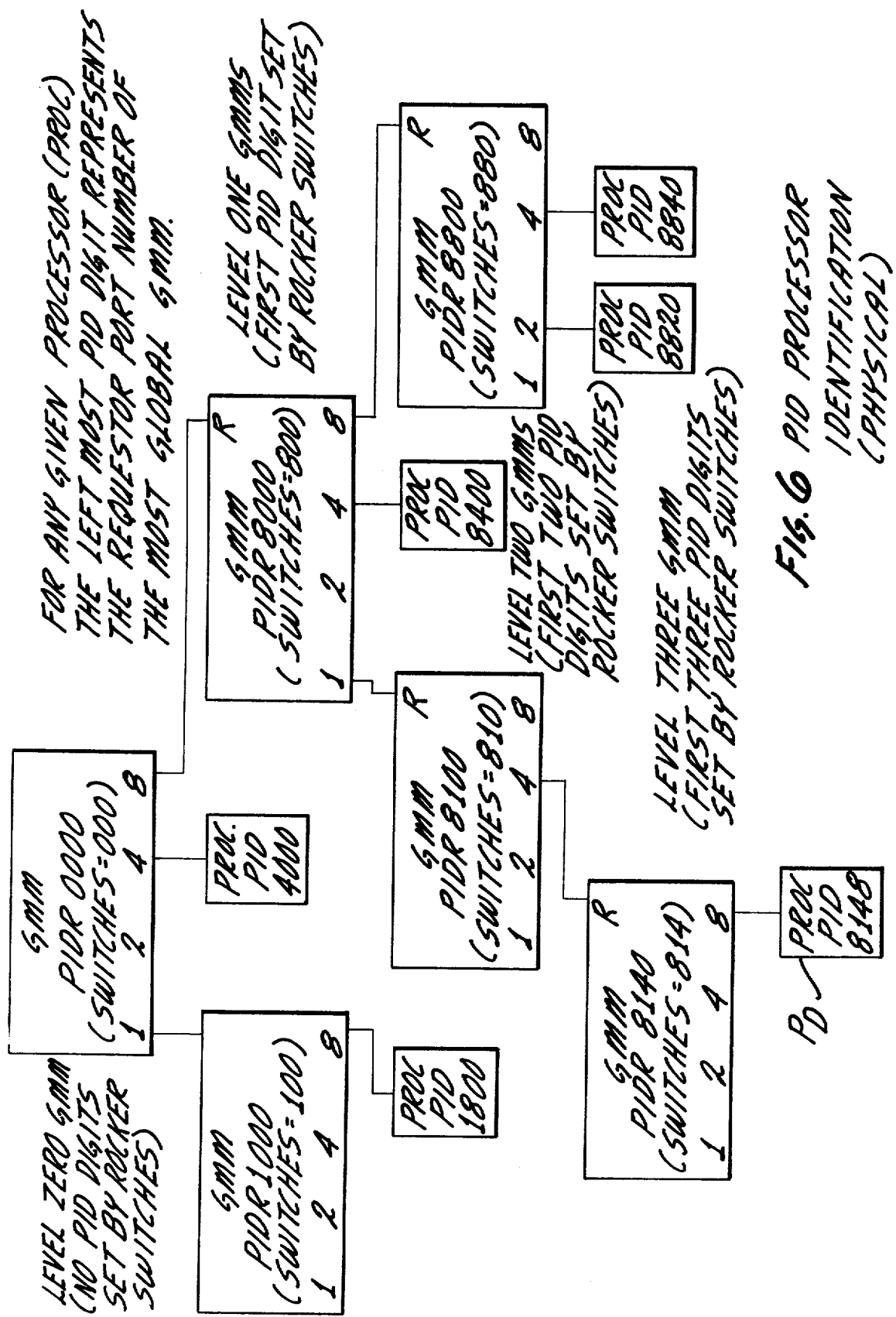
Fig. 6 PID PROCESSOR IDENTIFICATION (PHYSICAL)

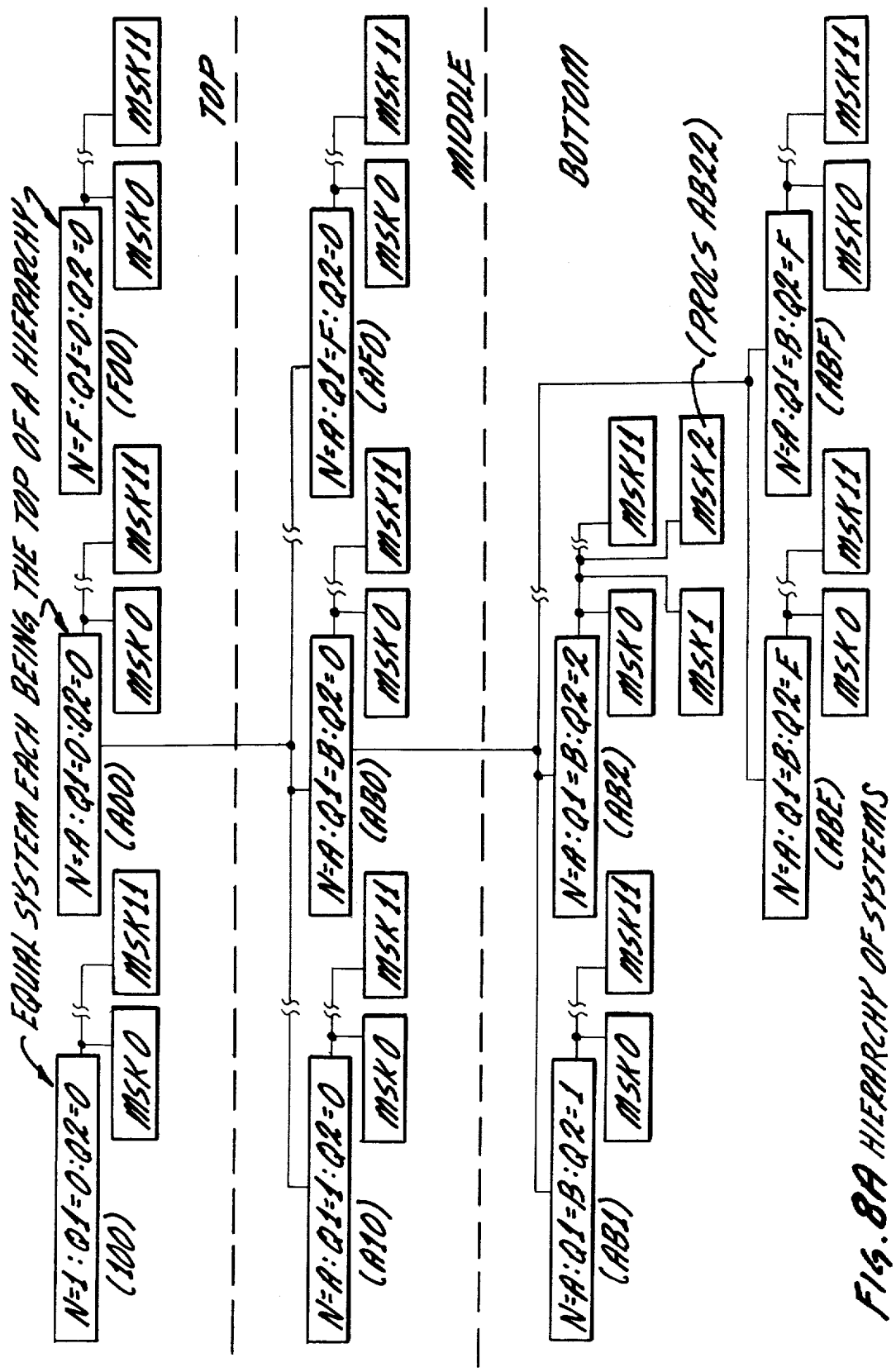
FIG. 8A HIERARCHY OF SYSTEMS

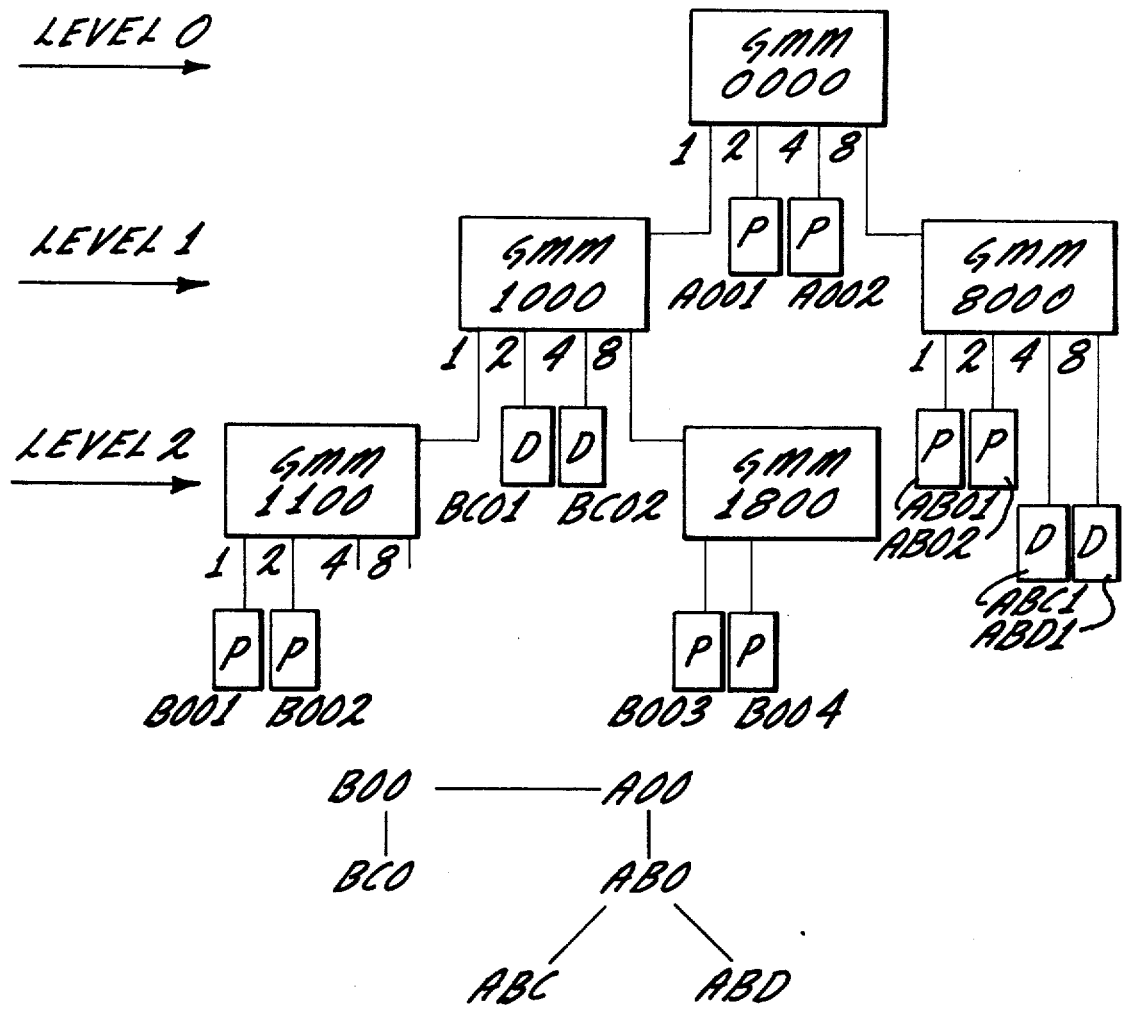
FIG. 8B NAMING OF SYSTEMS AND PROCESSORS IN AN INSTALLATION

FIG.8C-1
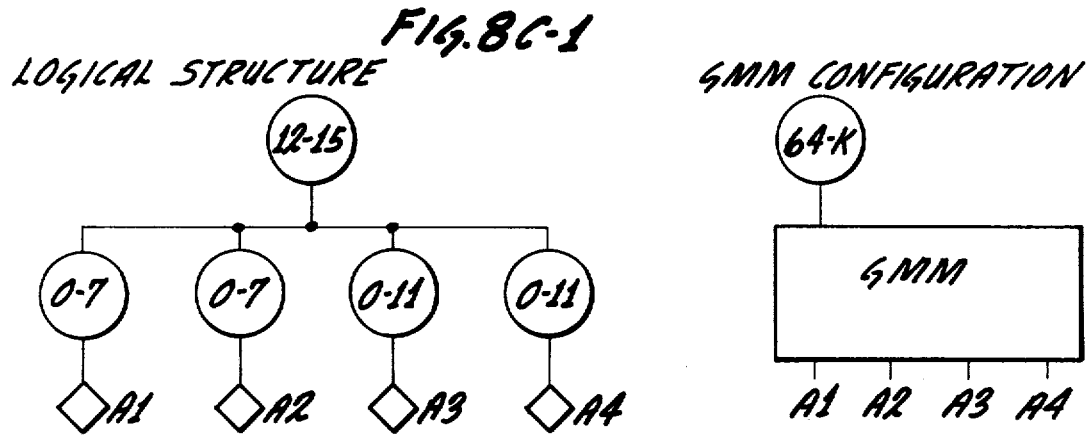
CASE 1. FOUR PROCESSORS WITH LOCAL MEMORY ALL ADDRESSING MEMORY STORAGE UNIT MODULES 12-15
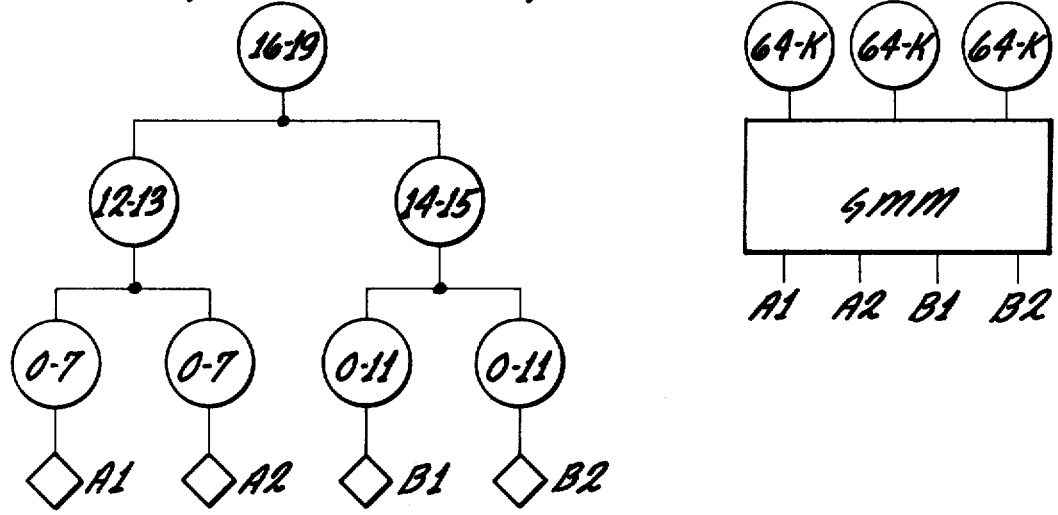
CASE 2. FOUR PROCESSORS WITH LOCAL MEMORY COUPLED AS 2 PAIRS
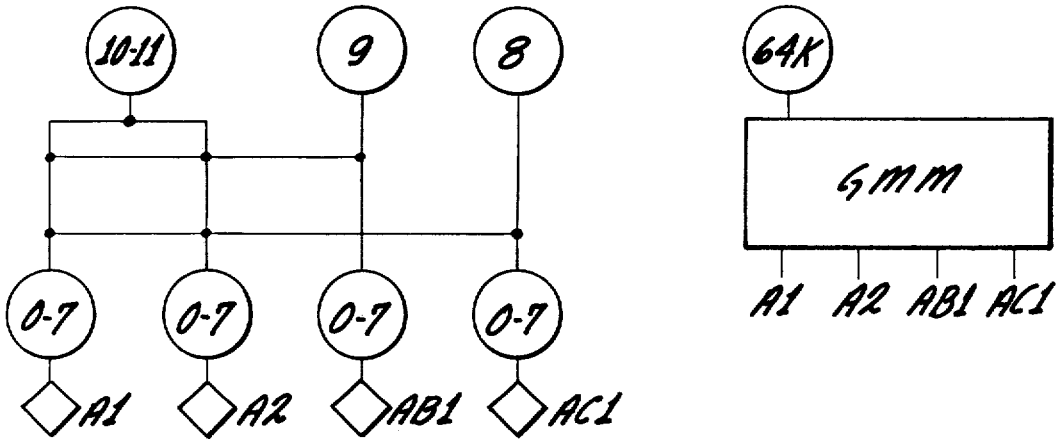
CASE 3. A1 AND A2 TIGHTLY COUPLED FORM SYSTEM A TO WHICH AB1 AND AC1 ARE LOOSELY COUPLED BY MEMORY MODULES 8 AND 9.
LOGICAL MEMORY STRUCTURES USING ONE GMM

FIG. 8C-2

ACCESS CONTROL REGISTER
MEMORY STORAGE UNITS NUMBER
0 → 14 15

| | | | | | | | | | |
|---|---|---|---|---|---|---|---|---|---|
| A1 | WACR | 11 | 11 | 11 | 11 | 00 | 00 | 11 | 11 |
| | RACR | 11 | 11 | 11 | 11 | 00 | 00 | 11 | 11 |
| A2 | WACR | 11 | 11 | 11 | 11 | 00 | 00 | 11 | 11 |
| | RACR | 11 | 11 | 11 | 11 | 00 | 00 | 11 | 11 |
| A3 | WACR | 11 | 11 | 11 | 11 | 11 | 11 | 11 | 11 |
| | RACR | 11 | 11 | 11 | 11 | 11 | 11 | 11 | 11 |
| A4 | WACR | 11 | 11 | 11 | 11 | 11 | 11 | 11 | 11 |
| | RACR | 11 | 11 | 11 | 11 | 11 | 11 | 11 | 11 |

CASE.1

MEMORY STORAGE UNITS NUMBER
0 → 18 19

| | | | | | | | | | | | |
|---|---|---|---|---|---|---|---|---|---|---|---|
| A1 | WACR | 11 | 11 | 11 | 11 | 00 | 00 | 11 | 00 | 00 | 00 |
| | RACR | 11 | 11 | 11 | 11 | 00 | 00 | 11 | 00 | 11 | 11 |
| A2 | WACR | 11 | 11 | 11 | 11 | 00 | 00 | 11 | 00 | 00 | 00 |
| | RACR | 11 | 11 | 11 | 11 | 00 | 00 | 11 | 00 | 11 | 11 |
| B1 | WACR | 11 | 11 | 11 | 11 | 11 | 11 | 00 | 11 | 00 | 00 |
| | RACR | 11 | 11 | 11 | 11 | 11 | 11 | 00 | 11 | 11 | 11 |
| B2 | WACR | 11 | 11 | 11 | 11 | 11 | 11 | 00 | 11 | 00 | 00 |
| | RACR | 11 | 11 | 11 | 11 | 11 | 11 | 00 | 11 | 11 | 11 |

A1, A2 COUPLED TO B1, B2 BY READ ONLY
MEMORY STORAGE UNIT MODULES 16-19
CASE.2

0 → 10 11

| | | | | | | | |
|---|---|---|---|---|---|---|---|
| A1 | WACR | 11 | 11 | 11 | 11 | 11 | 11 |
| | RACR | 11 | 11 | 11 | 11 | 11 | 11 |
| A2 | WACR | 11 | 11 | 11 | 11 | 11 | 11 |
| | RACR | 11 | 11 | 11 | 11 | 11 | 11 |
| AB1 | WACR | 11 | 11 | 11 | 11 | 01 | 00 |
| | RACR | 11 | 11 | 11 | 11 | 01 | 00 |
| AC1 | WACR | 11 | 11 | 11 | 11 | 10 | 00 |
| | RACR | 11 | 11 | 11 | 11 | 10 | 00 |

CASE.3

ACR SETTINGS
(WACR = RACR IN THIS CASE)

MEMORY STORAGE UNIT NO. →

| PROCESSOR ↓ | 0 → | | | | | | | | 8 | | 18,19 |
|---|---|---|---|---|---|---|---|---|---|---|---|
| B001 | 11 | 11 | 11 | 11 | 11 | 11 | 11 | 11 | 01 | 00 | |
| B002 | 11 | 11 | 11 | 11 | 11 | 11 | 11 | 11 | 01 | 00 | |
| B003 | 11 | 11 | 11 | 11 | 11 | 11 | 11 | 11 | 01 | 00 | |
| B004 | 11 | 11 | 11 | 11 | 11 | 11 | 11 | 11 | 01 | 00 | |
| BC01 | 11 | 00 | 00 | 00 | 00 | 00 | 10 | 00 | 00 | 00 | |
| BC02 | 11 | 00 | 00 | 00 | 00 | 00 | 10 | 00 | 00 | 00 | |

MEMORY STORAGE UNIT NO →

| PROCESSOR ↓ | 0 → | | | | | | | | | | 18,19 |
|---|---|---|---|---|---|---|---|---|---|---|---|
| A001 | 11 | 11 | 11 | 11 | 00 | 00 | 00 | 00 | 11 | 11 | |
| A002 | 11 | 11 | 11 | 11 | 00 | 00 | 00 | 00 | 11 | 11 | |
| AB01 | 11 | 11 | 11 | 11 | 11 | 11 | 00 | 00 | 10 | 00 | |
| AB02 | 11 | 11 | 11 | 11 | 11 | 11 | 00 | 00 | 10 | 00 | |
| ABC1 | 11 | 00 | 00 | 00 | 01 | 00 | 00 | 00 | 00 | 00 | |
| ABC2 | 11 | 00 | 00 | 00 | 01 | 00 | 00 | 00 | 00 | 00 | |

LOGICAL STRUCTURE AND ACR
CORRESPONDING TO FIG. 8B

Fig. 8D-2

Fig. 9 PROCESSOR NAME (PNR)

ERROR CORRECTION CODE — PID OF RECEIVER

| 59 | 55 | P 51 | 47 | 43 | 39 | 35 | 31 | 27 | 23 | 19 | 15 | 11 | 7 | 3 |
|----|----|----|----|----|----|----|----|----|----|----|----|----|---|---|
| 58 | 54 | 50 | 46 | 42 | 38 | 34 | 30 | 26 | 22 | 18 | 14 | 10 | 6 | 2 |
| 57 | 53 | 49 | 45 | V₁ 41 | 37 | 33 | 29 | 25 | 21 | 17 | 13 | 9 | 5 | 1 |
| 56 | 52 | 48 | 44 | V₂ 40 | 36 | 32 | 28 | 24 | 20 | 16 | 12 | 8 | 4 | 0 |

FOR ALL COMMANDS        COMMANDS        OP CODE
BIT 51 - PARITY                                 47:6
  50:3 - TAG = 000      READ-SBER       001110
  47:8 - OP CODE AND    READ FWAR       001010    V₁ AND V₂
         VARIENTS       ARE YOU THERE   001011    ARE NOT
                        WHO ARE YOU     001100    USED

*FIG. 10B*

ERROR CORRECTION CODE

| 59 | 55 | P 51 | 47 | 43 | 39 | 35 | 31 | 27 | 23 | 19 | 15 | 11 | 7 | 3 |
|----|----|----|----|----|----|----|----|----|----|----|----|----|---|---|
| 58 | 54 | T 50 | 46 | 42 | 38 | 34 | 30 | 26 | 22 | 18 | 14 | 10 | 6 | 2 |
| 57 | 53 | A 49 | 45 | V₁ 41 | 37 | 33 | 29 | 25 | 21 | 17 | 13 | 9 | 5 | 1 |
| 56 | 52 | G 48 | 44 | V₂ 40 | 36 | 32 | 28 | 24 | 20 | 16 | 12 | 8 | 4 | 0 |

FOR ALL COMMANDS       COMMAND          OP CODES
BIT 51 - PARITY        WHATS MY NAME    010001
  50:3 - TAG = 000     WHATS MY NUMBER  010010    V₁ AND V₂
  47:8 OP CODE         SET MY DSR       010101    ARE NOT
       AND             RESET MY LR      010011    USED
       VARIENTS        RESET MY DSR     010110

| ERROR CORRECTION CODE | | | | | | | | | | | RECEIVER PARTIAL NAME | | | |
|---|---|---|---|---|---|---|---|---|---|---|---|---|---|---|
| | | | | | | | | | | | Q | | MASK | |
| 59 | 55 | P 51 | 47 | 43 | 39 | 35 | 31 | 27 | 23 | 19 | 15 | 11 | 7 | 3 |
| 58 | 54 | T 50 | 46 | 42 | 38 | 34 | 30 | 26 | 22 | 18 | 14 | 10 | 6 | 2 |
| 57 | 53 | A 49 | 45 | V₁ 41 | 37 | 33 | 29 | 25 | 21 | 17 | 13 | 9 | 5 | 1 |
| 56 | 52 | G 48 | 44 | V₂ 40 | 36 | 32 | 28 | 24 | 20 | 16 | 12 | 8 | 4 | 0 |

FOR ALL COMMANDS
BIT 51 - PARITY
50:3 - TAG = 000
47:8 - OP CODE AND VARIENTS

| COMMAND | |
|---|---|
| HEY U | 000001 |
| HEY ALL | 000010 |
| ARE YOU THERE | 000011 |
| WHERE ARE YOU | 000100 |
| HALT | 111000 |
| CLEAR | 111001 |
| LOAD | 111010 |
| START | 111100 |
| ZAP | 111101 |
| SUPERHALTED | 110011 |
| NOT RUNNING | 110010 |

$V_1$ AND $V_2$
0 0 - WITHIN
0 1 - UP
1 0 - ACROSS
1 1 - DOWN

FIG. 10E

| ERROR CORRECTION CODE | | | MEMORY STORAGE UNIT LOGICAL MODULE NO. | | | | | | | | RECEIVER PARTIAL NAME | | | |
|---|---|---|---|---|---|---|---|---|---|---|---|---|---|---|
| | | | | | | | | | | (L) | Q | | MASK | |
| 59 | 55 | P 51 | 47 | 43 | 39 | 35 | 31 | 27 | 23 | 19 | 15 | 11 | 7 | 3 |
| 58 | 54 | T 50 | 46 | 42 | 38 | 34 | 30 | 26 | 22 | 18 | 14 | 10 | 6 | 2 |
| 57 | 53 | A 49 | 45 | V₁ 41 | 37 | 33 | 29 | 25 | 21 | 17 | 13 | 9 | 5 | 1 |
| 56 | 52 | G 48 | 44 | V₂ 40 | 36 | 32 | 28 | 24 | 20 | 16 | 12 | 8 | 4 | 0 |

FOR ALL COMMANDS
BIT 51 - PARITY
50:3 - TAG = 000
47:8 = OP CODE AND VARIENTS

| COMMAND | OP CODE |
|---|---|
| TRANSFER L | 000101 |
| SHARE WRITE L | 000110 |
| SHARE READ L | 000111 |

$V_1$ AND $V_2$
0 0 - WITHIN
0 1 - UP
1 0 - ACROSS
1 1 - DOWN

FIG. 10F

ERROR CORRECTION CODE — MEMORY STORAGE UNIT LOGICAL MODULE NUMBER (i) — RECEIVER PID

| 59 | 55 | P51 | 47 | 43 | 39 | 35 | 31 | 27 | 23 | 19 | 15 | 11 | 7 | 3 |
|---|---|---|---|---|---|---|---|---|---|---|---|---|---|---|
| 58 | 54 | T50 | 46 | 42 | 38 | 34 | 30 | 26 | 22 | 18 | 14 | 10 | 6 | 2 |
| 57 | 53 | A49 | 45 | V1 41 | 37 | 33 | 29 | 25 | 21 | 17 | 13 | 9 | 5 | 1 |
| 56 | 52 | G48 | 44 | V2 40 | 36 | 32 | 28 | 24 | 20 | 16 | 12 | 8 | 4 | 0 |

FOR ALL COMMANDS
BIT 51 - PARITY
50:3 - TAG - 000
47:8 - OP CODE AND VARIENTS

COMMAND OP CODE
READ ACR 001001

V1 AND V2 ARE NOT USED

FIG. 10G

ERROR CORRECTION CODE — Q MASK — RECEIVER PID

| 59 | 55 | P51 | 47 | 43 | 39 | 35 | 31 | 27 | 23 | 19 | 15 | 11 | 7 | 3 |
|---|---|---|---|---|---|---|---|---|---|---|---|---|---|---|
| 58 | 54 | T50 | 46 | 42 | 38 | 34 | 30 | 26 | 22 | 18 | 14 | 10 | 6 | 2 |
| 57 | 53 | A49 | 45 | V1 41 | 37 | 33 | 29 | 25 | 21 | 17 | 13 | 9 | 5 | 1 |
| 56 | 52 | G48 | 44 | V2 40 | 36 | 32 | 28 | 24 | 20 | 16 | 12 | 8 | 4 | 0 |

FOR ALL COMMAND
BIT 51 - PARITY
50:3 - TAG - 000
47:8 - OP CODE AND VARIENTS

COMMAND OP CODE
YOU ARE 001101

| $V_1$ | $V_2$ |
|---|---|
| 0 | 0 - WITHIN |
| 0 | 1 - UP (NOT VALID FOR THIS COMMAND) |
| 1 | 0 - ACROSS (NOT VALID FOR THIS COMMAND) |
| 1 | 1 - DOWN |

ERROR CORRECTION CODE / MEMORY STORAGE UNIT LOGICAL MODULE NUMBER (i)

| 59 | 55 | P 51 | 47 | 43 | 39 | 35 | 31 | 27 | 23 | 19 | 15 | 11 | 7 | 3 |
| 58 | 54 | T 50 | 46 | 42 | 38 | 34 | 30 | 26 | 22 | 18 | 14 | 10 | 6 | 2 |
| 57 | 53 | R 49 | 45 | V₁ 41 | 37 | 33 | 29 | 25 | 21 | 17 | 13 | 9 | 5 | 1 |
| 56 | 52 | G 48 | 44 | V₂ 40 | 36 | 32 | 28 | 24 | 20 | 16 | 12 | 8 | 4 | 0 |

FOR ALL COMMANDS
BIT 51-PARITY
50:3-TAG-000
47:8-OP CODE
AND VARIENTS

| COMMAND | OP-CODE |
| RESET MY ACR | 010111 |
| TEST AND SET i | 010100 |

FIG. 10H

ERROR CORRECTION CODE / N Q1 Q2 MASK

| 59 | 55 | 51 | 47 | 43 | 39 | 35 | 31 | 27 | 23 | 19 | 15 | 11 | 7 | 3 |
| 58 | 54 | 50 | 46 | 42 | 38 | 34 | 30 | 26 | 22 | 18 | 14 | 10 | 6 | 2 |
| 57 | 53 | 49 | 45 | 41 | 37 | 33 | 29 | 25 | 21 | 17 | 13 | 9 | 5 | 1 |
| 56 | 52 | 48 | 44 | 40 | 36 | 32 | 28 | 24 | 20 | 16 | 12 | 8 | 4 | 0 |

FOR ALL COMMANDS
BIT 51-PARITY
50:3 TAG-000
47:8 OP CODE
AND VARIENTS

| COMMAND | OP CODE |
| I AM | 010000 |

$V_1$ AND $V_2$ ARE NOT USED

FIG. 10I

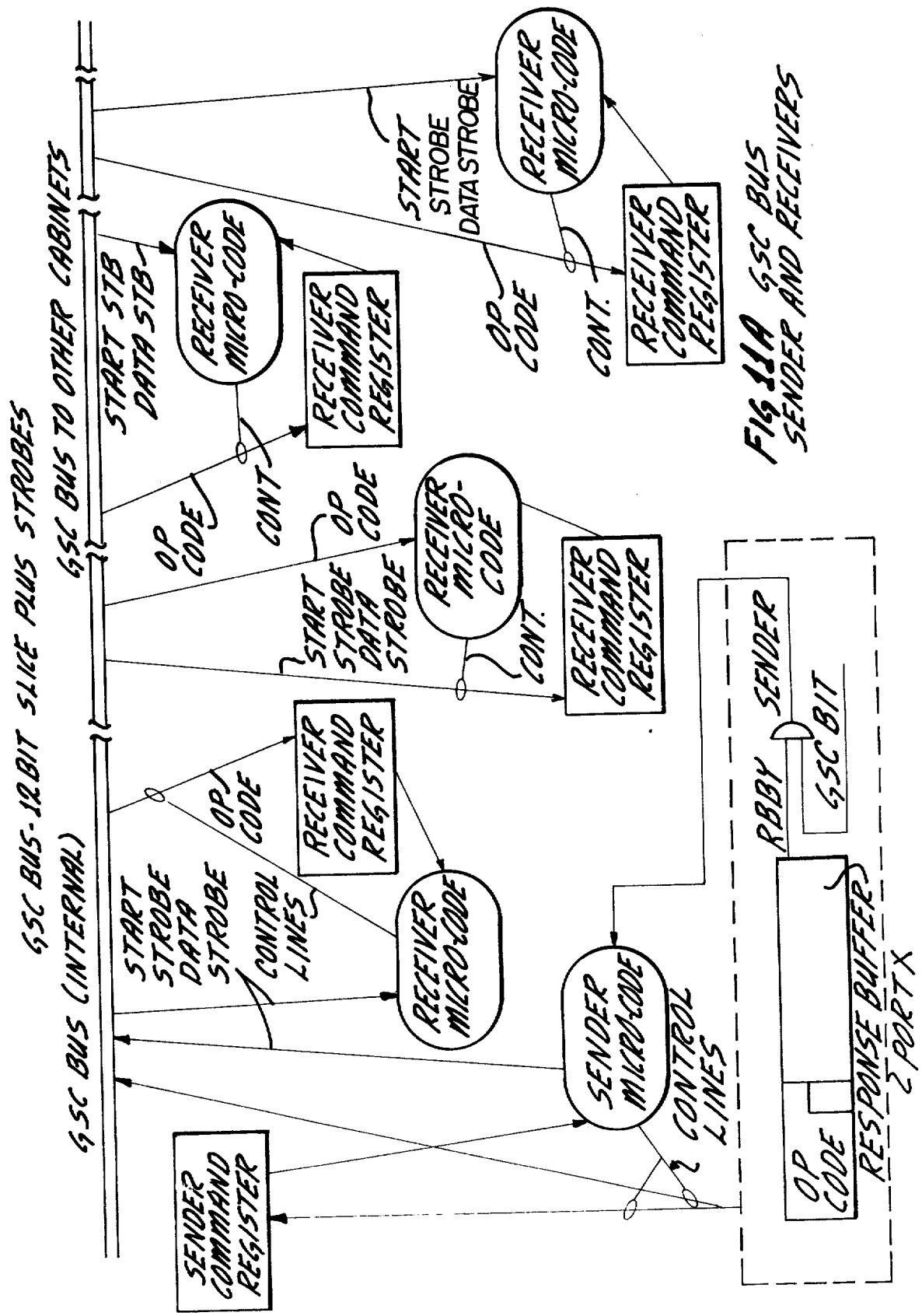
FIG. 11A GSC BUS SENDER AND RECEIVERS

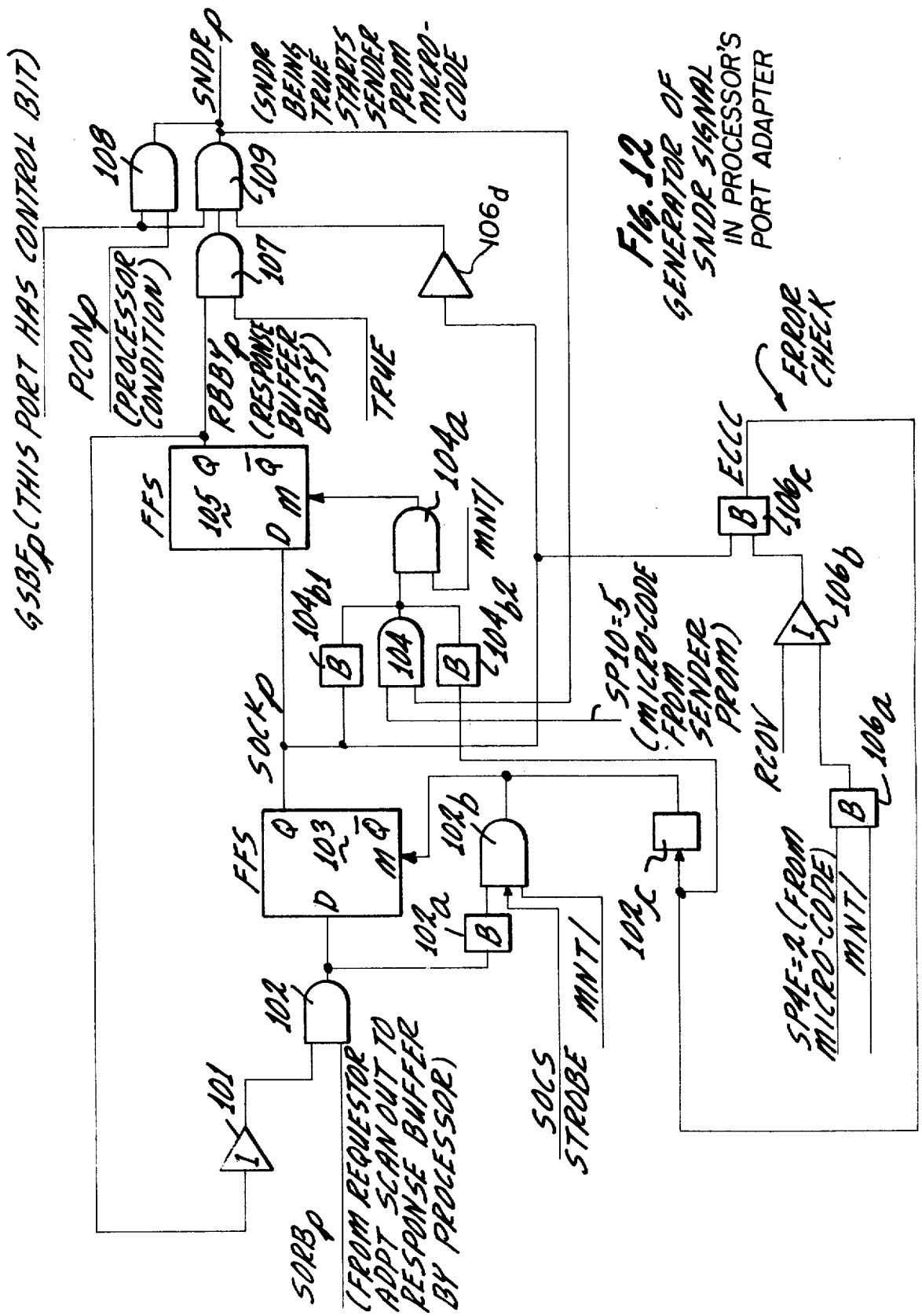

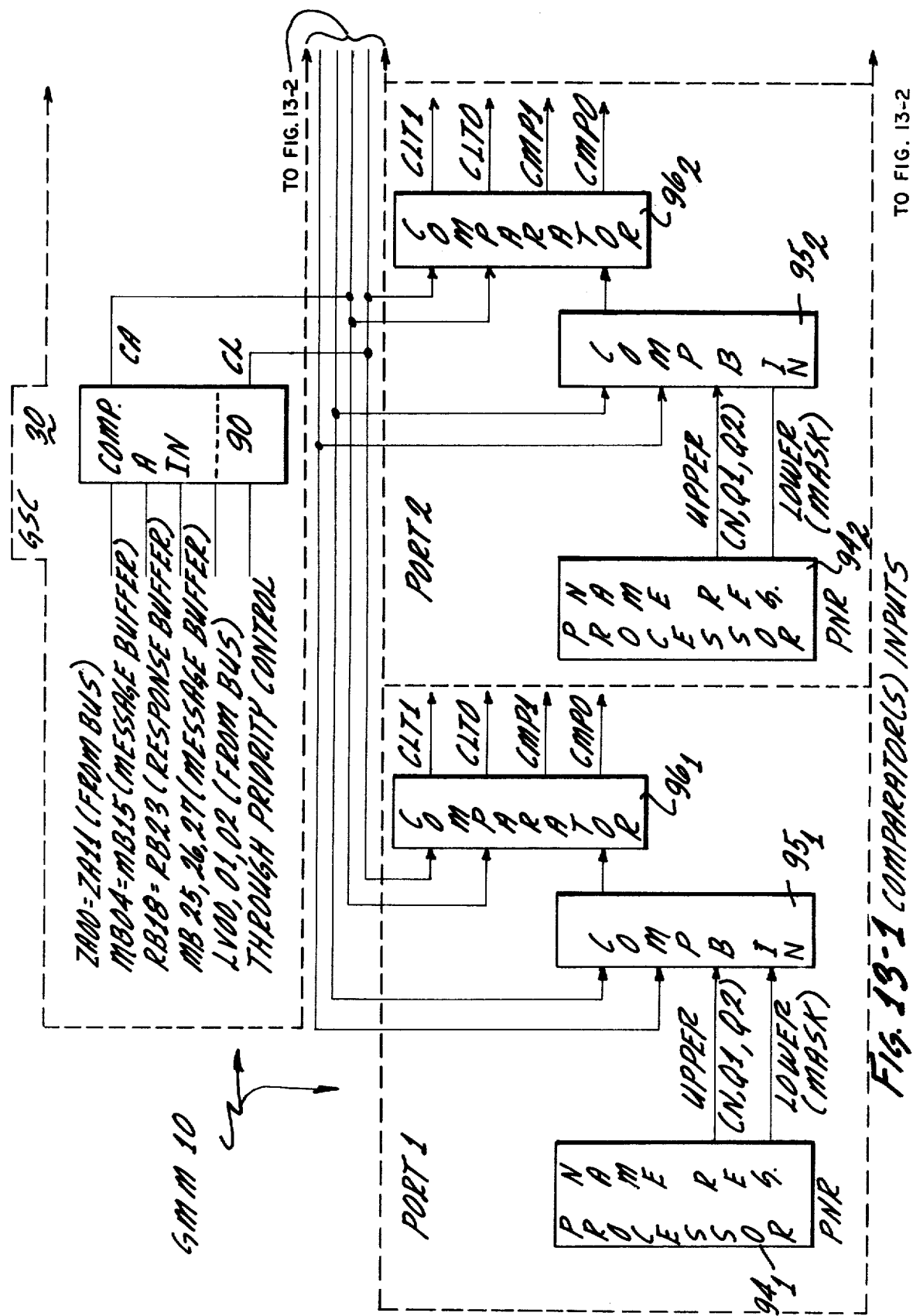

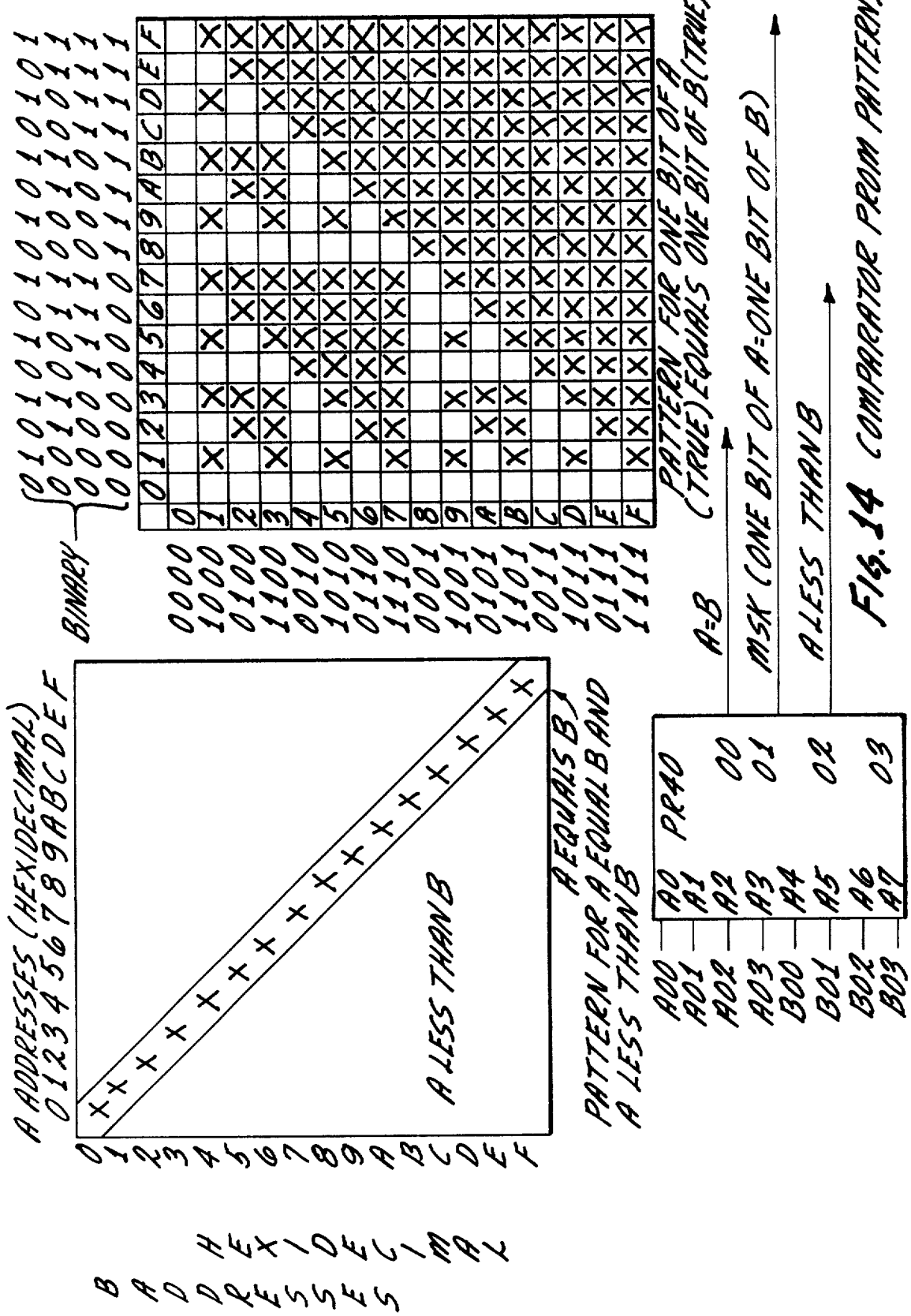
FIG. 14 COMPARATOR PROM PATTERNS

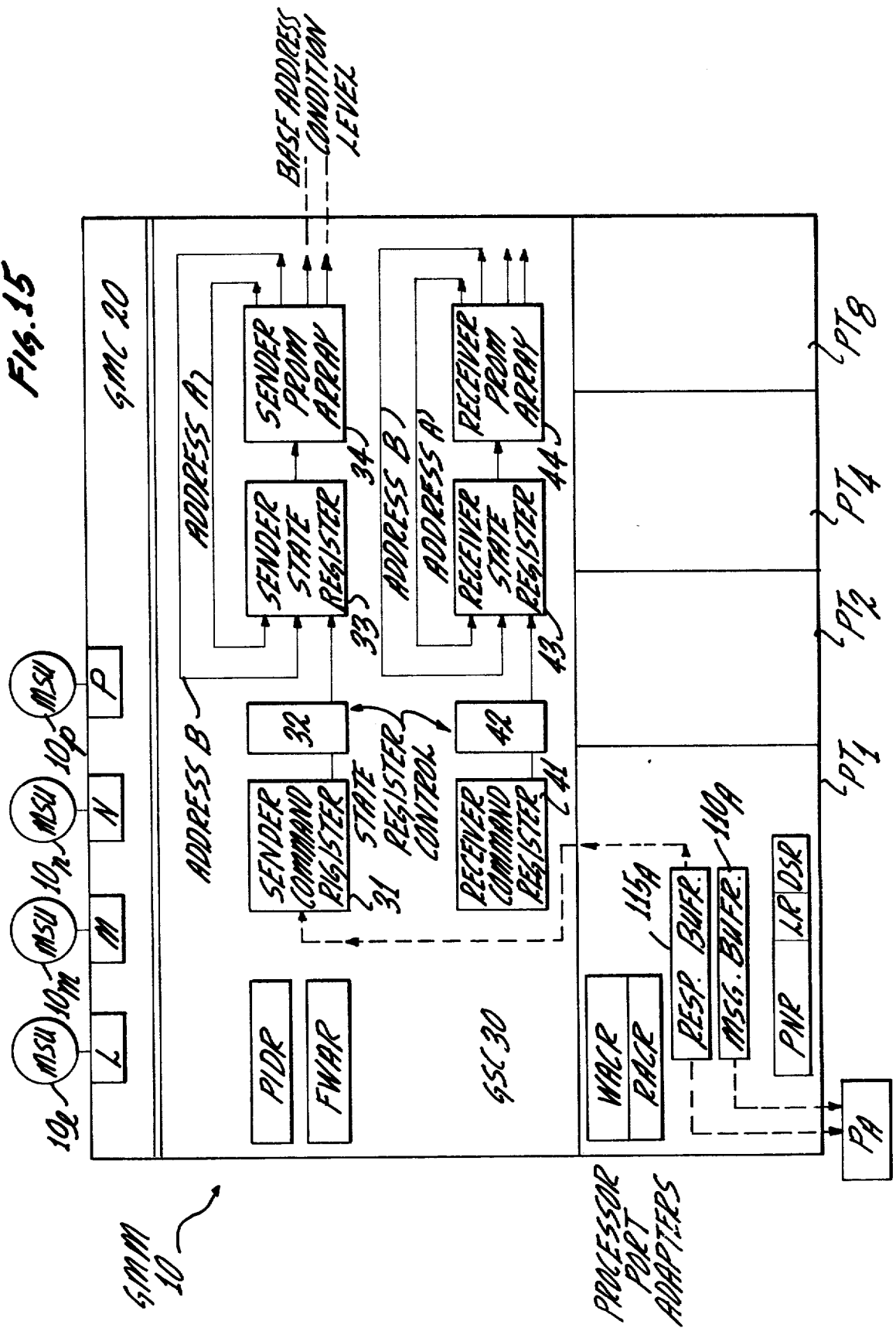

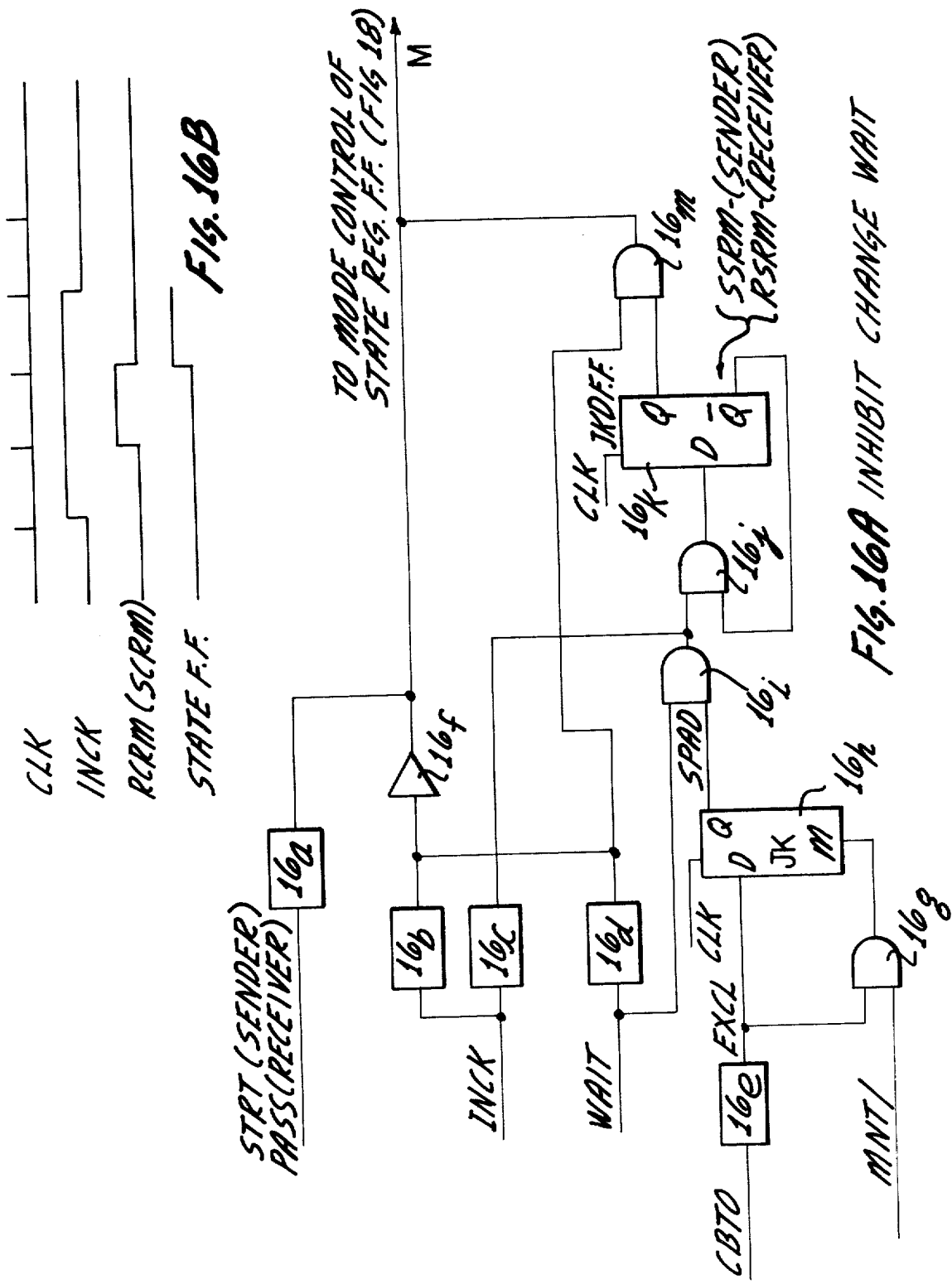

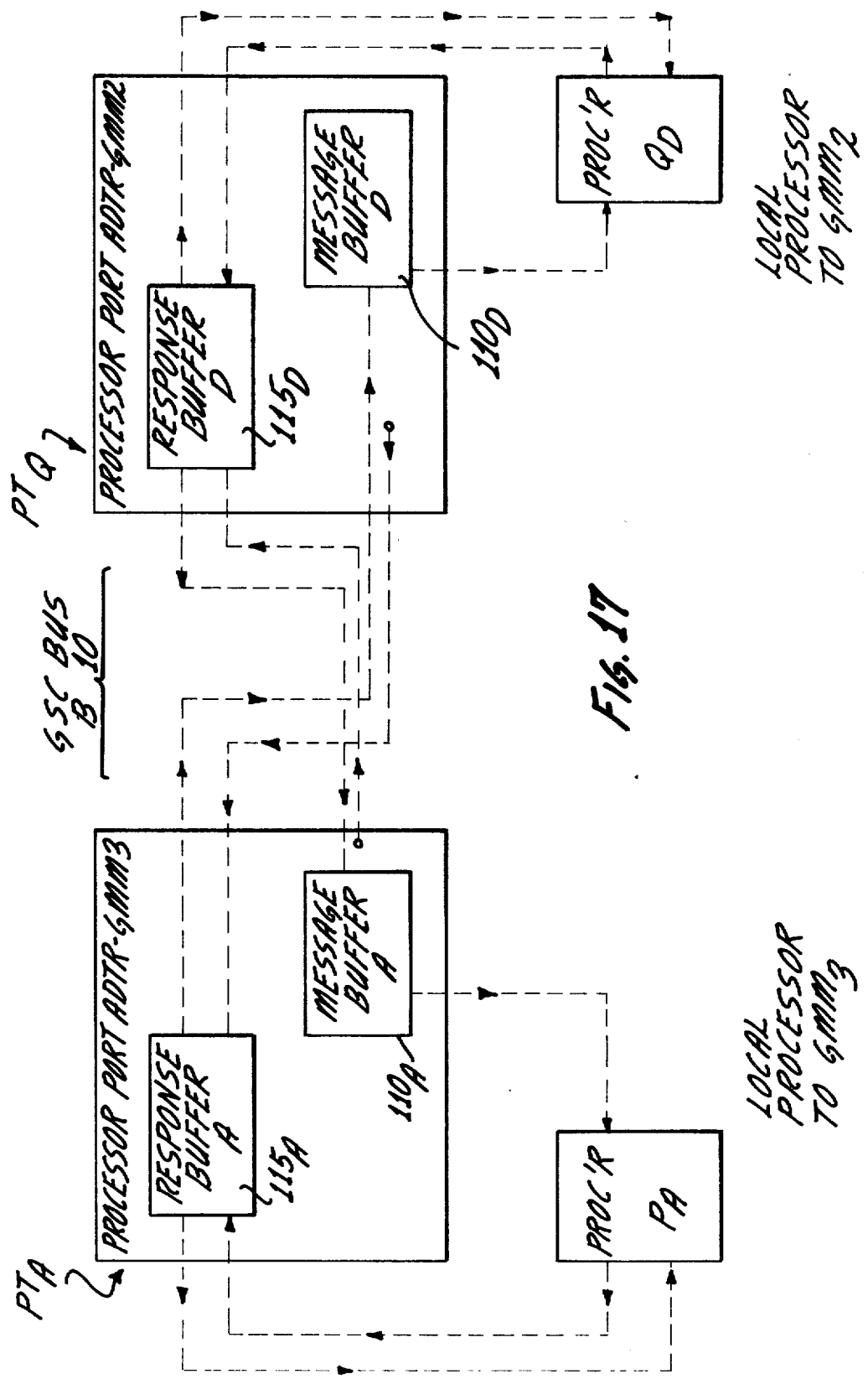

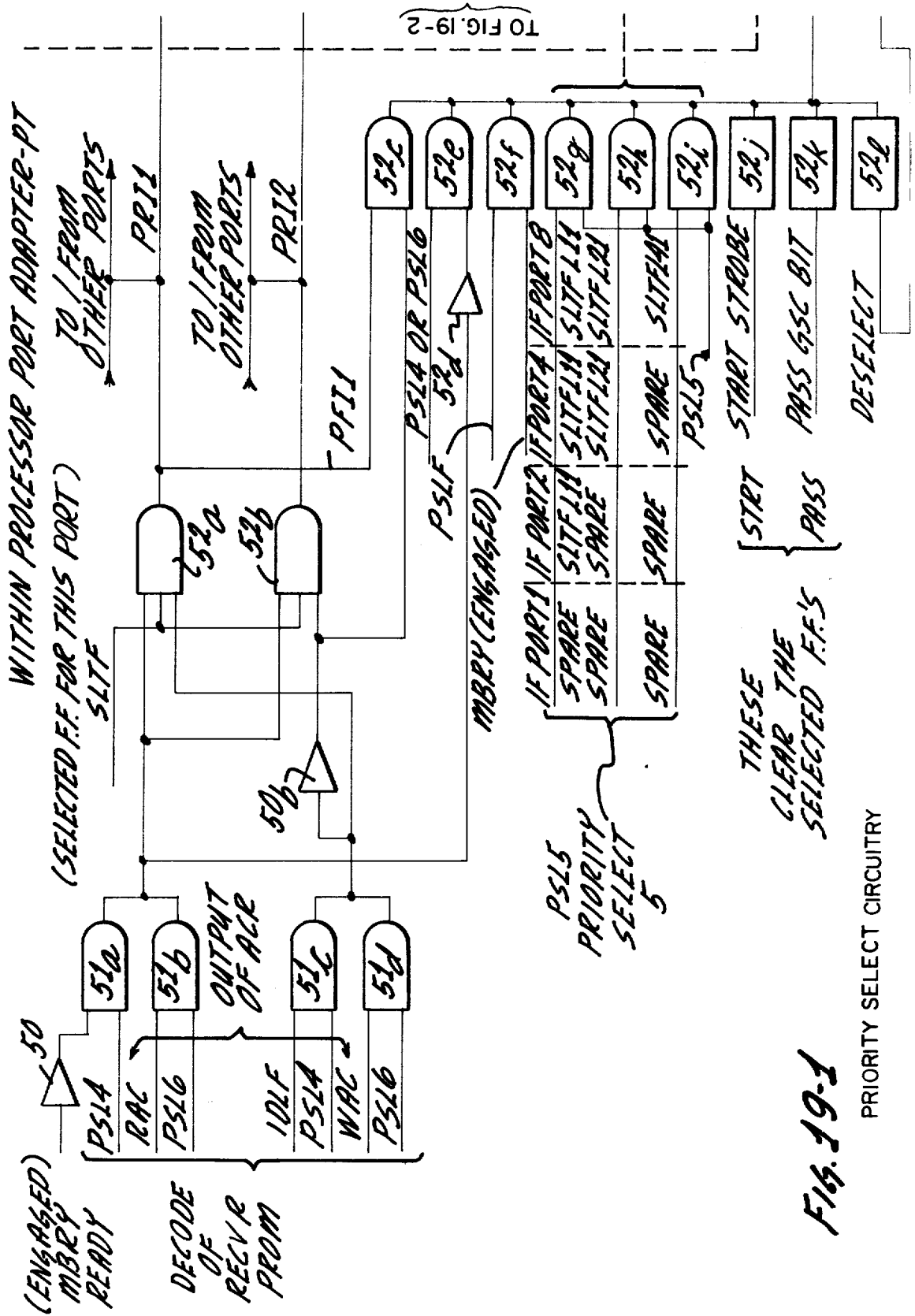
Fig. 19-1 PRIORITY SELECT CIRCUITRY

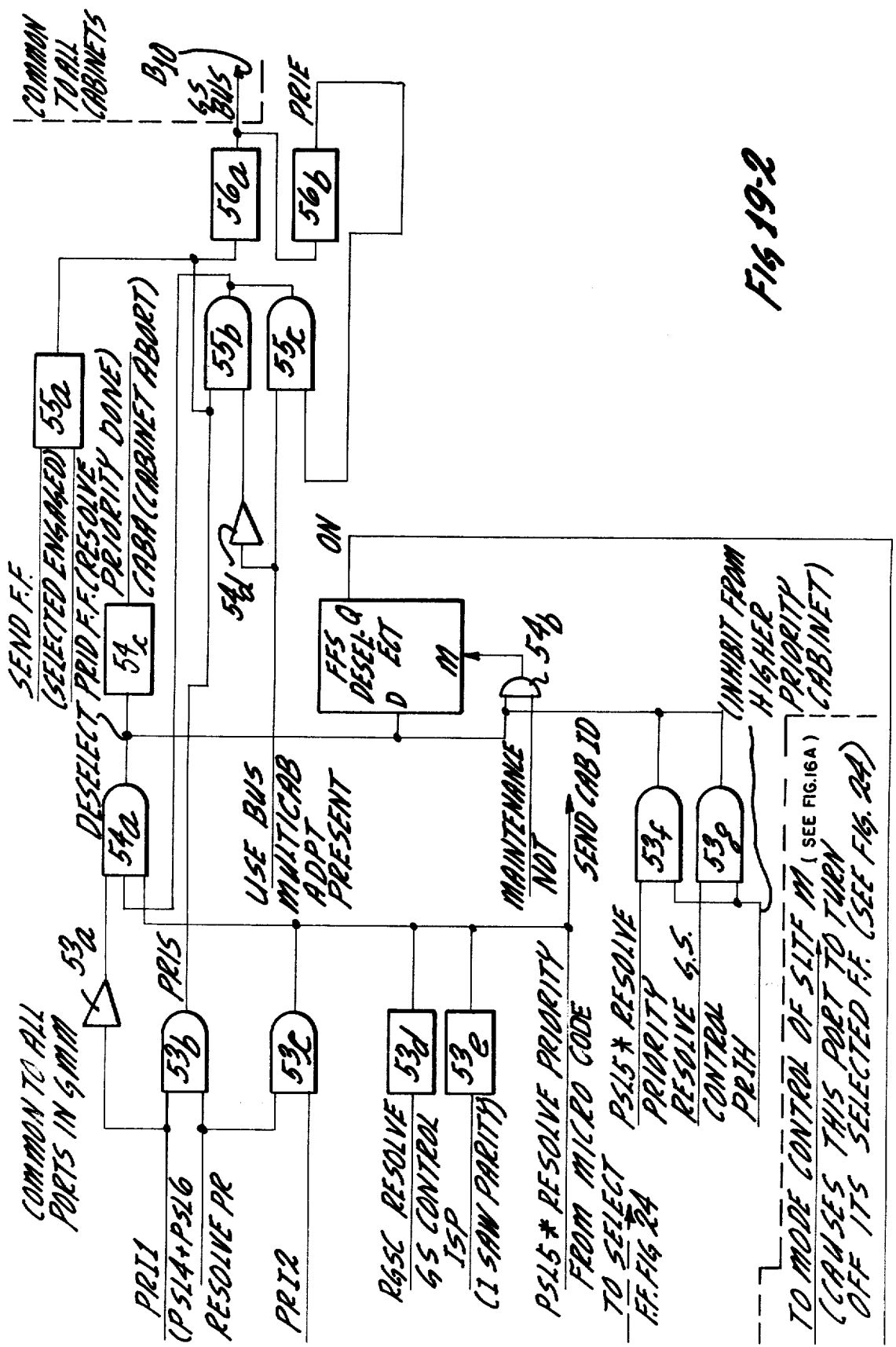

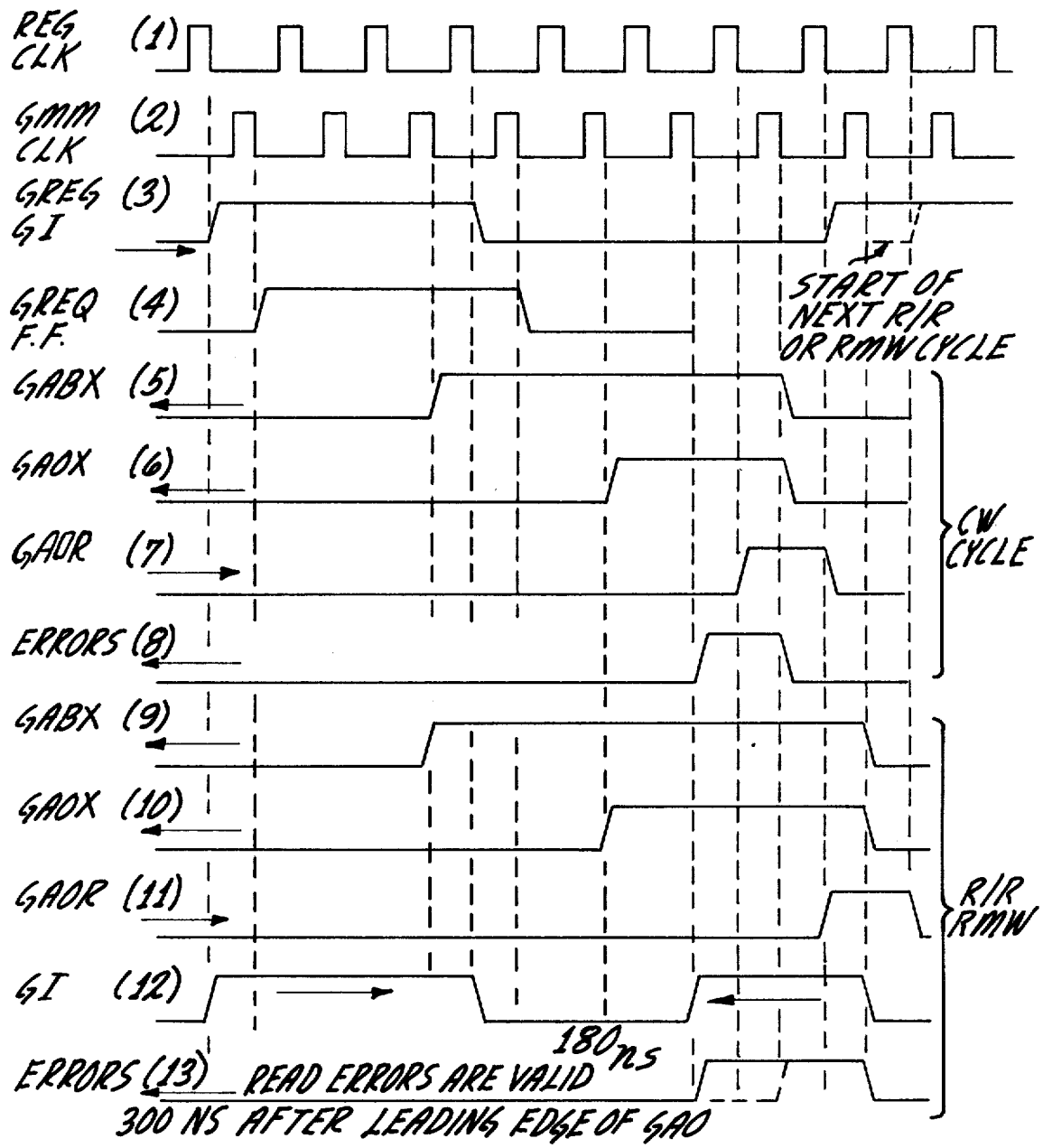
FIG. 20 TIMING RELATIONSHIPS

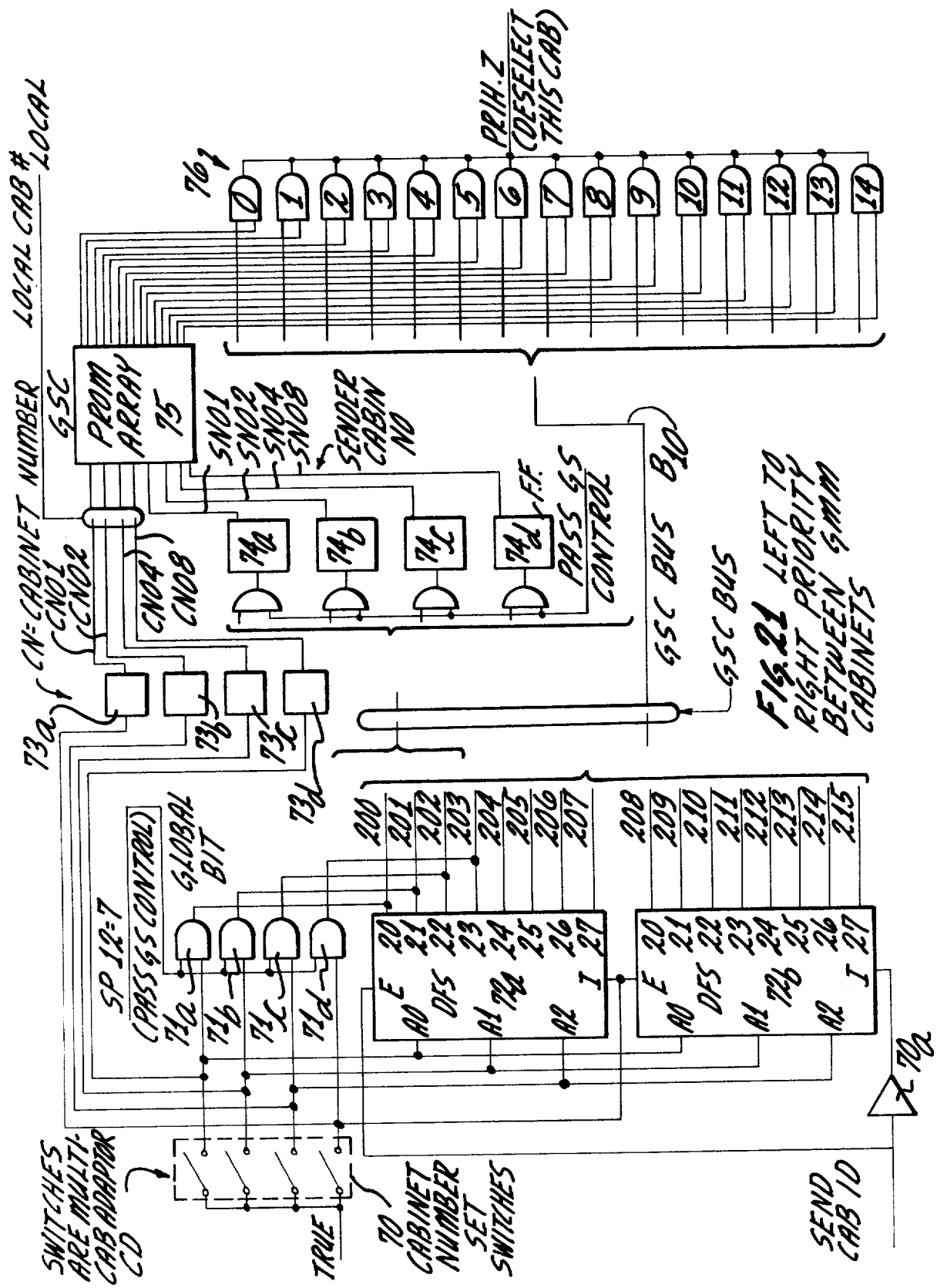

PRIORITY SELECT TIMING
FIG. 22
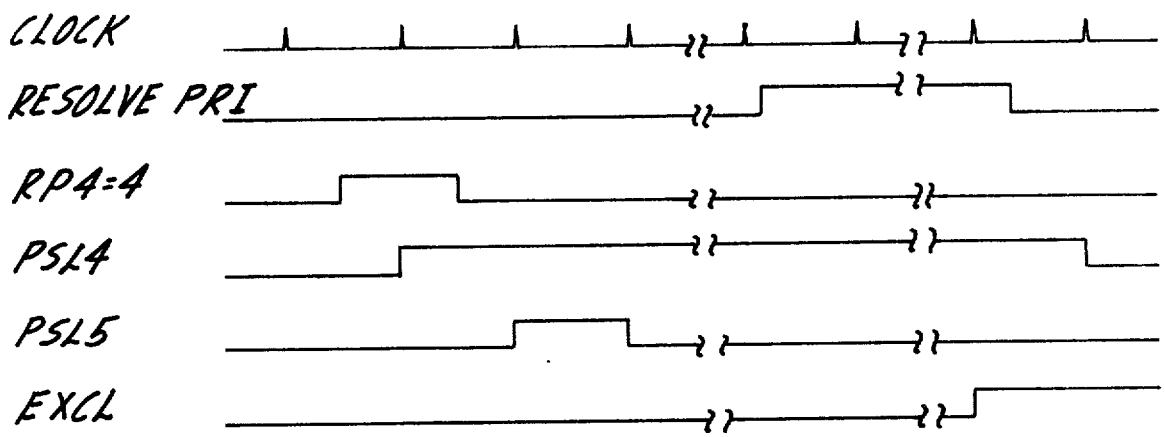
(A) IDLE/NOT ENGAGED
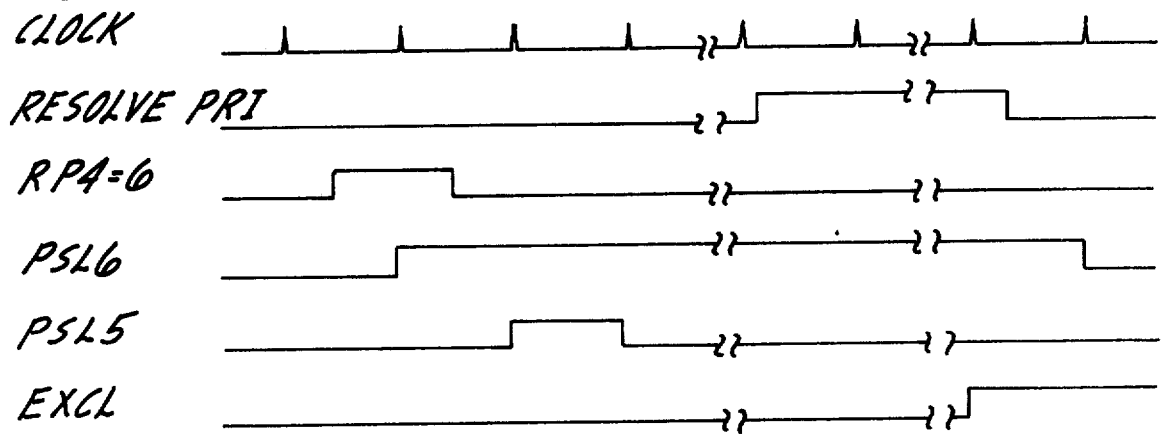
(B) WAC/RAC
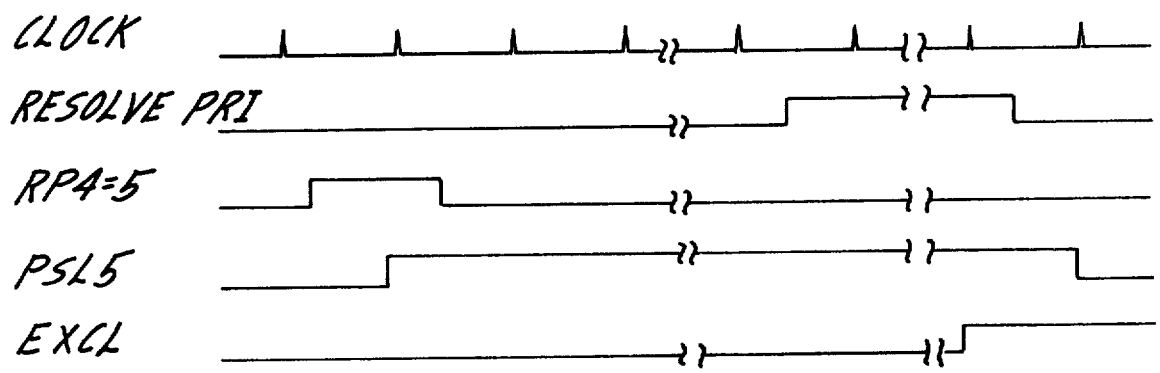
(C) LEFT-TO-RIGHT

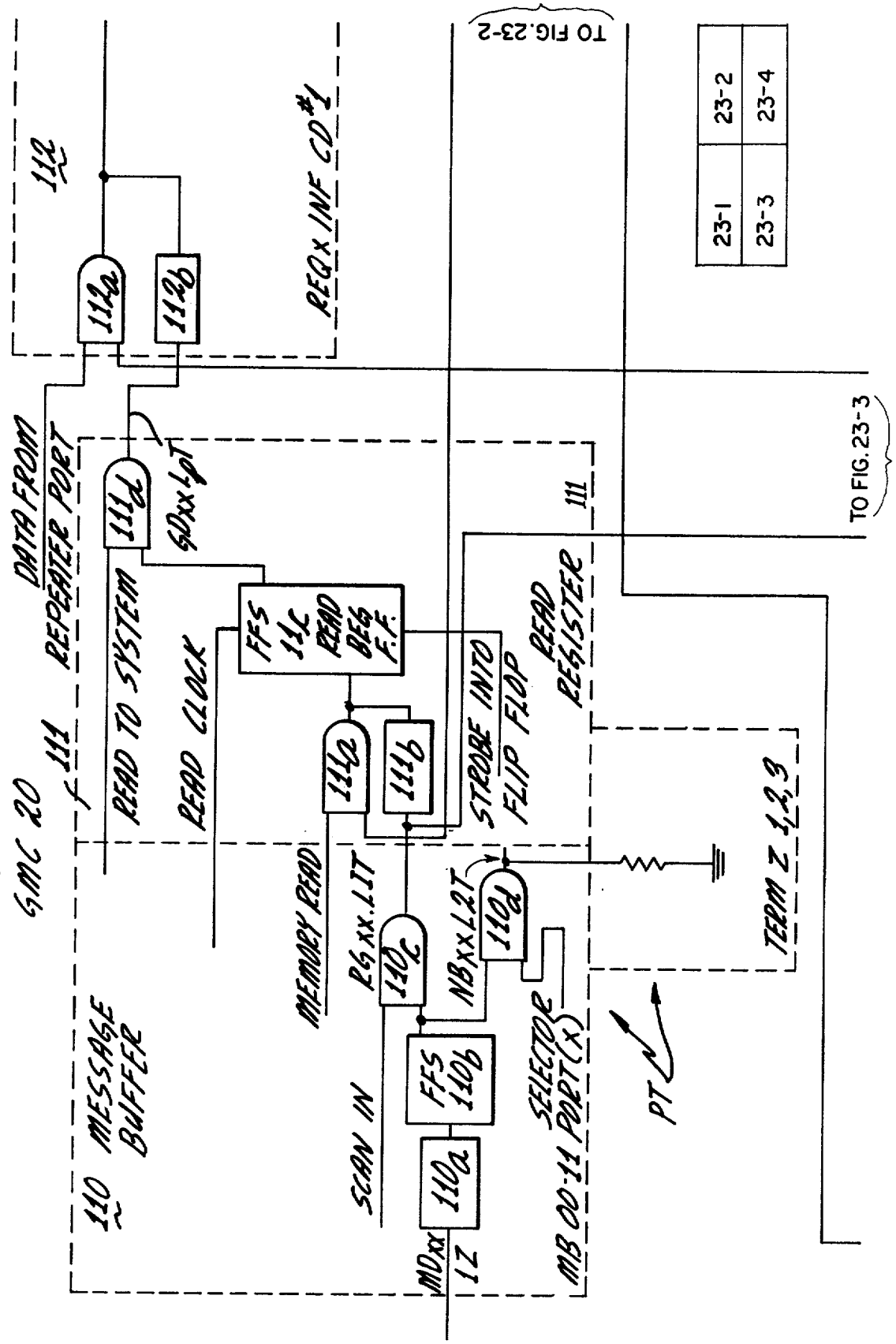

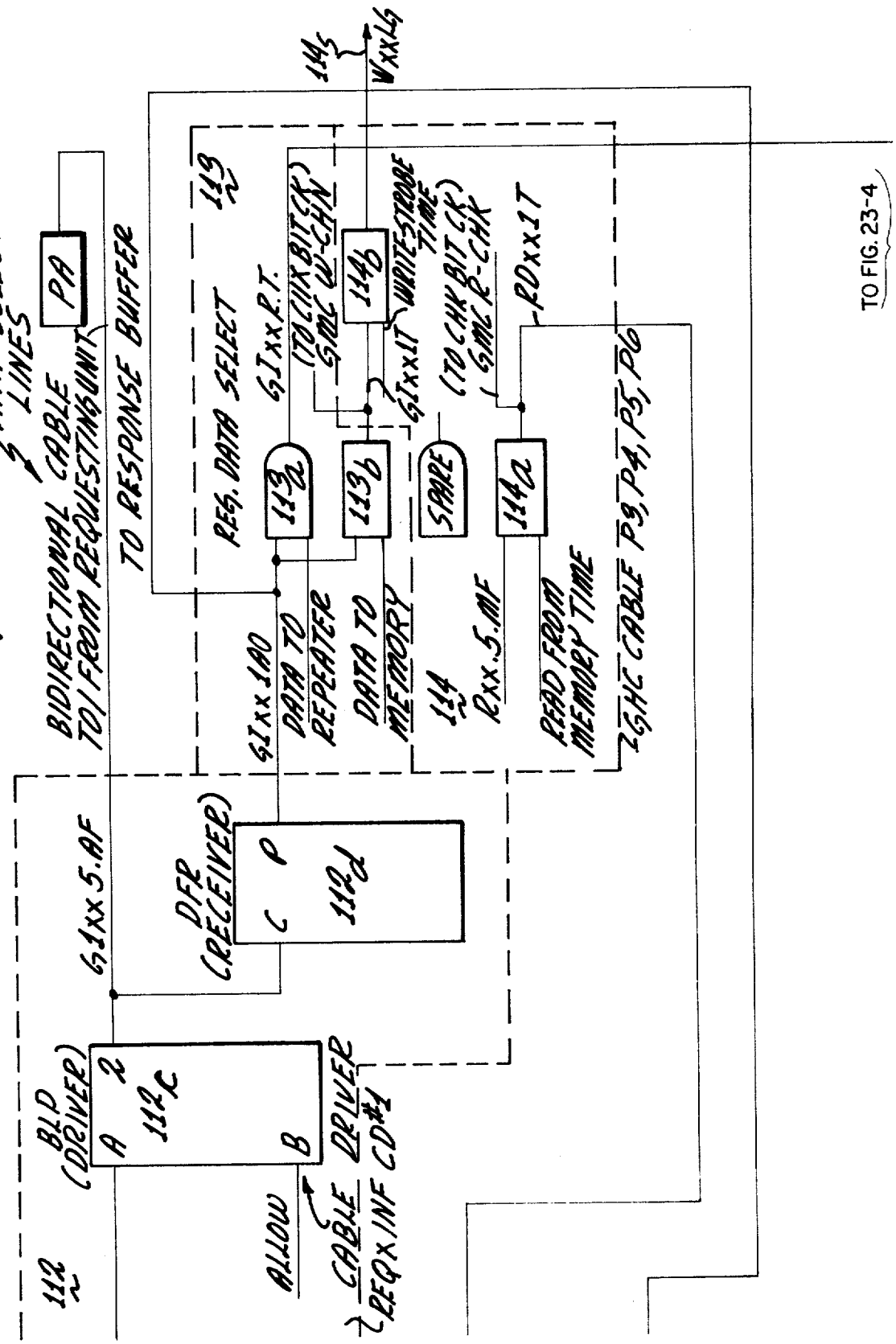

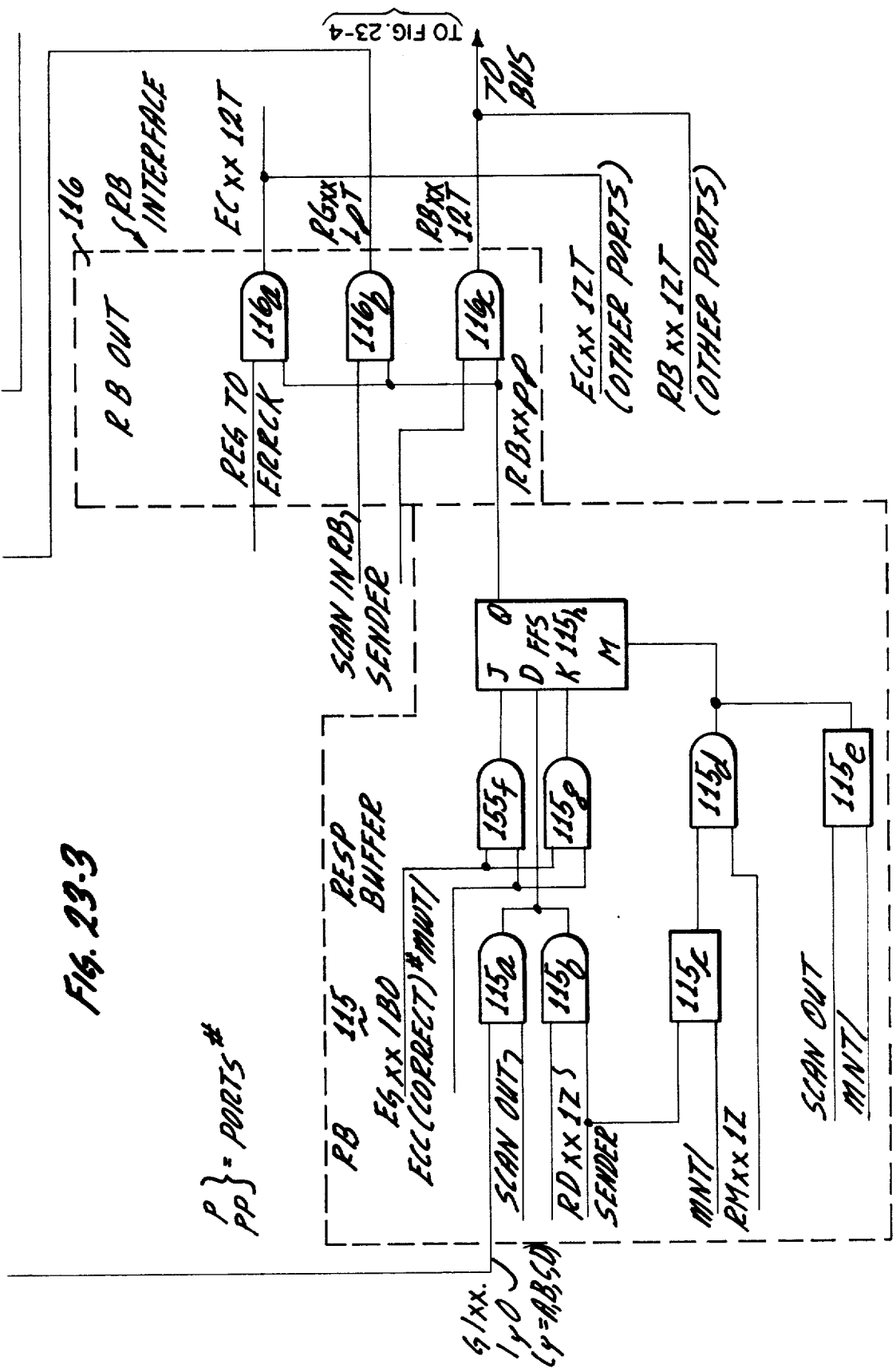

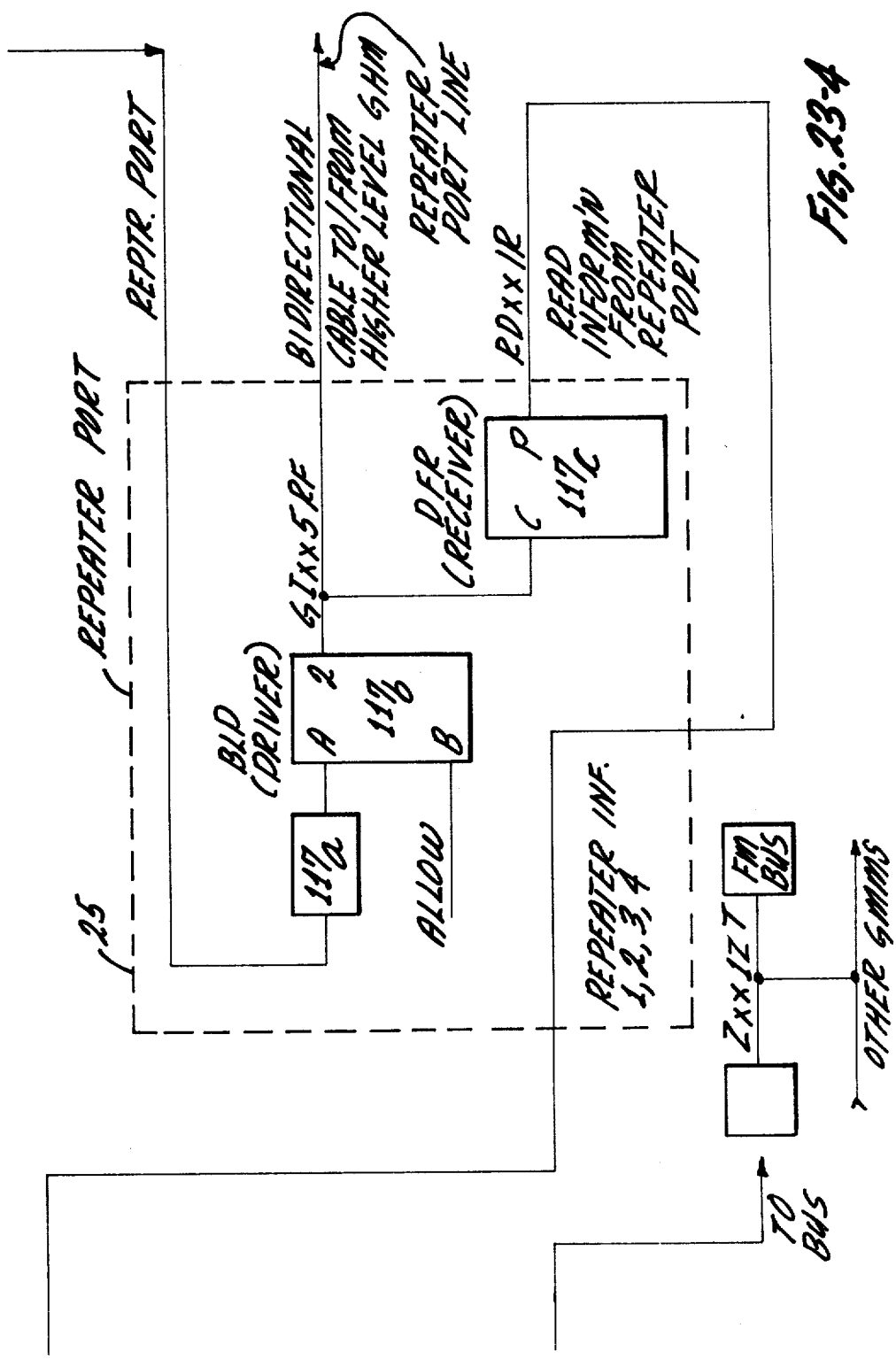

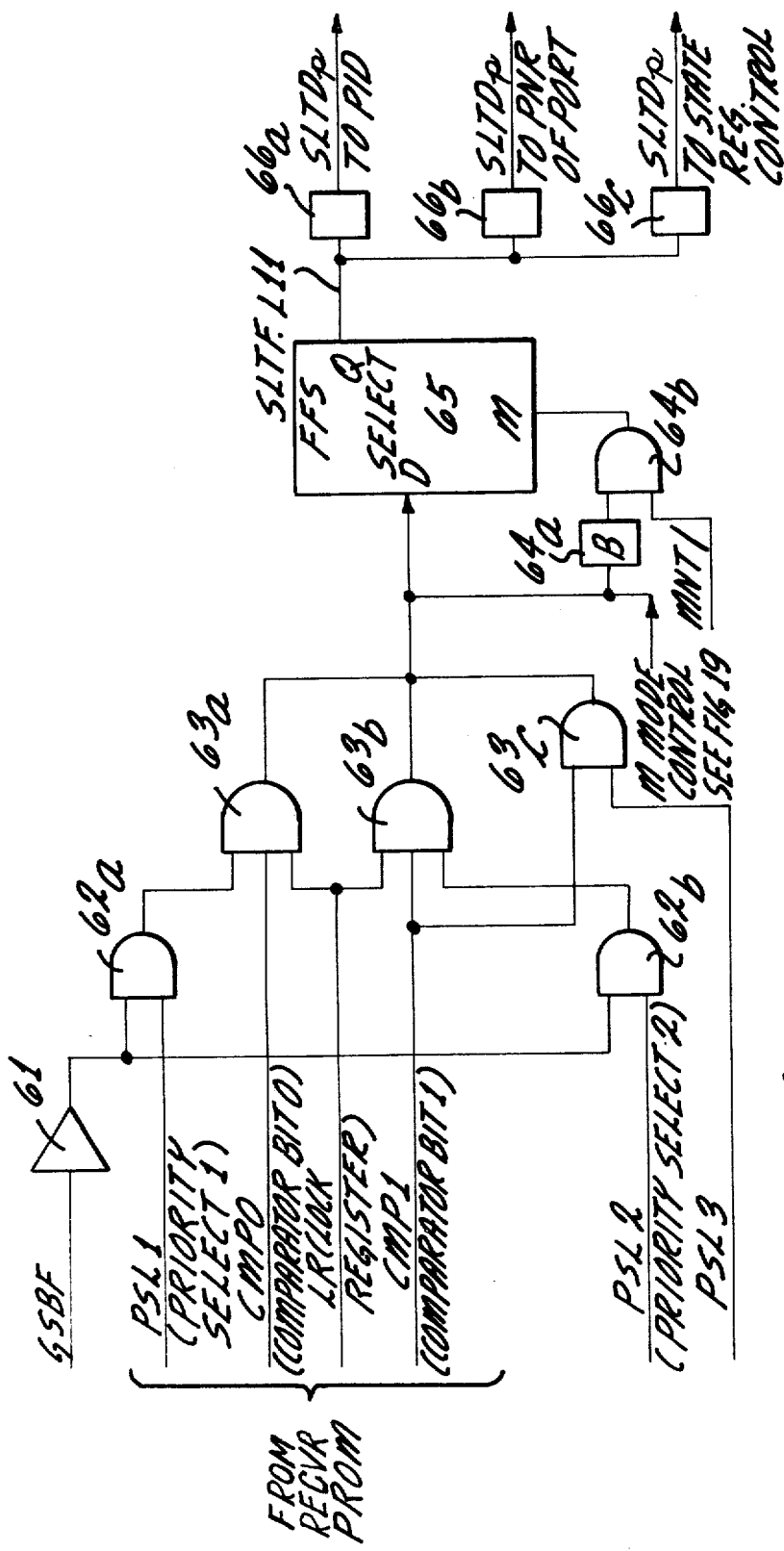

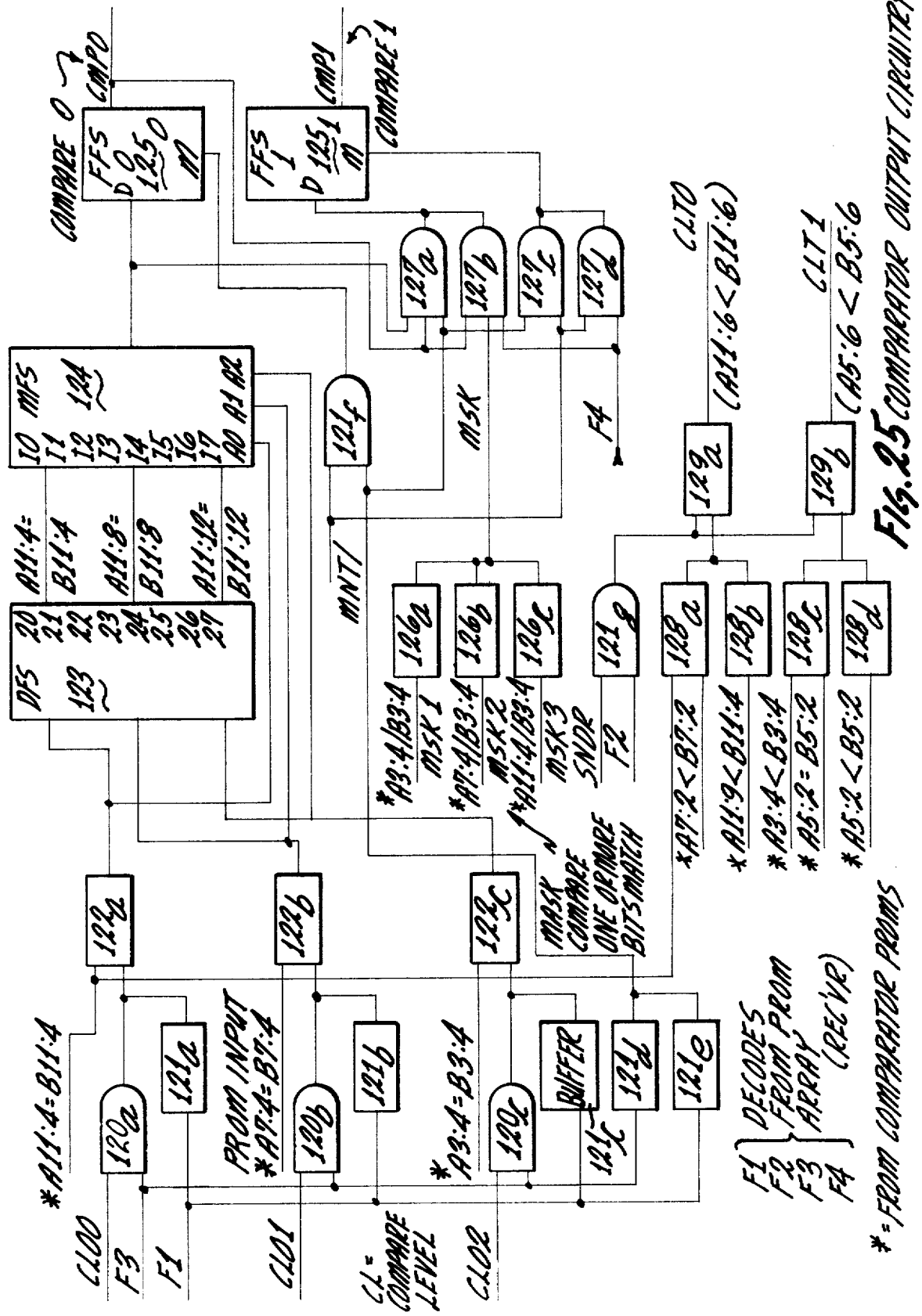

MODULE FOR COUPLING COMPUTER-PROCESSORS

CROSS REFERENCES TO RELATED APPLICATIONS

The system described in this application is related to other applications on the same or similar subject matter as follows:

An application entitled "Module for Coupling Computer-Processors", filed Dec. 21, 1978, Ser. No. 971,677, inventors Clifford Bellamy and John Besemer.

An application entitled "Selection of Addressed Processor in a Multi-Processor Network", filed Dec. 21, 1978, Ser. No. 971,889, inventors John Besemer and Clifford Bellamy.

An application entitled "Hierarchical Multi-Processor Network for Memory Sharing", filed Dec. 22, 1978, Ser. No. 972,431, inventors John Besemer and Clifford Bellamy.

BACKGROUND OF THE INVENTION

This invention relates to data processing systems and methods for linking or coupling data processing systems with system resources such as memory and other processor units or processing systems.

With the development of computer systems, processing units and system resources such as memory, input/output units, data communications systems, etc., there has been more desire to form integrated computing system networks whereby a multiplicity of computers may be connected to one another, and even wherein different types of computer systems may be coupled to one another for mutual intercommunication and distribution of processing tasks. One of the major obstacles impeding the design of a system network architecture has been the lack of a comprehensive means for interconnecting the various processing units of the system.

In a multiprocessor network with a multitude of resources, there is always the problem of how to allocate the use of the resources and how to allocate and control which processor systems may communicate with which other processor systems and what usage they may make of these other systems.

In the embodiment of the present invention, an architecture and methodology is disclosed for the coupling of a multiple number of processing systems whereby any one system may be permitted to access and control a selected one, or one of a group of processors in another system, in a controlled fashion whereby certain memory resources may be shared and certain memory resources may be restricted; or where certain memory resources are permitted to have only a limited use to a given processor. Thus, the herein described system network provides for executive control of requesting processors and slave processors in an orderly scheduled basis plus the allocation of resources and the general network control which will permit an efficient use of all the available resources.

BRIEF DESCRIPTION OF THE DRAWINGS

FIG. 2B is a schematic drawing of a global memory module showing how each port of the global memory module provides a processor port adapter and a requestor port adapter which intercooperate respectively with the global system control adapter and memory ports which connect to memory storage units.

FIG. 4 is a schematic drawing of a section of the global memory module known as the global system control adapter and showing the major elements thereof.

FIG. 5 is an overall schematic drawing of the global memory module cabinet, showing the major sections thereof.

FIG. 6 is a schematic drawing showing a hierarchy of global memory modules whereby global memory modules are connected in a hierarchy and how a processor or a global memory module (GMM) can be identified by an identification number, PID.

FIG. 8A is a schematic drawing of a hierarchical network whereby systems of processors are interconnected to form a hierarchy of systems indicated as a top system, mid system and bottom system.

FIG. 8B shows a hierarchical system of global memory modules and processors together with the symbolic name and processor number which identifies each unit.

FIG. 8C shows three cases of logical memory structures using a global memory module together with illustrations of the access control registers (ACR). FIG. 8C is on two sheets, 8C-1 and 8C-2.

FIG. 8D is on two sheets, 8D-1 and 8D-2.

FIG. 9 is a drawing showing the fields used to identify a particular processor and which includes a mask of 12 positions to permit identification of any one of 12 processors in a given system-group of processors connected to a global memory module.

FIGS. 10A through 10I show the global command words used to operate the various capabilities of the network system.

FIG. 11A is a schematic drawing showing how the GSC (global system control) bus provides communication from a Sender-processor to a series of possible Receiver-processors in a network.

FIG. 12 is a circuit diagram showing the generation of the Sender code signal $SNDR_p$ which makes a particular port p assume the condition of being a "Sender" to other processors in the network.

FIG. 13 is on two sheets, 13-1 and 13-2.

FIG. 14 shows the organization of a PROM for the comparator A IN and comparator B IN of the global system control of FIG. 13.

FIG. 15 is a schematic diagram of a global memory module showing more detail of the global system control (GSC) and the processor port adapter.

FIG. 16A is a circuit drawing of the inhibit change circuit which provides an output to the mode control of the state register flip-flop.

FIG. 16B illustrates the timing arrangements for this circuit.

FIG. 17 is a schematic drawing of communications between two different processors attached to two different global memory modules and their use of the Response Buffer and the Message Buffer.

FIG. 18 is on three sheets, 18-1, 18-2 and 18-3.

FIG. 19 is a circuit diagram of the priority resolution circuitry used in the global memory module. FIG. 19 is on two sheets, 19-1, 19-2.

FIG. 20 is a timing diagram showing the timing relationships between the global memory module (GMM) and a requesting processor.

FIG. 21 is a circuit drawing of the provisions made for the left-right priority selection as between global memory module cabinets.

FIG. 22 is a timing diagram illustrating the signals for the resolution of priority for three selected situations.

FIG. 23 is a circuit diagram illustrating the data paths between a particular processor, the Message Buffer, the Response Buffer and the repeator port output cable. FIG. 23 is on four sheets which follow the pattern of: 23-1 ... 23-2 and 23-3 ... 23-4.

FIG. 24 illustrates the circuit by which the select flip-flop in a processor port is activated.

FIG. 25 is a circuit diagram showing the elements used in the comparison of Sender and Receiver processors in determining which level memory storage units may be shared by the processors and also whereby the processor identification PID of a receiver processor can be compared against the sender processor's PID; and whereby the processor name and mask of a Receiver-processor can be compared against the name and mask field sent by the Sending processor.

SUMMARY OF THE INVENTION

Figure 1:
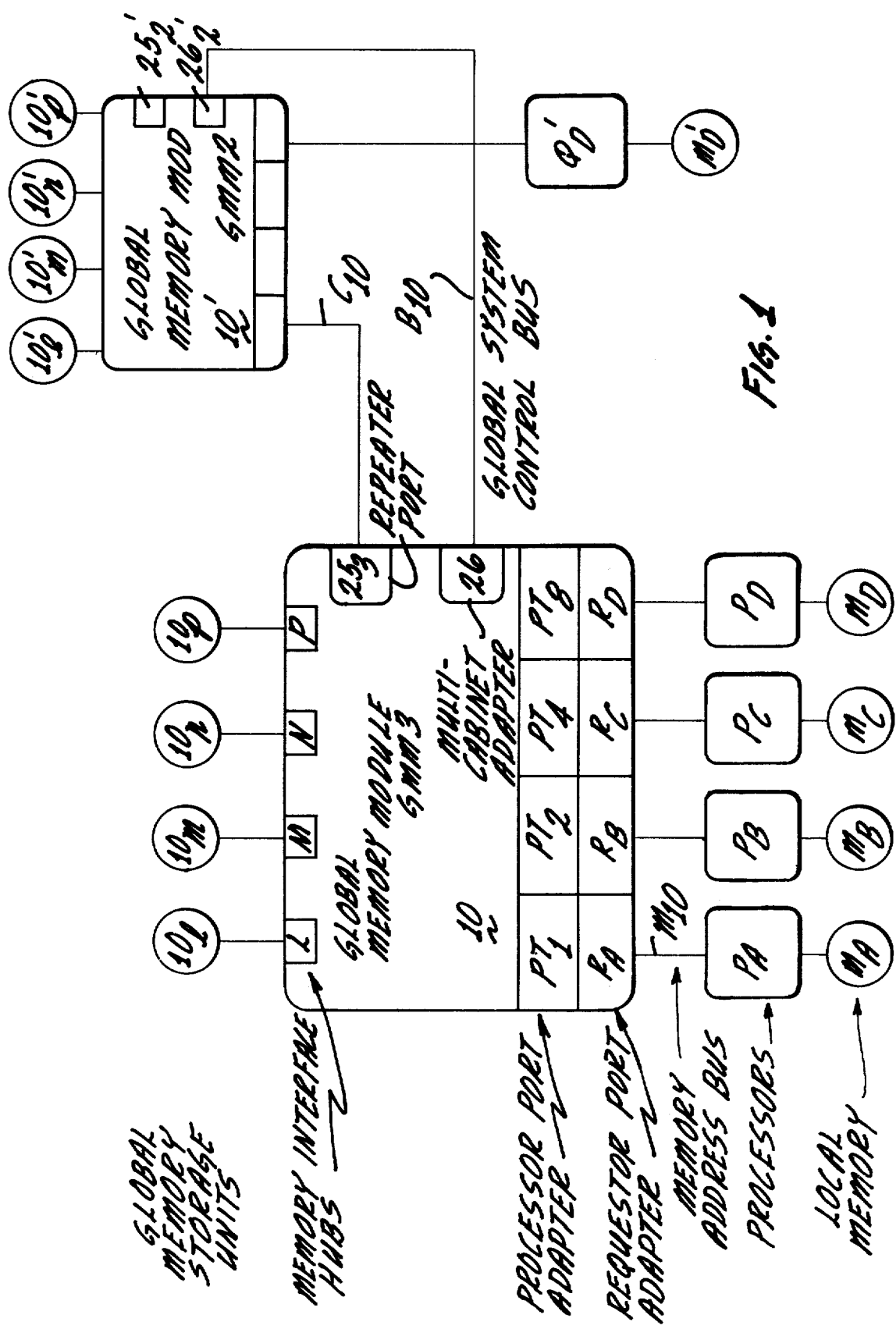
FIG. 1 is a drawing of a multiprocessor system whereby individual processors are coupled through global memory modules.

A system architecture is provided whereby a "global memory module" placed in a hierarchy is used in coupling different sets of computer processors to each other. A global memory module is provided which can be organized into multiple hierarchical units wherein each of the global memory modules can couple at least four processors or computer systems. The global memory module provides memory storage which can be shared by any of the processors attached to it, or shared by processors attached to other global memory modules within the hierarchical memory system. Thus, the global memory module provides a way of coupling computers into a multi-processor system.

The global memory module includes four input requestor ports, each of which can support a connection to a processor-computer system. A repeater port of the global memory module provides for connection to a "higher level" global memory module to permit access to additional memory storage when the address of requested data is beyond the scope of the first accessed global memory module. Further, the global memory module includes a global memory control which provides access to at least four memory storage units which are part of the global memory module, or alternatively to a repeater port which provides access to the memory of higher level global memory modules. The requestor ports are part of a larger control unit called the global system control (GSC) which provides intercommunication and control between a given level global memory module and the subsequent levels of global memory modules.

The hardware structure is utilized with the development of a master control program operating system (MCP) which is applicable to the various types of computer involved, such as for example the Burroughs B 6000 series of computers. The operating system provides for two types of processor couplings, which are: (a) tight coupling of processors and (b) a loose coupling of processors.

In "tight coupling" of processors there may be two or more B 6000 processors which are run under the control of a single MCP as a "tightly coupled" system. On the other hand, two or more processors running under the control of "separate" operating systems may communicate with each other and access common memory as "loosely coupled" systems. A loose coupling may exist between two processors, a processor and a tightly coupled system, or two tightly coupled systems.

The master control program (MCP) is primarily related to the utilization of the hierarchical memory structure which is provided by the global memory modules and the techniques provided for "sharing" resources. All the programs written for the Burroughs B 6000 systems will run without modification under the master control program (MCP).

From a multi-processor system point of view, the B 6000 series of computers may form a network system which provides an advanced architecture. However, the advanced architecture of a computer such as the Burroughs B 6800 can be organized into an improved system by adopting the global memory method of coupling systems. The background and operation of the Burroughs B 6800 computer is described in a publication of the Burroughs Corporation of Detroit, Michigan 48232 as covered by manual:

500 1290, copyright 1977

By coupling systems, the following improvements are made possible:

1. The efficiency of a tightly coupled multi-processor system can be improved by reducing the "contention" between processors.
2. The processor predictability can be improved by isolating sets of processes in memory storage which is local to a processor.
3. Complex multi-processor systems can be constructed by coupling together architecturally simple, single processor systems.
4. System reconfiguration capabilities, including the detection and the identification of failing units, are improved.
5. By using one memory subsystem local to a processor, and using another memory subsystem when memory is shared between processors, the local memory can be made simpler, faster and less complex. The cost and performance of the single processor system is not influenced significantly by allowing for the possibility of its use with accommodating additional processors.

DESCRIPTION—GENERAL

The Global Memory Module (GMM) has the purpose of arranging for a multitude of different processors to be coupled together to form a multi-processor installation that can be dynamically (via software) configured to suit a variety of conditions. By providing communication paths between the various processors and by providing memory modules (Memory Storage Units, MSU) that are common to two or more processors, the GMM facilitates the use of software control to couple processors together to form systems and to couple, between these systems, to form a processor-system hierarchy tailored to the particular requirements of the specific task at hand. The processor-system hierarchy provides a "processor name" to each processor which "processor name" is not directly related to the physical configuration of the installation except as arranged by the software.

The Global Memory Module (GMM) is divided into four functional areas as follows:

(a) Global System Functions
(b) Memory Control Functions
(c) GMM Maintenance Functions
(d) Power Supplies and Clock

GLOBAL SYSTEM FUNCTIONS

In order to perform global system functions, it is necessary that the (i) processors, (ii) the GMM cabinets, (iii) and the memory storage modules, in the network be "identified" as to their respective physical locations. Further, the memory storage unit modules of the global memory, that can be shared, must be identified and also the processors must be identified by a logical name structure.

PROCESSOR IDENTIFICATION

As will be seen in FIG. 6, each Global Memory Module has four input requestor ports designated, in this figure, as 1, 2, 4, and 8. If there are higher level GMM's in the hierarchy, then a repeater port (R) is provided for the particular Global Memory Module which is lower in the hierarchy than the highest level Global Memory Module.

The physical identification (PID - processor identification) which is placed on any given processor in the system is determined by the relationship of the input requestor ports through which the processor has a path to the highest level GMM (level 0).

In the preferred embodiment, generally only four levels of GMM's are used in the network. Thus, as will be seen in FIG. 6, the processor identification, PID, is a four-digit number with the "leftmost" digit representing the connected requester port of the level 0 GMM. For example, in FIG. 6, the lowest level processor, $P_D$, is designated with a PID of 8148. This means that the processor $P_D$ has a connected path to the highest level GMM at port 8 of the highest level GMM (level 0 GMM); then the connected path moves through port 1 of the level 1 GMM; then through port 4 of the level 2 GMM and then through port 8 of the level 3 GMM. Thus, tracing the connected path from the highest level GMM (level 0 GMM) to the lowest level GMM (level 3 GMM); it is found that the processor $P_D$ connects through ports 8148 and thus this number is given to the processor as the processor identification number, PID.

Within each Global Memory Module there is located (FIG. 4, FIG. 6) a three-digit processor identification register (PIDR) in which the PID digits (representing the path from this GMM's Repeater Port to the highest level [level 0] GMM) are set by manual switches at the time of installation. If there are three higher level Global Memory Modules (GMM's), the first "three" PID digits are set manually. However, if there are only two higher level GMM's, then only the first two digits are set manually. If there is only one higher level GMM, then only the first PID digit of that particular GMM is manually set.

When a Global Memory Module is the highest level Global Memory Module in the system (level 0), then no PID digits are set manually in that particular GMM's processor identification register, PIDR.

The port number of a processor which is connected to a GMM is "concatenated" (by the PID circuitry) with the manually set digits of the PIDR, processor identification register. Thus, the PID circuitry places the processor's port number (i.e., 1, 2, 4 or 8) into the leftmost "zero" position of the PIDR of the GMM, that is, the digit position that is equal to 0.

Figure 2A:
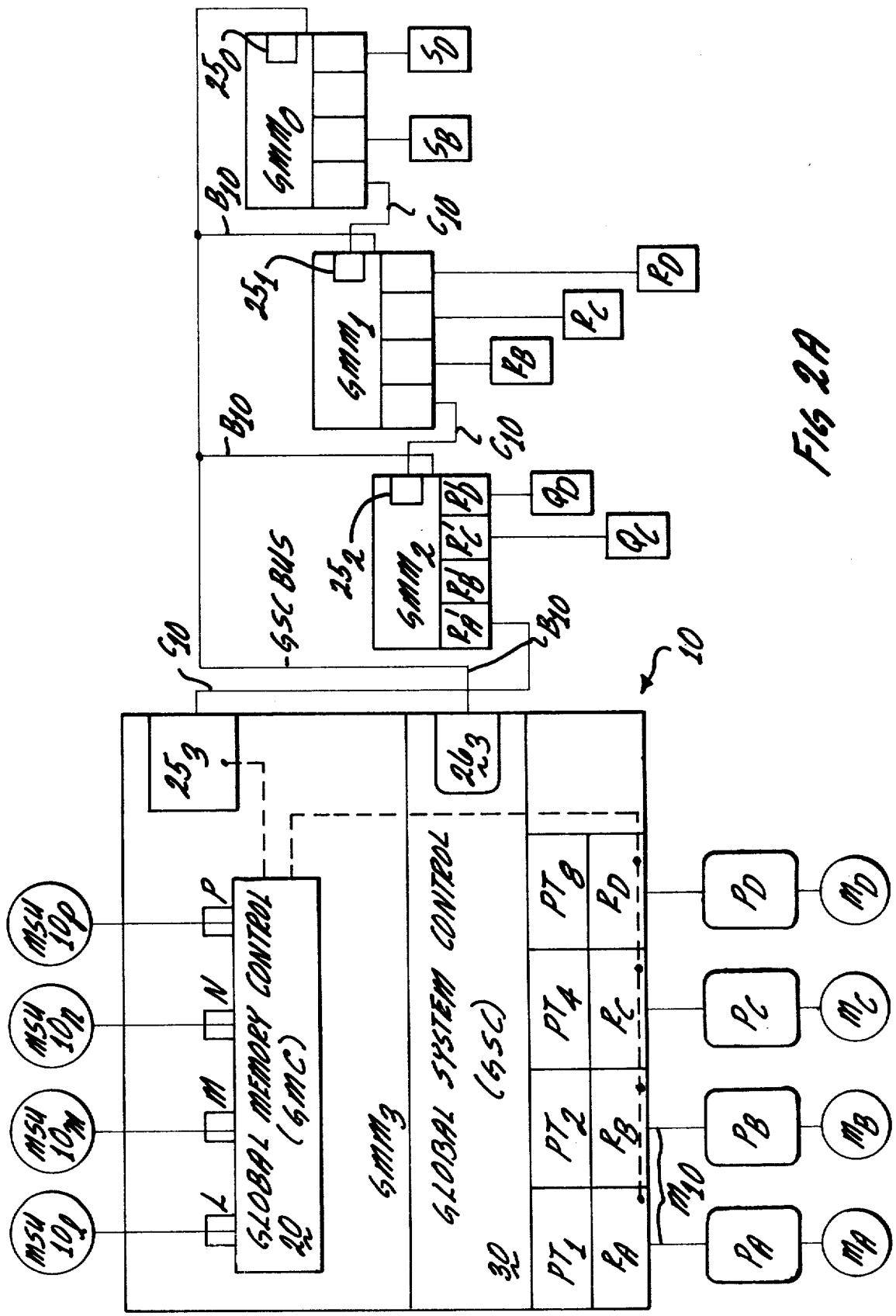
FIG. 2A shows a multiprocessor network which is coupled by global memory modules showing the input ports of a global memory module and other major elements of the global memory module.

The Global Memory Module 10 of FIG. 2A is made of two main functional units: (a) the global memory control (GMC) 20 and (b) the global system control (GSC) 30.

The GMC 20 is a time-multiplexed memory control with four requestor ports $R_A$, $R_B$, $R_C$, $R_D$ and repeater port $25_3$. Thus, if a requestor (as processor $P_A$) provides a memory address greater than the highest address in the memory storage unit module (MSU $10_l$, $10_m$, $10_n 10_p$) connected that particular GMC, then the request is passed through the repeater port $25_3$ to the requestor port $R_A$ of another Global Memory Module GMM$_2$, if one is connected thereto.

The Burroughs B 6800 and B 6900 processors have local memory controls which operate on a similar basis and which will pass memory access requests out through a repeater port when the address required is greater than the local maximum address. This mechanism allows a number of processors or subsystems to be interconnected by a tree-like memory structure as can be seen in FIGS. 1 and 2A. Thus, while a particular Burroughs B 6800 processor such as $P_D$ may be connected to the Global Memory Module GMM$_3$ of FIGS. 1 and 2A, the 512K words of the local memory $M_D$ will be enhanced—since the processor $P_D$ can access the memory storage unit modules $10_1$–$10_p$ of GMM$_3$ and in addition can use the repeater port $25_3$ to access further memory storage unit modules in the higher Global Memory Modules, such as GMM$_2$, GMM$_1$, etc. Thus, the memory accessibility of any given processor in the hierarchical system is considerably enhanced because of the communication paths providing access to other memory modules.

Figure 3:
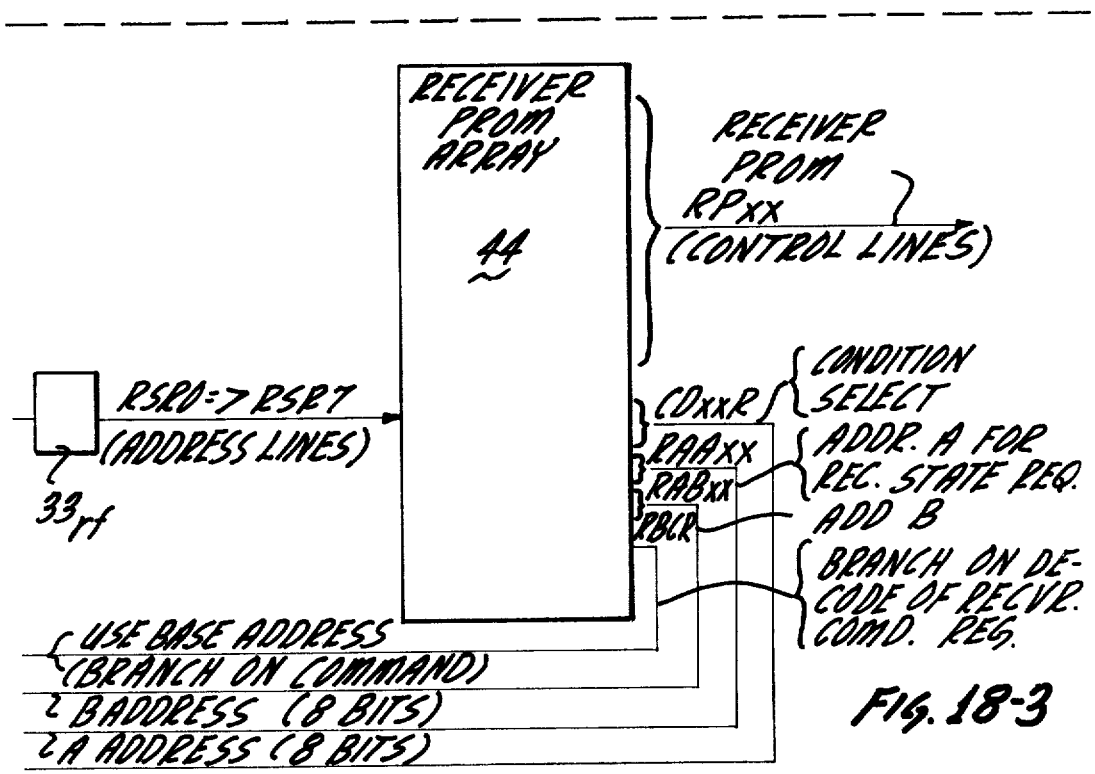
FIG. 3 is a schematic drawing of a typical input port of a global memory module, showing in more detail the requestor port adapter and the processor port adapter.

Each processor which is connected to a Global Memory Module will have associated with it a Read Access Control Register (RACR) and also a Write Access Control Register (WACR), seen in FIG. 3. These registers, RACR and WACR, reside in the processor port adapters (PT$_1$, PT$_2$, PT$_4$, PT$_8$ of FIGS. 1, 2A) of each port which is associated with a processor connected to a given Global Memory Module.

The Read Access and the Write Access Control Registers are used to define the memory space which a processor will have access to. Thus, the RACR and WACR of the processor port adapter PT will regulate (for the processor connected to it) the type of access that processor will have to any given memory area.

Thus, not only can a single GMM be used to couple, for example, four B 6800 processors but it can also regulate what areas of memory will be "accessible" and what "type" of access (Read or Write) will be permissible. A system with both Read and Write access to an area of memory can "grant" another system "full access" or it can grant "read only" access or it can retain for itself exclusive access to an area of memory.

The Global System Control GSC 30 of FIG. 2A senses the "status" of each processor to determine whether it is running, not running, or super halted. If a processor is super halted or not running, the GSC 30 will automatically transmit a message to another processor in the same system to enable the master control program (MCP) to take recovery action by sending that processor an alarm interrupt or by initiating a halt-load sequence.

When a processor in a tightly coupled system is "halted", the GSC 30 senses this and automatically halts the other processors in the system. The same condition applies when a system is "cleared".

As seen in FIG. 2A, each Global Memory Module has a series of repeater ports $25_3$, $25_2$, $25_1$, $25_0$, and control busses $B_{10}$, which are used to build a "hierarchy" of global memory modules connecting systems of processors.

Thus, for example, Burroughs B 6800 processors, as shown in FIG. 2A, can be operated with:

A. one master control program (MCP) as a "tightly" coupled system.
B. as separate independent systems making use of global memory as an extension of their local memory.
C. as "loosely coupled systems", each with its own master control program (MCP) that communicates through the common memory of a GMM and the global memory bus $C_{10}$.

As seen in FIG. 2A, the GSC bus $B_{10}$ is connected from one level of the Global Memory Module hierarchy, such as $GMM_3$, to the global system control GSC of higher level Global Memory Modules in the hierarchy, such as $GMM_2$, $GMM_1$, $GMM_0$. Each Global Memory Module, such as $GMM_3$, will have a global system control adapter, GSC 30, having a multicabinet adapter as $26_3$. The GSC bus $B_{10}$ is used for transmitting interprocessor interrupts and transmitting system control information.

Thus, the concept of using Global Memory Modules to couple processors in a network of systems which form a hierarchy of levels provides a number of improvements and advantages for multiprocessor systems. The Global Memory Module concept provides facilities for:

(1) a plurality of processors capable of accessing a common memory within a particular GMM or higher level GMM.

(2) communication between processors by passing messages between processors together with an associated interrupt signal.

(3) putting constraints on any given processor so that it may only access specifically designated areas of a given Global Memory.

(4) the addressing of processors by means of a "name" so that a particular individual processor may be selected; or addressing a processor or processors by name in terms of a "set" from which one or more processors may be selected.

(5) addressing a set of processors in a given system and then selecting among these processors, the "idle" processor member among the set of processors, thus bypassing the selection of those processors which may be "engaged" or those which, while "idle", are still carrying information which will cause them to become engaged.

(6) the confining of communication paths between processors according to the hierarchy defined by their names, that is, names assigned to the processors. Thus, the names given to the processors in a system hierarchy will determine which processors may communicate with each other and which processors may not communicate with each other.

(7) the starting and the stopping of one processor by another processor within the system hierarchy or the network hierarchy.

(8) programmatic control, or the way in which a network installation is configured through the "setting of names", and through the use of memory access control registers in the Global Memory Control (GMC) 20 of the Global Memory Module (GMM) 10.

(9) the automatic detection of any processor which is in an "abnormal state" together with the transmission of a message concerning this condition to other processors which may try to communicate with the "abnormal state" processor.

There are a number of ways in which processors in an installation may be related. Referring to FIG. 6, for example, one processor PID 8840 may be the slave of a processor PID 8820, where processor 8820 is a B 6800 computer and the processor PID 8840 is a data communications processor connected to a Global Memory Module. Or there could be another relationship where the processors 8820 and 8840 are identical and equal processors which can operate "independently" one of the other and wherein one cannot start or stop the other.

Thus, any given processor may be considered to be operating in a different environment according to its relationship to other processors and to the system in which it resides.

In order to better describe the conditions under which a processor operates, the following definitions will be useful for later discussions of the Global Memory Module network hierarchy:

System:—A set of processors that are functionally equal from the point of view of providing some sort of service to a requestor. This set of processors will have the same name and is referred to as a "system". In the preferred embodiment, the Global Memory Module provides for a maximum of 12 processors in a "system".

Equal Systems:—Two systems that "cooperate" but have no direct control of each other.

Installations:—A computer installation would be said to consist of a "set" of coupled systems, that is, a set of systems that can communicate with each other.

Master System:—A system that has the ability to exercise some control over another system is considered to be a "master". The one system may be the master of several systems while at the same time being slave to another system.

Slave System:—A system that can be controlled by another is considered to be a slave system. It can be a slave to one system, while on the other hand being a master to other systems.

As an example of the above definitions regarding "coupled systems", the following examples may be used to more clearly illustrate possible configurations:

I. Referring to FIG. 1, if there are four "equal" Burroughs B 6800 processors ($P_A$-$P_D$) connected by a Global Memory Module 10, and which operate under the control of one operating Master Control Program, then there is formed what may be called a "tightly coupled" system. An external processor to this system, such as $Q_D'$ (having local memory $M_D'$), which is addressing a message to this system does not mind which one of the four processors, $P_A$, $P_B$, $P_C$, $P_D$, is interrupted to provide the service requested; nor is the external processor $Q_D'$ concerned about the number of processors in the system.

II. Referring to FIG. 2A, a Burroughs B 6800 "system Q" consisting of two processors is coupled to another system R over which it has control. Both systems Q and R themselves are "tightly coupled" systems, but the coupling between system Q and system R is "loose". System Q might be managing a large data base and system R might be carrying out all data communication functions for the installation. In this illustration the system Q is the "master" system, while the system R is the "slave" system.

III. Referring again to FIG. 2A, a situation could exist where the Q system was the master, the R system was both slave/master, and S system was a slave. For example, if the processor $S_D$ was a data communications processor connected to a Global Memory, $GMM_o$, and processor $S_D$ was working as a slave to system R which is the master of system S; and at the same time system S is a slave to system Q. The processors in system S, while being members of one system, could execute their own copies of the same code and each be capable of establishing an outward connection or receiving an incoming call over a switched telephone network. System R then addresses system S as a system to have one of its processors dial out, then addresses that processor specifically to transmit blocks of data down the line.

Referring to FIG. 1, the Global Memory Module 10 provides at least four memory interface hubs, L, M, N, P, which connect to global memory storage units (MSU) $10_1$, $10_m$, $10_n$, $10_p$. These physical memory units may be referred to as memory storage modules. Thus, a preferred embodiment of a Global Memory Module in the system will have the capability, through its memory hubs, of connecting to four memory storage modules. These memory modules may be of 384K bytes or even 768K bytes. Each memory module (memory storage unit) is given an identification by means of a two-digit module number which is manually set by the field engineer at the time of installation. This two-digit module number is set in accordance with the following rules:

(a) Each module number associated with a given GMM must be unique.
(b) All module numbers associated with a given GMM must be higher in value than any module number associated with GMM's that have a path to this GMM's requestor ports.
(c) Duplicate module numbers may exist within the system but only so only as rule (b) above is not violated.

Figure 7:
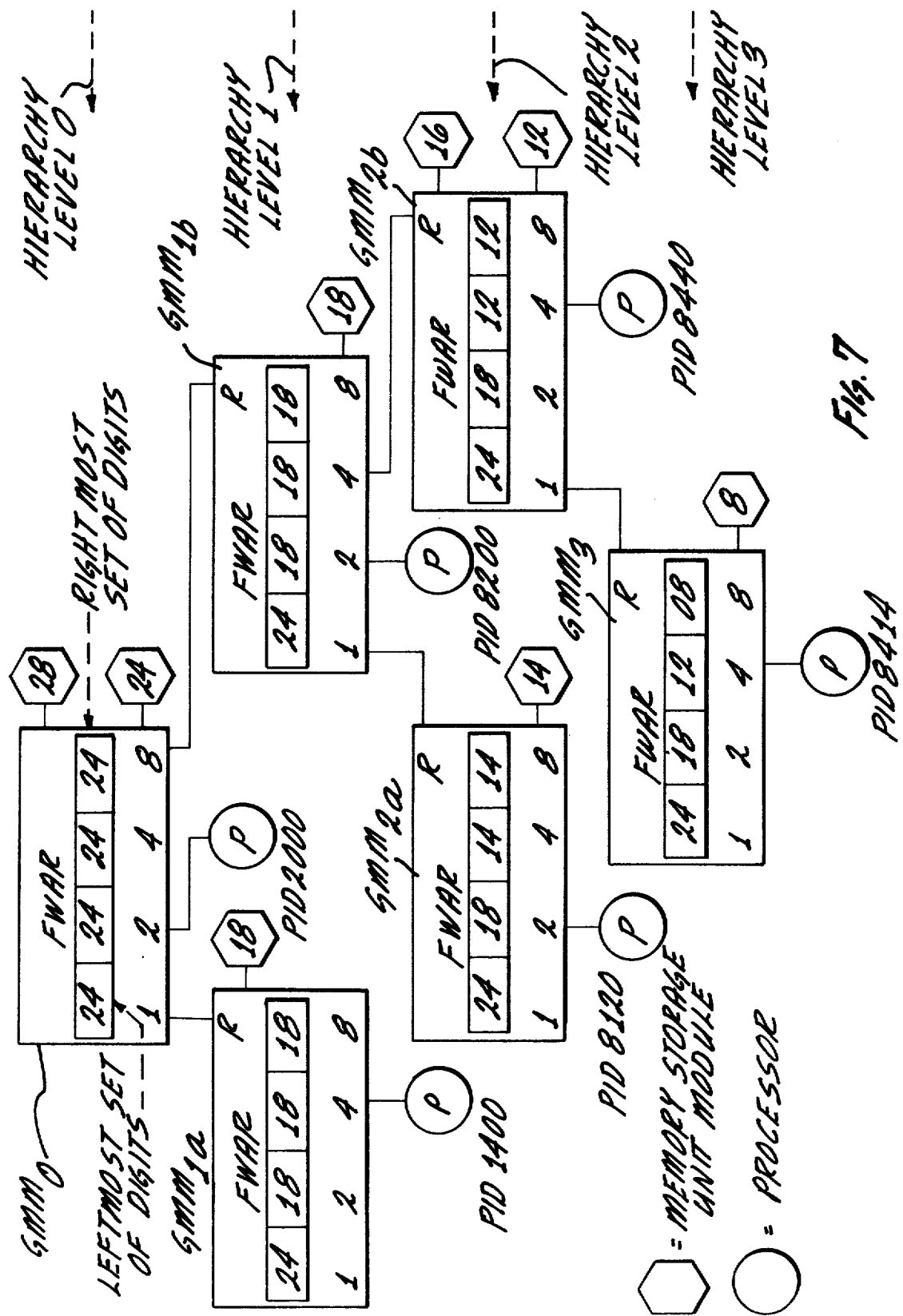
FIG. 7 is a schematic drawing showing global memory modules connected in a hierarchy, and wherein each GMM has a first word address register (FWAR) which identifies the memory modules (memory storage units) connected to it.

Within each Global Memory Module there is provided a global system control GSC adapter 30 which has a first word address register, FWAR, as seen in FIGS. 4 and 7. The FWAR consists of four two-digit fields, which provide a total of eight bits. The FWAR is used to indicate the lowest numbered memory module connected to the particular GMM, and also the lowest module number of the memory storage module (MSU) connected to each higher level GMM that is accessed by this GMM's repeater port.

In the FWAR of $GMM_3$ of FIG. 7, the "leftmost" set of digits indicates the lowest module number connected to the highest level GMM. The "rightmost" set of digits indicates the lowest module number connected to the "level 3" GMM. If there are less than three levels of GMM's in this system, the memory storage unit module number connected to the lowest existing level GMM is repeated in the remaining positions as in $GMM_{1a}$ and $GMM_{1b}$. Thus, the FWAR in each Global Memory Module identifies the memory module hierarchy available to its input requestor ports.

The FWAR is manually set at the time of installation. Neither the memory module numbers nor the FWAR register are changed unless the system is physically changed. FIG. 7 shows an example of how memory modules are identified in the system network. It should be noted that the memory module numbers in any given FWAR are in descending order from left to right, that is, in regard to the hierarchy of GMM's from the highest level 0 down to the lowest level 3. This is in conformity with rule (b) for setting the two digit memory storage module numbers.

In FIG. 2A, the Global Memory Module, $GMM_3$, contains a Global Memory Control (GMC) 20 in order to service requests to memory, and also contains a Global System Control (GSC) 30 in order to service interprocessor control and communications, in addition to enabling the dynamic configuration of the computer systems involved and enabling use of the common memory facilities.

in the preferred embodiment, the Global Memory Module (GMM) 10 of FIG. 2A provides interface input requestor ports for four processors and memory hubs L, M, N, P for four sets of homogenous memory storage modules. It also provides a repeater port $25_3$ for memory bus $C_{10}$ interface to a higher level Global Memory Module ($GMM_2$) and a GSC control port $26_3$ to the Global System Control bus $B_{10}$ for interprocessor communications.

The Global Memory Module 10 has two operating modes, M1 and M2. These are distinguished by the type of request being presented to the Global Memory Module.

Mode 1:—If the request is for a memory access, the Global Memory Control 20 will perform the following steps:
(a) recognize a memory request;
(b) resolve priority in the event of simultaneous requests;
(c) dynamically connect a selected requestor to the repeater port $25_3$ if the requested memory address is not contained in this level of Global Memory;
(d) dynamically connect a selected requestor to the requested memory storage unit, FIG. 2A, and initiate the memory cycle if the address being selected is contained within this level of the Global Memory.
(e) parity check the requestor's address and also the address sent to memory;
(f) check write-data for errors and set the appropriate flags;

(g) check read-data for errors and set the appropriate flags;

(h) generate control signals and error signals to the requestor.

Mode 2:—If the request is for a Scan Operation, the Global Memory Control 20 will perform the following steps:

(a) it will recognize a Scan request and verify that the unit type being addressed is Global Memory (Address Bits [19:4] = 1011). Note: The statement [19:4] signifies that reference is made to the 4 bits 19, 18, 17, 16 and that these 4 bits start at 19;

(b) generate the control and error signals to the requestor.

The Global System Control 30 will:

(c) regenerate the error correction code and check the write-data presented during Scan-Out;

(d) correct single errors on write-data and set the error flags;

(e) perform the operation which is specified in the Scan Word;

(f) generate the error correction code on the message to the receiving unit and send (to the receiving processor) an external or alarm interrupt, if appropriate;

(g) generate the error correction code on the response from the receiving Global System Control, and store the code and the response in the Response Buffer, FIGS. 3, 16;

(h) return information from the Response Buffer on a Scan-In request if the Address Bit [15:1]=0;

(i) return information from the Message Buffer, FIGs. 3, 16, on a Scan-In request if the Address Bit [15:1]=1.

Global System Control Bit:—In FIGS. 1 and 2A there may be seen the global system control bus $B_{10}$. This bus connects each one of the global memory modules to each one of the other global memory modules through the individual global system control adapter 26 in each Global Memory Module. The global system control bit is a digital signal which is passed between each of the global memory module cabinets and between each of the input ports within each global memory module cabinet. The global system control bit is used to determine control of the global system bus, since only one processor port, at any given time, can have control of the GSC bus $B_{10}$.

The GMM cabinet identification number is seen in FIG. 5 as placed in the cabinet number register $28_{cr}$, which is part of the multi-cabinet adapter 26 which connects to the global system control bus $B_{10}$.

The global memory module cabinet identification number (cabinet number) is used only to determine the order in which each of the GMM cabinets will receive the global system control bit. This bit is passed between each of the cabinets and then between the ports within each cabinet, in order to determine control of the global system bus. The GMM cabinet number consists of four binary weighted switches, which are set at the time of installation. The maximum number of GMM cabinets in an installation will generally be limited to 16 cabinets.

Processor Name Structure:—In order to establish the desired relationships among processors and global memories, and to be able to reconfigure the system by software, a processor name structure is established to define processors in this system but which bears no fixed relationships to the physical structure of the system. The processor name structure is an artifical structure which can be determined by the software system.

As can be seen in FIG. 3, the requestor pot has a section designated PT for "processor port adapter", in which there resides a register, PNR, which is the "processor name register" and in which information can reside as to the "name" of a processor being used in the system network.

As seen in FIGS. 9, 8A, 8B, each processor is given a "name" according to the format: N $Q_1Q_2$ Mask. These symbols constitute fields of data in which the entire processor name consists of 24 bits and in which the field N is the "system name", the field $Q_1$ is the first qualifier of this system name, the field $Q_2$ is the second qualifier of the system name, and the field MSK (mask) identifies one of the 12 possible processors within the system. In the preferred embodiment of the network, the design arranges for the capability of 12 possible processors in each system.

The first $Q_1$ and the second $Q_2$ qualifiers of the sytem name identify the "position" of a system in a three-level system hierarchy, FIG. 8A, which are interpreted as follows:

(a) if $Q_1$ and $Q_2$ are equal to 0: the system is at the first level (Top) of the hierarchy.

(b) if $Q_1$ is not equal to 0 and $Q_2$ is equal to 0: the system is at the second level (MID) of the hierarchy.

(c) if $Q_1$ is not equal to 0 and $Q_2$ is not equal to 0: the system is at the third level (BOT) of the hierarchy.

Thus, a system of processors can, as designated by the "processor name", by definition reside at the highest level (first level - top) of the hierarchy, or reside at the second level, or at the third level of the hierarchy; and the very name given to the processor thus indicates in what "system" the processor resides, what its position is in the system hierarchy, and the individual identification number of which one (of up to a possible 12 processors) may be designated.

FIG. 8A shows a schematic representation of how the processor name of FIG. 9 is used to define the "position" of a particular processor in a system, and also the "position" of the system in the system hierarchy. For example, a group of processors in the top level hierarchy are seen to have their $Q_1$ and $Q_2$ qualifiers all equal to 0, and each system will have a separate N (name symbol) identifier to distinguish that particular system from the other systems which are "equal" to it. In addition, each of the separate systems can identify up to 12 separate processors attached to that system by means of the 12 mask bits from 0–11. It will be noted that in the top hierarchy, there are three system names designated as 100, A00, and F00.

Likewise, in the middle hierarchy there are three system names designated A10, AB0 and AF0.

The bottom hierarchy of systems in FIG. 8 are seen to be designated as AB1, AB2, ABE, ABF.

As an example of use and understanding of the processor name, the processor named AB 2-2 (processor having mask bit 2 in the system AB2) is the number 3 processor within system AB2. The system AB2 is "equal" to any other system which has ABx as its system name. Little x is any designation from 1 to F (hexadecimal notation 1-9, A-F).

Additionally, it should be noted that system AB2 is a slave to system AB0. System AB0 is "equal" to any other system which has Ax0 as its system name. Further, the system AB0 is "slave" to system A00.

The system A00 is "equal" to any other system that has x00 as its system name. The systems that have slave systems are defined as "master" systems. A system can be a "master" system, an "equal" system, and a "slave" system all at the same time. The system AB0 of FIG. 8A is just such a system.

Global Commands:—A "sending" processor will scan out a command word in order to execute certain operations upon the system. Such Global command words are used to:

(i) configure the system hierarchy;

(ii) to establish the memory module access restrictions;

(iii) to exercise control of one processor by another; and (iv) to interrogate the global status of one processor by another processor.

A global command word can address the "receiving" processor either by means of (a) its processor identification PID or by (b) the processor name PNR, depending on the type of command word used. A command word consists of 60 bits and is scanned out of the "sending" processor to the Global Memory Module where it is placed in the Response Buffer of the processor port adapter (P$_7$) associated with that particular processor. FIGS. 10A through 10I show the format of the command words scanned out from the sending processor. The bits of each Global Command Word are numbered 0 through 59. Bit 51 is always the parity bit and bits 50, 49, 48 are always the tag bits. Bits 47—40 represent the OP code.

The global system control function operates on the concept that, at any given time, only one processor (one processor port) can be a "sender" and that all other processors in the system are potential "receivers".

The Addressing of Processors and Systems in the Network:—The above mentioned examples of "coupled" systems illustrate the ways needed for systems and processors to address each other. A particular problem that arises within the system is that while the processors in a system may be functionally identical, they still may have different capabilities. This occurs because:

(a) the processors may not be all able to address the same set of peripheral devices, that is, only some processors are connected to the magnetic tape subsystem, for example;

(b) the processors may not have access to the same amount of local memory; and (c) the ways in which the processors are connected to the Global Memory Modules may be different.

Unfortunately, there is no way in which processors within a system can be allocated a "single" hierarchical name or address which will cope with and handle these different requirements and which will enable a processor to refer by name to:

(i) both the subset processors that are connected to a particular GMM and;

(ii) the subset of processors connected to a particular peripheral exchange.

The solution which is adopted thus uses:

(i) one method of addressing for processors "within" systems; and (ii) another method for addressing of processors "between" systems.

In the preferred embodiment of the invention, "systems" are allocated names which reflect the hierarchy to which they belong. For example, in FIG. 8A, the system ABE is the slave of system AB0 which in turn is the slave of the system A00.

A processor "within" a system is identified by a single bit in a processor mask, MSK, FIG. 9, which is then "concatenated" to the system "name". Thus, one processor in a system, say system AB0, can then address a subset of processors by specifying AB0 (MSK) where the bits of MSK, corresponding to each member of the subset, are set to 1; the address, for example, AB0 (11 . . 11) will address "all" the processors in system AB0.

Again referring to FIG. 8A, there is illustrated a large installation together with the "naming" of the different systems and processors. Systems 100, A00 and F00 are "equal" systems and have slave systems A10, AB0, AF0. The system AB0 is then seen to have "slave" systems, such as AB1, AB2, ABE, and ABF.

Communication is permitted within systems, that is, between "equal" processors in a system and also along the lines which indicate the processor relationships of FIG. 8A. For example, the processors of system A00 can communicate only with 100 and F00 and can also communicate with its slave system AB0 which is seen as being "one level" down in the hierarchy. The processors of system AB0 can communicate with its master system A00 "one level" up and AB0 can also communicate with its slaves AB1, AB2, ABE, and ABF which are "one level" down.

It should be noted that a system such as ABE cannot directly communicate with the system A00 or 100 or F00, either for passing messages between programs or for transmitting control commands.

Within the given system, such as for example A00 or ABE, one processor can address another processor by specifying the appropriate bit in the name field; for example in the system F00, the processor number 1 (F00[00--01]) sends a message to processor 2 by specifying address (F00[00--010]).

Now, a processor in the system A00, for example, can send a message to the system AB0 by specifying that "any processor may respond" by setting the processor bit mask to all "1's", for example, AB0 [11--11]. The A00 system may also select a specific processor in the system in the AB0 by setting, for example, only one bit in the processor bit mask, as AB0[00--01].

Global Memory Module Numbers and Processor Numbers:—The global memory module system network provides for a processor to be addressed by its "name" which is set by the program when the system is initialized. Additionally, processors can be addressed by "number". Thus, the identification of a processor and the means by which it can be addressed may be done in two ways, namely:

(i) the "name" of the processor;

(ii) the "number" of the processor.

Thus, as seen in FIG. 8A, the processor can be identified by the "name" which is a combination of the system name (N, Q$_1$, Q$_2$) plus the bit indication of a MASK which is shown in FIG. 9.

On the other hand, the processor "number" is fixed for each particular installation and is formed by concatenating the numbers of the GMM ports traversed by the path from the GMM of the highest memory address to the particular processor it is desired to get the number of.

Referring to FIG. 8B there is shown a hierarchy of global memory modules from the highest level (level 0) through level 1 and level 2. The processors in the network of FIG. 8B are given short system names, such as A001, A002 and B001, B002, etc. The chart at the bottom of FIG. 8B shows the relationship between the "short" system name for a processor, its full name in terms of the bit mask involved, and the "number" of the processor which would be organized according to the numbers of the GMM ports traversed by the path from the highest level GMM to the processor in question.

The ports of each GMM are numbered 1, 2, 4, 8. The "highest" port in the network memory structure is the most significant digit of the processor number.

FIG. 8B thus provides an example of the processor numbers and also the GMM numbers which are formed on this basis. For example, the "most global" GMM is numbered 0000. The first one of the level 1 GMM's in the hierarchy is numbered 1000 since that GMM connects to port 1 of the highest level GMM. Likewise, the level 1 GGM 8000 is numbered as such because it connects to port 8 of the highest level global memory GMM 0000. At the level 2 of the hierarchy it will be seen that the leftmost GMM connects upward to port 1 of the level 1 GMM 1000 and thence to the level 0 GMM 0000 at port number 1. Hence, the leftmost GMM at level 2 is numbered 1100.

Likewise, it will be seen in FIG. 8B that the rightmost GMM 1800 of level 2 connects upward in the hierarchy to port 8 at level 1 and thence to port 1 at level 0; hence, the number 1800 is used as the number for the rightmost GMM.

Thus, FIG. 8B shows three columns entitled "name", "full name", and "number" to show the relationship between the "name" and the "number" of a processor. For example, the B 6800 processor having the short name B004 is connected to the second port of GMM 1800 of level 2. From the circuit it will be seen that its full name is B00 (0--1000) and that its processor number is 1820 since the connection path down from the topmost GMM of the hierarchy is through ports 1, 8, 2 and since there are no further connections, the final digit becomes a zero to form 182 as the number of the processor B004.

In FIG. 8B there is also illustrated a mix of different types of processors in which those marked P may be typically Burroughs B 6800 processors and those blocks marked D may be other types of processors, such as a data communications processor.

Since "systems" were defined as being a set of processors that are functionally equal from the point of view of providing some sort of service to a requester, it will be seen that the group of processors of FIG. 8B, for example, such as A001 and A002, attached to the level 0 GMM form a "system" which is given the name A00.

Likewise, at level 2 we find the processors B001, B002 attached to GMM 1100 are equal to processors B003 and B004 (attached to GMM 1800) to form a group or system of processors of relatively equal service and thus these four processors have been given the system name B00 with the last-numbered suffix to differentiate the different processors within the system B00.

Referring to FIG. 8B to the central schematic sketch therein, it is seen that the primary system A00 is "master" over system AB0 which then is "master" over system ABC and ABD.

Likewise, B00 is another system which is equal to system A00 and system B00 is "master" over system BC0.

Classes of Processor to Processor Communications:—The communications from one processor to another processor in the GMM system network use the global system control GSC 30 and are divided into the following four types of classes:

Class 1: Within (intra):—A "within" system communication command permits a processor to address processors in the same (equal) system.

Class 2: Upward:—An upward communication command permits a processor in a particular system to address processors in that system's master system (one level up).

Class 3: Downward:—A downward communication command permits a processor in a particular system to address processors in "slave" systems (one level down).

Class 4: Across:—An "across" systems communication command permits a processor in an "equal system" to address processors in other "equal systems", that is, a processor in system A00 (FIG. 8B) can send a message to system B00, and the GSC 30 (global system control) will select a processor based on the mask bit of the mask shown in FIG. 9.

Slave systems may also address "across" to other slaves of the same master; for example, a processor in system ABC (FIG. 8B) may address a processor in system ABD.

The "class" of communication that a processor can initiate depends on its position in the hierarchy of the system of which it is a member, and the type of communication that is specified. This is illustrated by the following Table I which shows the communication permitted by the systems A00, AB0 and ABC for the common HEYU command that transmits a message, and also the control command such as HALT, in reference to FIG. 8B.

TABLE I

| Command | Variant | Sender | | |
|---------|---------|--------|-----|-----|
|         |         | A00    | AB0 | ABC |
| HEYU    | Within  | A      | A   | A   |
|         | Up      | D      | A   | A   |
|         | Down    | A      | A   | D   |
|         | Across  | A      | A   | A   |
| HALT    | Within  | A      | A   | A   |
|         | Up      | D      | D   | D   |
|         | Down    | A      | A   | D   |
|         | Across  | D      | D   | D   |

A = Allowed
D = Denied

The GSC 30 determines which "communication command" a particular processor can use. This is done by examining the processor's name. Thus, given a number of the form—N, $Q_1$, $Q_2$—where $Q_1$ and $Q_2$ are qualifiers, the global system control GSC will examine the qualifiers $Q_1$ and $Q_2$ to determine their position in the name hierarchy. Thus, if $Q_2$ does not equal 0 (designated as $\phi$) then the "name" is at the "bottom" of the hierarchy; if $Q_2$ equals 0 and $Q_1$ does not equal 0, then we know that the name is in the "middle" hierarchy. Likewise, if $Q_1$ equals 0 and $Q_2$ equals 0, it is known that the name is at the "top" of the hierarchy. Thus, "trailing" zeroes are therefore significant and a "0" may not be used in $Q_1$ or $Q_2$ if it is not "trailing". 0 BC is a valid name; however, A 0C is not allowed.

Selecting a Processor From a Set of Processors:—When a processor sends a message to a subsystem within its own system or to another system, it normally wants only one processor to respond. The most obvious rule to use in selecting a particular processor in a system is to take the one which is most likely to provide the service requested in the minimum amount of time. However, when a set of processors are all busy, there is no simple way to predict which processor may become idle and available first. Thus, the GSC uses the following processor selection rule as the next best choice:

(a) select the first processor that is "idle", while scanning the processors on a wired-in priority order;

(b) if none of the processors are "idle", select the first processor that has an empty message buffer, that is to say, a processor that is "not engaged";

(c) if all the processors are found to be "engaged", then return an "engaged" response to the processor which was sending the message.

Under some circumstances one processor may want to call all the processors in a subsystem. The difficulty with such a broadcast call is that one cannot ensure that all the processors to be called are "not engaged". To provide a store-and-forward mechanism in the communications hardware would be an expensive proposition, so a compromise solution is used. If one processor addresses a "set" of processors with a HEYALL command, the GSC indicates in its response whether one or more processors were "engaged" and whether one or more processors receive the message. This mode of communication may be used to coordinate processors in a set when reorganizing common memory.

Memory Access:—A GMM has four requestor ports, $R_A$, $R_B$, $R_C$, $R_D$, and one repeater port $25_3$ as seen in FIG. 1. If the memory address bus $M_{10}$, at the requester port presents an address within the range of the memory associated with that particular GMM 10, a memory access cycle is initiated; otherwise, the address is passed out of the repeater port $25_3$ to the next global memory module 10' (GMM$_2$) if such a module is connected in.

In FIG. 1 each of the processors $P_A$-$P_D$ is seen to have local memories $M_A$-$M_D$. The described system network also provides for the connection of such Burroughs B 6000 series processors even when they have no local memory such as $M_A$. However, the normal configuration is the situation where a B 6000 series processor will have its own local memory.

One advantageous feature of the global memory module GMM network is to provide the GMM with the ability to have the processors on the requestor ports related in different ways. Using the notation MC$_{AB}$ for memory common to processors $P_A$ and $P_B$, and using the notation of MC$_{ABCD}$ for memory common to all the processors $P_A$, $P_B$, $P_C$ and $P_D$, it is possible to give several examples of the use of memory storage units of a single GMM which may be described as follows: (Also see FIG. 8C).

(i) MC$_{ABCD}$:—this describes one "tightly" coupled system with one memory area common to each of the processors $P_A$, $P_B$, $P_C$ and $P_D$;

(ii) MC$_{AB}$, MC$_{CD}$:—this describes two independent systems, each system of which is "tightly" coupled whereby there are two areas of memory—one area of memory is common to processors $P_A$ and $P_B$, the other area of memory is common to processors $P_C$ and $P_D$.

(iii) MC$_{AB}$, MC$_{CD}$, MC$_{ABCD}$:—this would represent two "tightly" coupled systems, but which would be "loosely" coupled in regard to their using the memory common to all of the processors.

The arrangement in which one particular processor $P_A$ uses global memory as an extension of its local memory has to be used with caution because of the memory "contention" that could result from processor $P_A$ and its activities. Since a global memory module GMM can be shared by processors in any combination, or used as an extension of a given processor's local memory, then a single global memory module GMM can be used to its fullest in any given equipment configuration, and the amount of memory required to couple other systems can be varied to suit the application that the customer has. Thus, the global memory module can provide (i) a sharing of memory by a group of processors or the global memory can provide (ii) an extension of a processor's local memory; or the global memory module may be (iii) formed in hierarchies such that systems of processors can be coupled together through the global memory modules to form a network wherein processors can communicate upward, downward and sideways to one another to perform tasks in an orderly and efficient manner.

Figure 8D:
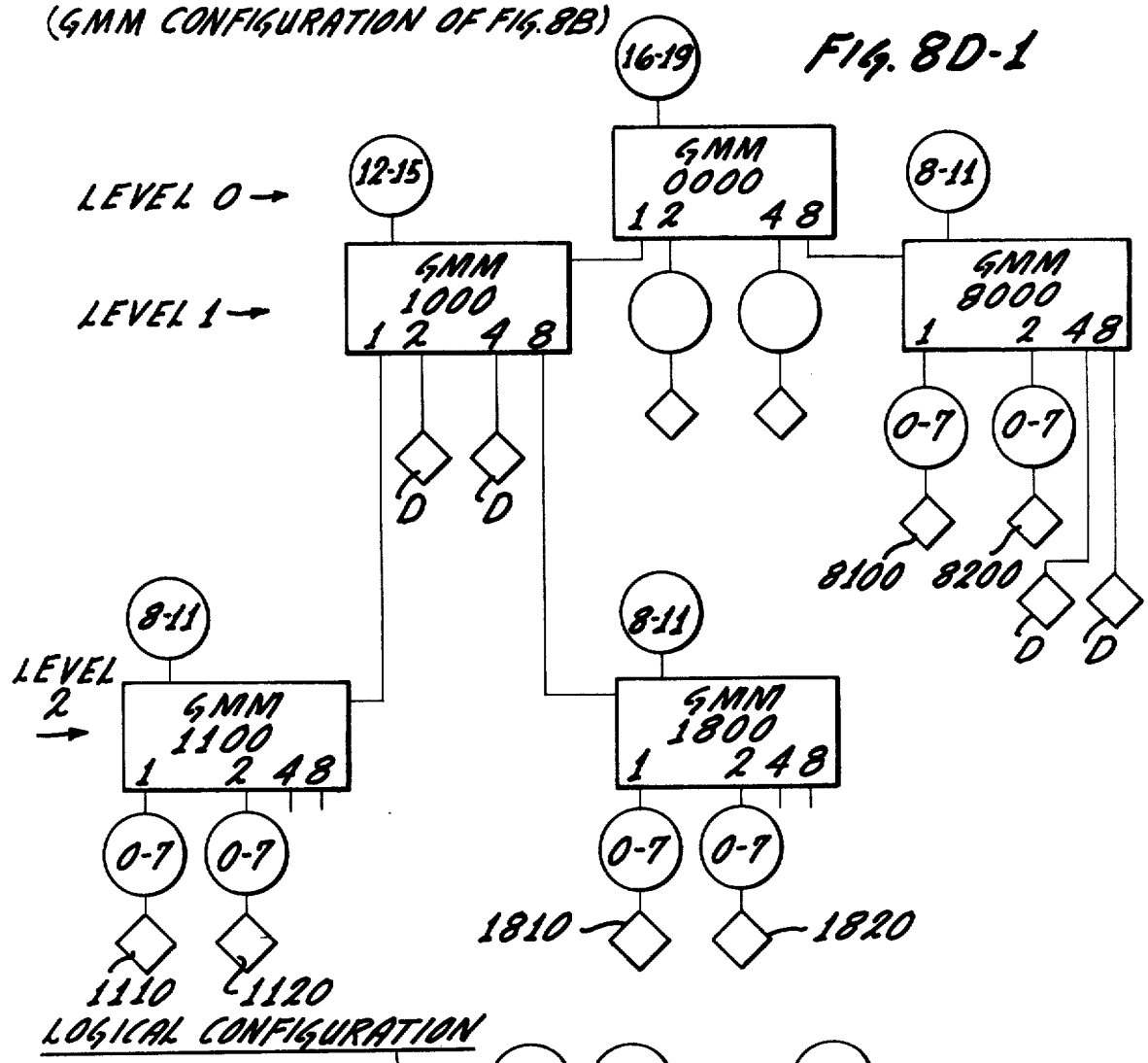
FIG. 8D shows the global memory module configuration of FIG. 8B together with the logical structure and the settings of the access control register.
Figure 1:
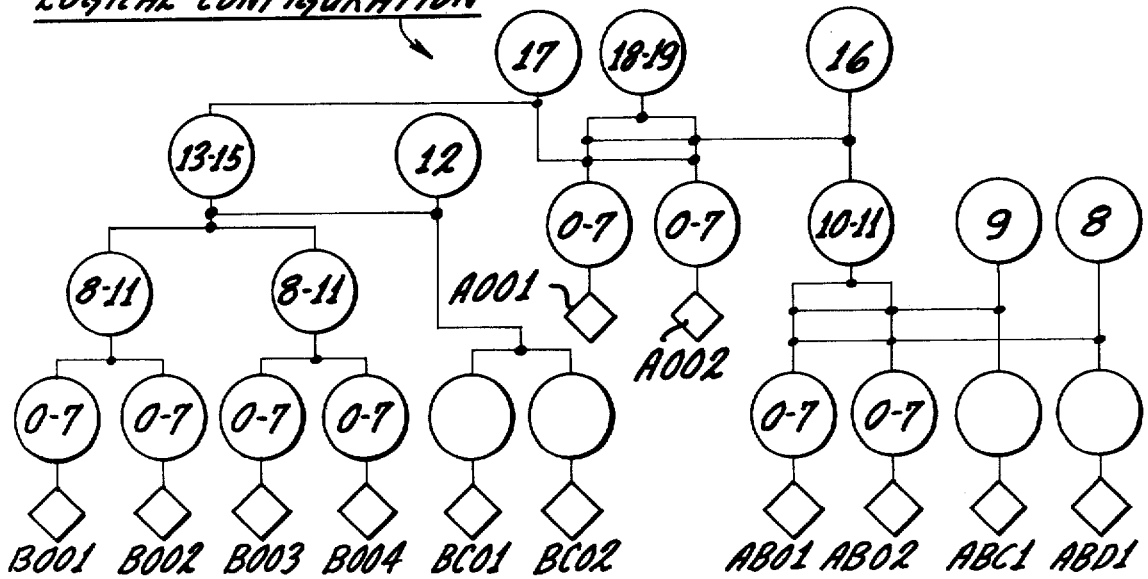
Figure 10A:
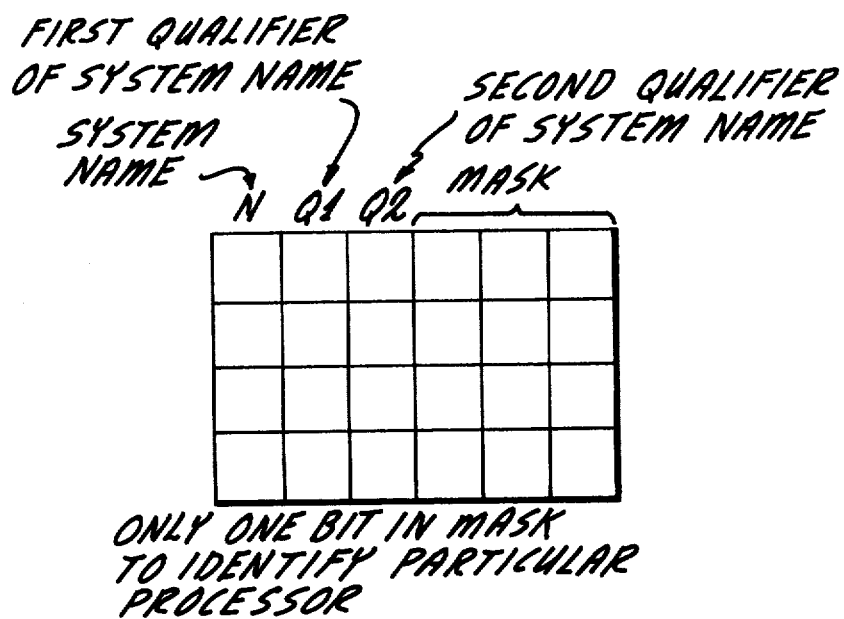

As seen in FIGS. 3, 8C and 8D, the processor port adapter P$_T$ (which resides in each of the four ports of a GMM) is seen to have two access control registers—these are the WACR or write access control register and the RACR, or the read access control register. The "sharing" of memory storage units attached to global memory modules is controlled by these access control registers. For example, the addressing range of the Burroughs B 6000 series computers is considered to consist of 256 logical memory modules, each of 4K words. Then each processor, connected to a GMM, has associated with it, its own particular write access control register (WACR) and its own particular read access control register (RACR), each of which has 256 bit positions corresponding to each of the 256 memory modules.

When a "one" bit is placed in bit position (i) of the WACR, this signal gives "write access" to the processor for the "i"th memory storage unit module, with the least significant bit of the WACR corresponding to i=0. A "zero" placed in a bit position "inhibits" any writing for that particular memory module significated by that bit position.

Similarly, a "one" bit in the bit position "i" will control "read access" to the memory storage unit module number "i". For example, if a "one" bit is placed in bit position 5 of the read access control register, this means that the requesting processor may gain access to "Read" from memory storage module number 5.

Referring to FIG. 8C, Case 1, there is seen a configuration of four processors, each having its own local memory and each of the four processors connected to the four ports of a global memory module. The global memory module has four memory storage unit modules numbered 12 through 15. Over at the right side of FIG. 8C is shown a schematic drawing of the two access control registers associated with each of the processors A1, A2, A3, A4. Each of these processors is seen to have a relationship to its own WACR and its own RACR. As can be seen from the access control registers which have "zero" bit positions, it will be noted that processors A$_1$ and A$_2$ have both "Write access" and also "Read access" to memory storage unit modules 0 through 7 but do not have "Write access" nor "Read access" to memory storage units 8, 9, 10, 11, as seen by the "zero" in the bit positions representing those memory storage unit modules.

On the other hand, it is seen that processors $A_3$ and $A_4$ have complete Read and Write access to all of the memory storage unit numbers 0 through 15, all "1" bits.

Thus, by setting both WACR (i) and RACR (i) to "zero", a processor is denied any access to the module i. This mechanism allows two or more systems to use a GMM while keeping their data fully secure from one another. Two systems may also cooperate in having one system allowing the other system a "Read only" access to a module i. Thus, processors may pass each other data without requiring that it be copied to a memory area to which both have Read and Write access.

Memory Structures:—The method of interconnecting global memory modules results in a tree-like structure for memory in which the interpretation of a memory address M depends on the position of the "requesting" device in the structure. This may be illustrated in FIGS. 8C and 8D. FIG. 8C shows the different logical memory structures that can be represented within one global memory module, GMM. FIG. 8D shows the memory structures and GMM configurations corresponding to the installations shown in FIG. 8C.

In both FIGS. 8C and 8D the settings of the access control registers (ACR's) corresponding to the structures are shown. In these particular figures each memory storage unit is considered as being of 16K size rather than the previously mentioned memory module size of 4K words.

FIG. 8C, Case 2, illustrates four processors having local memory which are coupled as two pairs of tightly coupled systems where processors $A_1$ and $A_2$ form one system and processors $B_1$ and $B_2$ form another system. The access control registers illustrating the bit positions having "ones" or "zeroes" show the amount of access that any given processor has to a given memory storage unit module.

In Case 3 of FIG. 8C there is seen a system A composed of processors $A_1$ and $A_2$ which are tightly coupled systems and wherein this system A is coupled to processors $AB_1$ and $AC_2$ in a "loosely coupled fashion" by the memory modules 8 and 9. As seen in the access control registers, the processor $AC_1$ does not have either Read or Write access to memory storage unit modules 9, 10 and 11.

FIG. 8D, in its upper portion, shows the GMM configuration of FIG. 8B with numbered settings for the memory storage units available.

The lower portion of FIG. 8D shows the logical configuration of this GMM network in terms of the numbering of the memory storage unit modules in relationship to the processors involved in the system hierarchy network. The access control registers are shown for each processor in the system to illustrate what any particular processor may access in terms of the memory storage unit modules.

The structure of interconnecting global memory modules to form a tree-like structure involves certain important factors which are:

(1) The memory addresses in each of the individual memory storage modules connected to any one GMM must be unique, that is to say the same "memory module number" cannot be repeated.

(2) When two or more subsystems are connected by common memory areas, the "starting address" of that common memory area must be higher than the highest address occurring in any of the individual subsystems.

In order that a given processor can deduce or work out the structure of the global memory system to which it is connected, the processor has to be able to determine the following:

(1) which processor identification numbers (PID) address a processor;

(2) the address of the first word of memory in each global memory module.

Thus, a given processor finds which processors are on the system network by using the GSC to execute the ARE YOU THERE operators while specifying processor numbers and then receiving "present or absent" as a response. By generating addresses starting from the ports of the "most global" GMM module, the tree of GMMs is searched from the trunk outward to determine the interconnections in minimum time.

To determine the first word address (FWA) for each GMM that another processor P can see, a processor uses the GSC to read four first-word addresses of six-bits each. These four addresses are held in a 24-bit FWAR, First Word Address Register. The FWAR specifies the first word addresses in terms of, for example, 16K words of memory via a memory module number. The FWAR is "plugged" to a given address when the GMM is installed. There is normally a limit of four levels of GMM to which a processor can be connected.

Hence, by knowing the "first word addresses" and knowing the "processor identification numbers", the system network can enable itself to deduce the interconnection configuration of processors and the configuration of global memory modules. In order to ascertain what memory storage unit modules are connected to a GMM, the processors have to carry out the process of accessing memory and then checking whether the access is successful or whether an "invalid memory address" interrupt is received.

Control of the Memory Configuration:—The ACR, access control registers, together with the "name" registers associated with each of the processors, provide a mechanism for controlling the configuration of a network installation. As the Access Control Registers (WACR, RACR) for a processor will control its access to as many as 256 different memory storage unit modules (only some of which the processor may be permitted to access) the processor cannot be allowed to "unconditionally" set any bits in the access control register. The ability to write "unconditionally" into the bits of the Access Control Registers is made to be restricted to the "maintenance mode" of the global system control GSC 30.

In the "normal mode" processors are able to use the following operators:

(1) Test and Set Mod i:

This command enables a processor to determine whether a memory storage unit module "i" is allocated to another processor or not, and if not, to claim it for its own use. As will be described hereinafter, a mechanism is provided so that software can permit a processor to allocate itself available memory in a controlled manner without competing with other processors.

(2) Transfer Mod i:

A processor with "full access" to a memory storage unit module "i"—can give "full access" to it (memory storage unit module i) to another processor at the same time while giving up any access by itself to this memory storage unit module.

(3) Share Write Mod i:

A processor with "full access" to a memory storage unit module "i" can grant "Read" and "Write" access to it (module i) to another processor while still retaining full access for itself.

(4) Share Read Mod i:

A processor with "full access" to a memory storage unit module "i" can grant "Read" access to it (module i) to another processor while still retaining full "Read and Write" access to itself.

These command operators enable the "memory configuration" of a network installation to be initialized and also reconfigured dynamically by means of software. Once a system is initialized, no processor can take memory away from another, and a processor can only obtain memory by scanning out the "TEST and SET? operator. A processor can ask another processor for access to memory whereupon the request may be granted by the requested processor by action of its scanning out a TRANSFER or a SHARE operator.

A processor may be connected to a GMM while still being "uncoupled" from a programming point of view. This would be the case if the processor wanted to use global memory only as an extension of its own local memory while still retaining the ability to ask another processor for more global memory or to give back to the system what memory it already had.

Identification of Memory Modules:—In a global memory configuration there can be more than one MSU unit (of 4K memory storage unit module) with the "same" module address. This may occur where an installation has multi GMMs.

For example, in FIG. 8D the processors connected to the GMM 1100 will see a set of memory modules 8 to 11, while the processors connected to the system GMM 1800 will see a different set of memory modules 8 to 11. It is, therefore, necessary to be able to uniquely identify MOD i as referred to by a processor in a TRANSFER, SHARE, or TEST and SET operator, and to ensure, for example, that a first processor cannot transfer one memory storage unit module to a second processor which ends up accessing a physically different memory module with the same "i".

Thus, in order to ensure that any given memory storage unit module i is uniquely identified, it is further required that a memory storage unit module i be uniquely identified by the "number" of the GMM in which it resides. This number is equal to the first "L" digits of the processor number, where "L" is the level of the GMM counting from the "most global" GMM as "0". Thus, in FIG. 8D a memory storage unit module 9 connected to the GMM 1100, when referred to by processor 1120 is uniquely identified by—i, the GMM number 1100 and the level number "L" equal 2 to give the processor number=1120.

The value of L (level) for any module i and any processor P can be determined through the GSC 30 hardware by doing a comparison routine by comparing "i" with the first word address register (FWAR) associated with the processor P. When, for example, in FIG. 8D the processor 1110 (sender) (B001) executes an order specifying a memory module i and a receiving processor 1120 (B002), then the GSC 30 (to which processor B002 is connected) transmits—1110, i, and L (equal to 2). The "receiving" GSC 30 may then compute its own value for L (level) and check to see that it is equal to 2, and that the first L (equal 2) digits of its number 1120 equals the first two digits of the "senders" number (1110).

Thus, the number of the GMM is unique and this number is equal to the first L (level) digits of the number of the processors attached thereto. Thus, for example in FIG. 8D, it will be seen that the GMM 1100 is of the "second level" as witness the two significant digits (other than 0) in its number 1100. Likewise, the processors attached to this GMM 1100 will be seen to have their first two digits (11--) equal to the first two digits of the GMM. The digits which define the number of the GMM are found in the Identification Switch Register (IDR) of the GMM associated with a group of processors.

As will be seen in FIG. 8D, the GMM 8000 is seen to have two processors which have processor identification numbers of 8100 and 8200; it should be noted that the first digit "8" of the GMM corresponds to the first digit "8" of each of the two processors, since Level L=1, thus the first digits will correspond.

Likewise, the GMM 1800 is seen to have two processors, 1810 and 1820, each of which has the number 18 as the first two digits of the processor number, since here the level L=2; thus "two" digits will correlate.

System Control:—The GSC 30 provides the capability for a processor to transmit control signals to other processors depending on the "authority" implied by its name of the processor. Thus, signals which a GSC can send to a processor connected to it (after receiving a command via the GSC bus $B_{10}$) are:

(1) HALT:—this command halts the "receiving" processor.
(2) CLEAR:—this command "clears" the receiving processor.
(3) LOAD:—this command initiates the load sequence for the processor concerned.
(4) START GLOBAL:—this command causes a processor to fetch and to execute code by starting at a specified global memory address if it is so designed.

These control signals transmitted from one processor to another processor are transmitted by the "sender" scanning out to the GSC 30 the appropriate command operator and information. The HALT and the CLEAR commands are also transmitted automatically by the GSC to all the processors in a subsystem (that is, those with the same system name) when the "HALT" and the "CLEAR" buttons on the console of a processor in the subsystem are pressed "on". This enables a tightly coupled system to be halted and cleared by a single action.

Global Memory Control (GMC):—As seen in FIG. 2A, the global memory control GMC 20 is a major functional element of the global memory module GMM.

Memory Access:—If a global memory control GMC 20 receives a memory address M, where M is less than or equal to the address of the last word of memory connected to that GMC, then the GMC references the word at the address M. Otherwise, (address M being greater than address of last word in memory) the address M is passed to the repeater port $25_3$ of the GMC 20 of $GMM_3$ over to the GMC of the $GMM_2$, as seen in FIG. 2A. Should the repeater port $25_3$ not be connected to another GMC of another GMM, then an "invalid address" condition is signaled to the requesting device. If the address M is an address in memory which is physically connected to the GMC, but for some reason unavailable, or if the address M is in the range of a "missing" memory module, then an "invalid address" condition will also be signaled.

The memory addresses accessible through a GMC of a GMM are unique, that is to say, two processors connected to a single GMM will reference the same word if they use the same address.

By making the proper electrical connections in a GMC, a specific memory storage unit module (MSU) can be allocated to specific requestor ports such as $R_A$, $R_B$, $R_C$, $R_D$ of FIG. 2A. This permits a processor "without local memory" to be connected to a port and to use a memory module as its module 0, while it and all other requestors remain able to reference the remaining memory on the GMC as global memory. Each of the four requestors, FIG. 2A, can have a different MSU starting at address 0 (in which case all of the MSU are allocated and there are none left for sharing), or else two or more requestors can share the same MSU, starting at address 0 if so desired.

If there are no memory modules (MSU) connected to a GMC, the GMC will act as a repeater station. The B 6800 computer indicates whether an "invalid address" condition occurred in local or global memory.

Control of Access to Memory:—A processor is "constrained" to write in certain specific 4K word modules of memory by the WACR, write access control register, which is associated with the port of the GMM to which it is connected. FIG. 3 shows how each input port has a requestor port adapter R and a processor port adapter PT dedicated to that port which provides a Write Access and a Read Access Control Register. The WACR can be considered an array of 256 bits. If a given bit position "i" in the WACR is set to "0", then the processor is not permitted "write access" to the address space represented by the ith 4K block of addresses. In order to indicate that such access is not permitted, there will be signaled an "invalid address" interrupt signal.

Likewise, a processor may be constrained from "reading" from a 4K word module of memory by means of the RACR, Read Access Control Register. It should be noted that if the WACR (i) is "on", that is to say a one-bit, then the corresponding bit in the RACR will be "on", since the commands operate on the access control registers on the basis that "Write access" implies "full access".

The WACR and the RACR bits 0 through 7 can be considered as being always set to "1". This enables a Burroughs B 6000 series processor with no "local memory" to carry out a load operation to global memory. If the processor has local memory, then the low order bit settings of "1" are of no consequence as the local memory cannot be accessed by another device. As a general rule, the software must assume that "global addresses" start at 32K to avoid any problems with loosely coupled non-B 6000 seires processors using addresses where the WACR is not effective.

Error Detection and Correction:—The GMC 20 carries out error detection, but it only corrects bit 48 so that the "protected write" operation used in the typical B 6000 series computers will function properly. If an error is detected, a signal is turned on and the uncorrected word is delivered to the requestor (or its adapter) where error correction is carried out. For example, the B 6800 computer, on detecting an error, corrects it if possible, but in any event interrupts the processor which may then log the error. Error detection is also carried out on "Write" data. The incorrect data is written into memory and then signals are transmitted to the requestor to indicate whether a single or a multi-bit error was encountered.

Parity checking on the memory address is also carried out by the global memory control GMC 20 and a global address parity error signal is returned with GUEX (Global Uncorrectable Error Signal) to the requestor. On the B 6800 computer this causes an alarm interrupt with the cause indicated as a memory address parity in the interrupt parameter.

Memory Storage Unit Modules:—As seen in FIG. 2A the global memory module $GMM_3$ has a global memory control GMC 20 which provides for the connection of one to four memory storage units (MSU) such as $10_1, 10_m, 10_n, 10_p$. These memory storage units may be of sizes varying from 32K, 64K, or 128K words. Each of the memory words has 60-bits of which 51 are available as information and the remainder of which are used for error detection and correction.

Memory Access Timing:—Each global memory module has its own system clock and the interface between the GMM and the processor is asynchronous. As regards the relationship between the requestor and the GMM, it is required that time synchronization be achieved.

As seen in FIGS. 1 and 2A, the memory bus $M_{10}$ provides an interface between a given processor and the requestor port of a global memory module.

The following Table II defines the signals and acronyms for communications between the processor and its global memory modules:

TABLE II

SIGNALS AND ACRONYMS BETWEEN A GMM AND A PROCESSOR CONNECTED THERETO

| |
|---|
| The Memory Bus Information and Control Signals used between the requestor's memory control logic and the Global Memory Module are as follows: |
| GA00 THROUGH GA19 |
| Global Address - Twenty lines from the requestor to specify $2^{20}$ Memory word locations or to specify the unit type and operation for use with Scan Commands to the Global System Control. |
| GI00 THROUGH GI59 |
| Global Information - Sixty bidirectional lines consisting of 48 information, 3 tag, 1 parity and 8 check bits. This information will be stored and retrieved from a memory location specified by the Address when doing a memory operation or will be used to command the Global System Control when doing scan operations. |
| GMMA |
| Global Memory Module Available - If the Global Memory Module is available for use by the requestor attached to this input port, the GMMA signal will hold true. It indicates to the system or another GMM connected to this port that requests can be directed upward. |
| GREQ |
| Global Request - The signal is sent from the requestor to the GMM to indicate that an access is being requested. The address (GA00–GA19), |

TABLE II-continued
SIGNALS AND ACRONYMS BETWEEN A GMM AND A PROCESSOR CONNECTED THERETO information (G100-G159), and the control signals (GAPL, GWRC, GPRC, GCWC and GSCX) on the interface bus are valid. The GREQ signal should be dropped when the requestor receives Global Access Begun (GABX) or when the request is aborted. (Also see FIG. 20).

GSCX
Global Scan Control - When sent from the requestor, this signal specifies that the request is for a SCAN cycle. This signal must be valid during GREQ time.

GAPL
Global Address Parity Level - This signal is an ODD Parity bit for GA00-GA19, GREQ, GWRC, GPRC, GCWC, AND GSCX. It is sent from the requestor and is used within the Global Memory Module to help determine if an Address Error is present. This signal must be valid during GREQ time and must be dropped when GREQ is turned off.

INVA
Invalid Address - If during a request (GREQ), the Addressed Location being specified is not present or available, an INVA will be returned to the requestor. The GMM will drop INVA on the clock following GREQ going false.
The maximum access time to any memory will be less than 200 useconds. Any Request taking greater than 200us should be aborted.

GWRC
Global Write Request - This signal is sent from the requestor to specify that it is requesting a Read/Modify/Write cycle for the Memory word specified by the Address. The read information from that Address location will be returned to the requestor and the write information that was present on this bus will be stored in that same location. The write cycle may be aborted and the read information restored to the address location if this was a protected write request and the word in memory was protected or if there was an address or control error. GWRC must be valid during GREQ time.

GPRC
Global Write Protect Control - This signal, sent from the requestor to the GMM, requires that the Write portion of the Read/Modify/Write cycle being requested should be aborted if the information in the location specified by the address is a protected word. A protected word will have GI48 on. If the write is aborted the information is restored to the memory. The requestor must monitor the read information being returned to determine if the cycle was aborted. GPRC must be valid during GREQ time and must be dropped when GREQ is turned off.

GCWC
Global Clear Write Control - This signal is sent by the requestor to the GMM.
If the request is for memory, it specifies that this is a Clear Write cycle. No read information will be returned. GUEX will indicate if the cycle was aborted due to an error.
If this request is for a Scan cycle, it specifies SCAN OUT operation.
GCWC must be valid during GREQ time.

GABX
Global Access Begun - This signal is sent to the requestor from the GMM to indicate that the requested operation has begun. The requestor is then expected to turn off his request (GREQ), the write information that has been on the Global Information lines, the Global Address Parity level (GAPL), and the Write Protect Control signal (GPRC). GABX will remain true throughout the remainder of the cycle.

GAOX
Global Access Obtained - This signal is sent to the requestor to indicate that Read Information and Error signals are now on the Global Interface lines for a SCAN cycle. For a MEMORY cycle, this signal is sent to the requestor to indicate that the Read Information will be available on the GMM interface 180 nsecs later as measured on the GMM end. The Error signals with the exception of Read Errors will be available at the same time as Read Information. (Also see FIG. 20).

GAOR
Global Access Obtained Return - This is a return signal from the requestor indicating that it has received GAOX and it has captured the Read Information and Error signals presented to it from the GMM. This signal will cause the GMM to drop GAOX and GABX indicating the completion of the cycle. The requestor may drop his GAOR when it sees that GAOX and GABX have dropped.

GAEX
Global Address Error - This signal is sent to the requestor to indicate the GMM detected an Address Parity Error from the requestor or an Address Error in the Memory Module. For a SCAN cycle, this signal is valid during GAOX time. For a MEMORY cycle, this signal will be valid 180 nsecs after the leading edge of GAOX as measured on the GMM end of the interface.

GREX
Global Read Error - This signal is sent to the requestor indicating that the information read from memory was in error. If GREX is on and GUEX is

TABLE II-continued
SIGNALS AND ACRONYMS BETWEEN A GMM AND A PROCESSOR CONNECTED THERETO false it indicates that a single bit data error has been detected. If GREX and GUEX are both on it indicates a multiple bit error has been detected in the Read Data. GREX will be valid 300 nsecs after the leading edge of GAOX as measured on the GMM end of the interface.

GWEX

Global Write Error - This signal is sent to the requestor indicating that the information presented to the GMM on a Memory Write cycle or a SCAN OUT was in error. If GWEX is on and GUEX is false it indicates that a single bit data error has been detected. If this is sent during a SCAN OUT, the bit will be corrected by the GMM. If GWEX and GUEX are both true, it indicates that a multiple bit error has been detected on the Write Data being presented. If this is a SCAN OUT, the scan cycle will be aborted. GWEX will be valid during GAOX time of a SCAN cycle. For a MEMORY cycle, GWEX will be valid 180 nsecs after the leading edge of GAOX as measured on the GMM end of the interface. (Also see FIG. 20).

GUEX

Global Uncorrectable Error - This signal is sent to the requestor to indicate that an uncorrectable error has been detected by the Global Memory Module. If true, any write cycle to memory or any scan cycle will be aborted.

GUEX is sent upon detection of multiple bit information errors in both scan and memory cycles in addition to control and address errors. GUEX will be valid during GAOX time for a SCAN cycle. For a MEMORY cycle, GUEX will be valid 180 nsecs after the leading edge of GAOX with the exception of a read multiple error in which GUEX will be valid 300 nsecs after the leading edge of GAOX as measured on the GMM end of the interface.

RMNT

Requestor in Maintenance Mode - This signal is sent by a GMM (through the repeater port) to a higher GMM during a request cycle to indicate that the requestng unit has its memory in "maintenance mode" switch, on the GMM maintenance panel, in the maintenance position.

GNCL

Global Network Clear (IN) - This is a manually generated incoming signal that will clear all GMM cabinets that are in the Maintenance Enable mode.

GMCL

Global Network Clear (OUT) - This is the same as GNCL but is going OUT of the GMM cabinet.

EVST

Event Stop - This is a line on the interface dedicated to passing any signal between the units. An example of its use would be to pass a stop condition signal generated in one unit to the other unit so that both units could use that signal to stop themselves.

PROCESSOR STATUS AND CONTROL SIGNALS

The following System Control Signals are used between a Global Memory Module and a processor.

HALT

Halt - A signal to the system to cause the processor to Halt. This signal will be held true until HLTD is returned.

HLTD

Halted - A signal from the system indicating that the processor is Halted.

CLER

Clear - A signal to the system to cause the system to General Clear. This signal will be held true until CLRD is returned.

CLRD

Cleared - A signal from the system indicating that the clear line internal to the system has been raised. This signal should be true a minimum of 300ns and a maximum of 450ns.

LOAD

Load - A signal to the system to cause the system to Load from the Halt/Load disk or primary unit. This signal should only be accepted by the system when the processor is Halted. This signal will be true for a minimum of 300ns and a maximum of 450ns.

STRT

Start Global - A signal sent to the system indicating that a Command Word has been placed in the Message Buffer. This signal will remain true until the Message Buffer is read.

SHLT

Super Halted - A signal from the system indicating that the processor is in an abnormal state. In the B 6700 and B 6800 processors this signal is "Superhalt". This signal will remain true as long as the condition exists.

IDLE

Idle - A signal from the processor indicating it is in an Idle Loop.

RUNG

Running - A signal from the system indicating that the processor's running flip-flop is set.

EINT

External Interrupt - A signal from the GSC to the system causing an

TABLE II-continued
SIGNALS AND ACRONYMS BETWEEN A GMM AND A PROCESSOR CONNECTED THERETO external interrupt. This will not be recognized if the processor is in Control State. This signal will remain true until a SCAN IN of the Message Buffer is performed by the processor or the processor is halted.
AINT
Alarm Interrupt - A signal from the GSC to the system that will cause an interrupt, even if the system is in Control State. This signal will remain true until a SCAN IN of the Message Buffer is performed by the processor or the processor is halted.
SAVL
System Available - A signal from the system indicating that the system is present and powered up.

---

The maximum read access time for a word in global memory will be in the value of approximately 2n+5 clocks where n is the number of GM's on the access path. This, of course, would apply only when there is no "contention" between requestors and where the cable lengths are relatively short (30 feet or less) and the memory storage unit modules have a read access time of 3 clocks.

As an example, the B 6800 computer with a 6.67 MHZ clock, the local memory is accessed with a Read in order to yield data in 3 clocks or 450 nanoseconds. Again using the same memory and clock frequency for the GMM, the following access times would result for accessing memory through a single GMM:

| Function | Read Access Clocks | | Cycle Clocks | |
|---|---|---|---|---|
| | Min | Max | Min | Max |
| Read | 5 | 7 | 7 | 12 |
| Clear/Write | — | — | — | 10 |
| Read Modify Write | 5 | 7 | 8 | 12 |

Global Memory Control, GMC 20:—The Global Memory Control, GMC 20, provides for the servicing of simultaneous requests to different memory modules on successive clocks, thus enabling multiple memory cycles to proceed in a time-multiplexed manner. "Contention" between requestors is resolved on a port priority basis and access is guaranteed to "low" priority requestors ahead of a "second access" for a high priority requestor.

The Global Memory Control 20 of FIG. 2A can accept requests for: Read/Restore, Clear/Write, and Read/Modify/Write operations. The R/M/W cycle may even be a "protected" write. Memory Module Address Recognition: When a requestor calls for a memory access, the requester sends out: a request signal; a memory address; command signals that describe the operation, and (for WRITE commands) a data word.

The memory address consists of a memory module selection portion which specifies one of a plurality of memory storage unit modules ($10_l$, $10_m$, $10_n$, $10_p$) and the word part specifying a desired word location within the selected memory storage unit module.

The Global Memory Control 20 accepts all incoming requests for memory and it analyzes the associated address. The MSU module portion of the address is compared with a corresponding identification assigned to each memory unit. If the comparison indicates that the memory area being requested is in a "higher" GMM, as $GMM_2$, and the request is not inhibited by the Global System Control, the request will be passed on to the repeater port $25_3$, FIG. 2A.

If the repeater port $25_3$ is engaged, then the request is placed in a Repeater Queue associated with the port. If the comparison is successful, and if the memory module is available and the memory request is not inhibited by the Global System Control 30, the GMC 20 passes this request on to the appropriate memory storage unit MSU.

If the MSU is engaged, the request is then placed in a Queue. At the same time that the address comparison is being performed, the upper eight (8) bits of the address are routed to the GSC's Write Access Control Register (WACR) and to the GSC's Read Access Control Register (RACR). These registers, as seen in FIG. 3, are part of the global system control GSC 30 and its ports, as $PT_{1, 2, 4, 8}$ of FIGS. 2A and 3.

If the requested access is a "Write" command and the bit (in the WACR) corresponding to that portion of memory designated by the upper eight (8) bits of the address is zero, then the request to memory is inhibited. If the requested access is a "Read" command and the bit in the RACR (corresponding to that portion of memory designated by the upper eight (8) bits of the address is zero, then the request to memory is inhibited.

The signal INVA (Invalid Address) will be returned back to the requestor if the module specified is not present and not available, or if the request is inhibited by the Global System Control 30.

Priority Resolution:—The Global Memory Control 20 upon recognizing an incoming request will forward the request to the "Request Queue" for resolving priority. If simultaneous requests are received for an idle memory storage unit module or for the repeater port 25, when it is not engaged, the selection of the requestors is done on a "low-to-high port number" basis; that is to say, the port which has the lowest number will get the highest priority. If the requested memory storage unit module is "busy" or if the repeater port is engaged, then the requests are set into a FIFO (first-in first-out) queue. Simultaneous requests to enter the queue are also dealt with on the basis of the lowest port number first.

Operation Timings:—The Global Memory Control 20 coordinates the sequence of signals between the requestors and the memory storage units for the purpose of compensating for hardware element delays, and for minimizing the access time for the requestor.

Memory Cycle Time:—This is the time required by the memory storage unit to complete a Read or a Write operation. The memory cycle time is strictly a function of the particular memory used, and is a measure of the minimum allowable interval between two consecutive "Initiate Memory Cycle" signals which are sent to a memory storage unit.

The "Initiate Memory Cycle" signal:—This is generated by a variable delay clock pulse so that adjustments can be made for differences in memory cycle times. Simultaneous requests to a particular memory storage unit module are handled one cycle at a time. Simultaneous requests to different memory storage units are sequentially multiplexed to the use of the Global Memory Control hardware environment and memory cycles of such requests are initiated at a maximum rate of 1 per 6.67 megahertz clock peroid (150 nanoseconds).

Memory Access Time:—This is the time required by a MSU Memory Storage Unit to obtain the READ data from its storage elements and is measured at the MSU connector. It is the time between the arrival of the Initiate Cycle signal and the subsequent availability of the READ data. Memory Access Time is again strictly a function of the type of memory used.

Requestor Access Time:—This is the time elapsed between the requestor system clock pulse initiating a memory request and the system clock pulse strobing in the associated Read information from the memory. The requestor access time is the function of the memory access time, the length of the requestor cables to the GMM, the length of the memory cable, the various element delays present in the path, the element delays present in the signals generated within the GMC 20 and the particular mode of operation.

Error Detection and Correction:—The Global Memory Control 20 performs the following types of error detection and correction:

1. Addressing Errors:—Addressing errors are detected and stored for indication on a requestor port and on a memory hub basis. If there is an addressing error, the GMC 20 performs (or causes to be performed) a Read-Restore cycle only. Address parity is checked during request time (GREQ). If an address parity error is detected: (Refer to FIG. 20)

(a) an address parity error flag for that requestor is "set".

It is reset by manual, general, or power-up clear only.

(b) a GUEX (Global Memory Uncorrectable Error) signal and a GAEX (Global Address Error) signal are sent to the requestor during the time designated as GAOX.

An "Address Compare" is performed at the beginning of the memory cycle. A MSU Memory Storage Unit is required to generate a parity bit and compare it to a parity bit that is generated within the GMC 20. If an error is detected:

(a) an Address Compare Flag for that requestor is "set". It is reset by manual, general or power-up clear only. The cycle is then aborted to a Read-Restore cycle.

(b) the signals GUEX and GAEX are returned to the requestor during the GAOX time.

(c) an Address Error Flag for the memory storage unit being accessed is "set". It is reset by manual, general or power-up clear only.

2. Memory Read Data Errors:—The Global Memory Control 20 provides for error correction of bit 48 of the Read information. Each time information is read from memory, the GMC 20 regenerates check bits, and performs a comparison with those bits received from the memory. Two types of errors may be detected: (a) signal bit errors and (b) (b) multiple bit errors.

Detection of these errors is inhibited if the memory cycle is an "unprotected write" or if it is a clear-write cycle.

If a "single bit" error is detected by the GMC 20:

(a) correction is carried out for bit 48 only. Uncorrected information is placed on the requestor bus and restored in memory.

(b) a single bit read error flag for the memory module is "set". it is reset by manual, general or power-up clear only.

(c) a GREX signal is returned to the requestor during GAOX time.

(d) a partial word address (used for component isolation), a module flag (indicating which module) and a value corresponding to the failing bit within the word are stored in a latch. This latch is changed only by manual, general or power-up clear or a subsequent error.

Multiple bit error detection: All double, and certain multiple-bit errors may be detected by the GMC 20. If a multiple bit error is detected:

(a) erroneous data may be sent to the requestor.

(b) the GUEX and GREX signals are returned to the requestor during the GAOX time if the cycle was a Read/Restore or was a "Protected Write".

(c) a Multiple Bit Read Error flag for the memory module is "set", subject to manual, general or power-up clear only.

3. Memory Write Data Errors:—The Global Memory Control 20 provides for error checking of the Write-data presented by the requestor. Two types of errors may be detected. These are (a) single bit errors and (b) multiple bit errors.

Single bit error detection: If a single bit error is detected by the GMC 20, then:

(a) a single bit Write error flag for the requestor is set. It is reset by manual, general or power-up clear only.

(b) a GWEX (Global Write Error) is sent to the requestor during GAOX time.

Multiple bit error detection: If a multiple bit error is detected, then:

(a) a mutiple bit write error flg for the requestor is set. it is reset by manual, general or pwer-up clear only.

(b) the GUEX and GWEX signals are returned to the requestor during the GAOX time.

Global System Control (GSC):—The Global System Control GSC seen in FIGS. 2A, 2B is incorporated in the Global Memory Module 10 and communicates with the processors $P_A$, $P_B$, $P_C$, $P_D$ via the memory bus cables $M_{10}$. The GSC 30 of FIGS. 2A, 2B, 3, 4 includes preferably at least four processor ports, $PT_1$, 2, 4, 8, each port being dedicated to a particular processor connected to it. Thus, each processor port of the GSC 30 will be seen in FIGS. 3, 17 to contain a Response Buffer, FIG. 3 (also 115 of FIG. 23), which is used for temporary storage of a SCAN-OUt word, or for the storage of a response word therein; furthermore, each processor port of the GSC contains a Message Buffer, FIG. 3, which is used to store a message for a "Receiving Processor", that is to say, a processor which is receiving commands, information or data from another "sending" processor.

To send a message to a Receiving Processor" (also see FIG. 17), the Sending Processor scans-out a 60-bit word containing: a command for the GSC 30, the address of the Receiving Processor, and a message to the Receiving Processor's Response Buffer. If the command is valid and the Receiving Processor's Message Buffer is "empty", the GSC places the (i) message from the Sending Processor; (ii) the command code, and (iii) the identification of the Sending Processor, in the Receiving Processors's Message Buffer, in addition to "interrupting" the Receiving Processor.

After recognizing the interrupt signal, the Receiving Processor scans-in the contents of its own GSC Message Buffer (which is then available to receive a further message). When the message has been placed in the Receiver's Message Buffer, a response word is placed in the Sender's Response Buffer. The Sending Processor can then scan-in the "response word". Should the Receiving Processor be engaged, or the command scanned-out be invalid, then this is indicated in the Response word. Some commands to the GSC do not follow exactly this particular mode of operation, for example, the Receiving Processor is now always interrupted, and this is indicated in the particular cases involved in the hereinafter discussed description of the commands involved.

Each GSC 30 is connected to the Global System Control bus $B_{10}$, as seen in FIGS. 1 and 2A. This bus is time-multiplexed so that each processor connected to it through the GSC is granted the opportunity to use the bus. When granted access to the GSC bus, a Sending Processor transmits a name or number of the Receiving Processor followed by 60-bits of information which includes "check bits". The Sending Processor then reads the Receiving Processor's Response Word, if any, from the GSC bus $B_{10}$. (Also refer to FIG. 17).

The Global System Control 30 interfaces to the GSC bus $B_{10}$ in such a way that if the particular GSC is powered-off or inactive, it will in no way affect the other GSC's on the bus.

The message transmission rates will depend on the number of processors in an installation, on the number of processors simultaneously attempting to send messages and also the type of response generated by the receivers. The time taken for "n-processors" to transmit once each, were they all ready to transmit at the same time, is of the order of 0.6nxn+5.4n microseconds.

The GSC uses error detection and correction techniques on a one-bit "correct", multiple-bit "detect" basis. The command word scan-out by a processor is checked by the particular GSC which also generates a new check-field for the word transmitted to the Receiving Processor's GSC. This is checked by the Receiving Processor when the "message word" is scanned-in. The sending GSC also generates a check-field for the response word that it assembles.

The Global System Control 30 of FIGS. 2A and 2B may accept: a "SCAN-IN" from the Requestor Processor for information contained in its Message Buffer (FIG. 3); a SCAN-IN for information contained in its Response Buffer, FIG. 3: or a SCAN-OUT. The SCAN-OUT will present a "command" to the Global System Control 30 that the Requestor wishes to be performed. The Global System Control also monitors the "status" of the Requestor and may use this information to initiate its own commands. If the Scan-Out command may cause information to be placed in the Message Buffer of a receiving unit, an interrupt may then be sent to that processor if the processor is running. The interrupt line is dropped when the message is read.

Scan Address Recognition:—When a Requestor calls for a Scan cycle, it presents, on the address lines of the requestor bus, an address for the Global Memory Module (address bits [19:4]=1011); for SCAN-OUT, or for SCAN-IN from the Response Buffer, the address bit [15:1]=0; for the SCAN-IN from the Message Buffer, the address bit [15:1]=1. The Global Clear Write Control (GCWC) signal from the Requestor will be true for a Scan-Out command. Detection of a valid Scan Request will initiate the cycle. An invalid address will cause the INVA signal to be sent to the Requestor.

Scan-Out:—During a SCAN-OUT request a 60-bit word is presented to the Global System Control 30. Upon detection of a valid SCAN-OUT command, this word is stored in the Response Buffer, FIGS. 3, 17. Any previous information that was in the Response Buffer is over-written. The format for the SCAN-OUT word is shown herein, in Table III, as follows:

TABLE III

| | SCAN-OUT WORD FORMAT | |
|---|---|---|
| Bits | 59:8 | Error Correction Code |
| | 51:1 | Word Parity Bit |
| | 50:3 | Tag Bits (000) |
| | 47:6 | Operation Code |
| | 41:2 | Variant Bits |
| | 39:24 | Information |
| | 15:16 | Receiver Address |

The SCAN-OUT word is modified when it is transmitted to a receiver. The Receiver Address field [15:16] is replaced by the Sender Address.

The Sender Address or the Receiver Address may be a processor identification number (PID) or part of the name that is specified in the processor's name register, PNR, in FIG. 3. Upon completion of the operation which was specified in the Operation Code [47:6] a response indicating the results of the operation is stored in the Response Buffer. This may include information from a Global System Control Register, described hereinafter.

The "response word" has one format for when the communication is successful and a second format for when it is not successful. The two formats which differ in the field 11:8 are seen in Table IV, as follows:

TABLE IV

| RESPONSE WORD: TWO FORMATS | |
|---|---|
| Format 1: No transmission parity problem (2:1 = 0) | |
| Bits | 59:8 Error Correction Code |
| | 51:1 Word Parity Bit |
| | 50:3 Tag Bits (000) |
| | 47:6 Operation Code of the SCAN-OUT |
| | 41:2 Variant Bits |
| | 39:24 Information from Register Read |
| | 15:1 On Interrupt Pending |
| | 14:1 On WACR Set by Test and Set |
| | 13:1 On Time Out Waiting to Receive |
| | 12:1 On Receiver could not see Module i |
| | 11:1 On Receiver's RACR (i) = 1 and WACR (i) = 0 Off Receiver's WACR (i) = 1 (For TEST and SET i Command) |
| | 10:1 On Receiver's Port Lock-Out Switch On or SAV (System Available) Off |
| | 9:1 On Receiver's Dependent Bit Set |
| | 8:1 On Receiver's Lock Register Set |
| | 7:1 On Receiver Super Halted |
| | 6:1 On Receiver Halted |
| | 5:1 On Receiver Running |
| | 4:1 On Receiver Engaged |
| | 3:1 On Response Received |
| | 2:1 On Transmission Parity Problem |
| | 1:1 On Invalid Command, Illegal Path or LR ≠ 1 |
| | 0:1 On Unsuccessful Communication |

TABLE IV-continued
RESPONSE WORD: TWO FORMATS

Format 2: Transmission Parity Problem (2:1 = 1)

Bits  11:3 Spare
      8:1 On Sender Detected Parity Error in Response
      7:1 On Two or More Receivers Detected a Parity Error in Response
      6:1 On Some Receiver Detected a Parity Error in Response
      5:1 On Two or More Receivers Detected a Parity Error in Message
      4:1 On Some Receiver Detected a Parity Error in Message Scan-In Response:—A valid Scan-In Request for information from the Response Buffer causes the Global System Control 30 to pass the contents of the Response Buffer to the requestor processor during the GAOX time of the scan cycle. If the Response Buffer does not contain a response word, then bit 0:1 is set to 1 and bits 50:50 are set to 0.

Scan-In Message:—A valid Scan-In request for information from the Message Buffer causes the Global System Control 30 to pass the contents of the Message Buffer to the requestor processor during the GAOX time of the scan cycle. The interrupt line is then dropped and the receiver is marked as "not engaged". If the Message Buffer does not contain a valid message, then bit 0:1 is set to "1" and bits 50:50 are set to "0".

Global System Control Registers:—Within each Global System Control adapter unit, such as GSC 30 of FIGS. 2A, 2B, 3, 4, there are a set of registers, some of which are associated with each processor port adapter $PT_1$, $PT_2$, $PT_4$, $PT_8$ and some with the GSC alone. Thus, each input port of FIG. 3 will have an associated set of registers within the Global System Control 30 which are uniquely dedicated to that input port. These input port registers in the GSC shown in FIG. 3 are the:

1. PNR—Processor Name Register
2. LR—Lock Register
3. DSR—Dependent Status Register
4. WACR—Write Access Control Register
5. RACR—Read Access Control Register Other registers associated with the GSC 30 are:

6. The Processor Identification Register PIDR
7. The Single Bit Error Register—SBER
8. First Word Address Register—FWAR.

These registers of the Global System Control 30 may be briefly described as follows:

1. The Processor Name Register, PNR, is a 24-bit register, which is set and read by software commands. It is cleared by power-up or general clear. The format for the Processor Name Register, PNR, is: (Also see FIG. 9)

23:4: System Name [N]
19:4: First Qualifier [$Q_1$]
15:4: Second Qualifier [$Q_2$]
11:12: Processor Mask.

The Processor Name Register, PNR, is considered valid for any values of the System Name and Qualifiers. If the Processor Mask [11:12] has one (and only one) bit set, the first and/or second Qualifiers are used to identify dependent sub-systems and to determine which names a Processor can generate as addresses through the Global System Control.

The name field, shown in FIG. 9, N, $Q_1$, $Q_2$, determines the position of a Processor or a system in a hierarchy of systems. Examples of a Processor or System Names are:

| Fields = | N | $Q_1$ | $Q_2$ | |
|---|---|---|---|---|
| | A | O | O | is at the top of the hierarchy |
| | B | B | O | is subordinate to A O O |
| | A | B | C | is subordinate to A B O. |

(A, B and C are arbitrary designations used for this example).

The Sender Processor's position in the hierarchy determines which receiving Processor the sender can address, as will be discussed hereinafter.

2. The Lock Register is a 1-bit register and is used for initializing a system. A system is a group of Processors having the same name [23:12]. A Lock Register is set by software commands. It is reset by software commands, also, when the Processor is cleared or loaded or by power-up or by general clear. The LR = 1 indicates that the contents of the PNR are valid.

3. The Dependent Status Register, DSR, is a 1-bit Register set and reset by software commands. This register being set will enable a dependent sub-system to accept the Manual Halt and Manual Clear commands. It is reset by power-up or by the general clear commands.

4. The Write Access Control Register (WACR) is a 256-bit Register which is set and read by software commands. The Register is cleared by the software naming commands, and when this Processor is cleared or loaded, or by power-up or general clear, then bits 0 through 7 of this Register will always be set to 1.

Each bit of the WACR Register represents a 4K word block of memory. When a bits is 0, it denies Write Access to that portion of memory when addressed by the upper eight bits of the Memory Address [19:8].

5. The Read Access Control Register (RACR) is a 256-bit Register set and read by software commands. The Register is cleared by software naming commands, when the Processor is cleared or loaded, or by the power-up or by general clear. The bits 0 through 7 of this Register will always be set to 1.

Each bit of the Read Access Register represents a 4K word block of Memory. When a bit is 0, it then denies READ access to that portion of memory when addressed by the upper eight bits of the Memory Address [19:8]. The ith bit of the RACR will be "true" if the corresponding bit of the WACR is set.

6. The Processor Identification Register, PIDR, is a 16-bit field representing the physical location of the requestor within the total network.

7. The Single Bit Error Register (SBER) is an 8-bit Register and will be set to indicate which bit of the SCAN-OUT word was in error, and which Processor Port Adapter initiated the checking. This register is changed by the manual, general, or power-up clear, or by a subsequent error.

8. First Word Address Register: There is one common Register in the Global System Control, GSC 30, which is shared by all the Requestor Ports. This is called the First Word Address Register, FWAR. The FWAR is a 24-bit Plug-On. It is separated into four 6-bit fields. Each field is jumpered to represent the lowest physical memory storage unit module address present at each of the four possible levels of the Global Memory Modules. Bits [23:6] will represent the highest level (level 0); bits [17:6] represent the second level down;

bits [11:6] represent the third level and bits [5:6] represents the lowest level. If there are less than four levels of Global Memory Modules, then the lower field or fields will be set equal to the value of the lowest present memory storage unit module.

One significant feature of the Global Memory Module System network is that a particular memory storage module (designated as "i") can be shared with another processor. The identification of which memory modules can be shared is accomplished by using the information in the First Word Address Register (FWAR) and the information in the processor identification register, PIDR. As seen in FIG. 4, these two registers are part of each Global Memory Module, and reside in the Global System Control adapter 30 of each Global Memory Module.

FIG. 7 shows a hierarchy of Global Memory Modules having processors P connected to certain input ports of each GMM. A hexagonal symbol having a two digit number within, on FIG. 7, indicates the memory module member (i) associated with a particular Global Memory Module. Thus, in FIG. 7, by knowing the value of FWAR and the value of the PIDR, any Processor can determine if a specific memory module (i) can be shared with another processor. This is done in the following manner: (assuming that a "first" processor wishes to determine if a particular memory module (i) can be shared with a "second" processor).

(a) The particular module member (i) is compared with the FWAR of the GMM connected to the second processor to determine the level at which the second processor finds module (i). Thus;

(b) If the module number (i) is equal to or greater than the first two digits of the FWAR, this would mean that the memory module (i) could be shared by two specific processors and would be located at the "level zero" GMM.

Thus, in FIG. 7, taking as the first processor, the processor having the identification of PID 1400 in relationship to the processor having identification PID 8200 and wanting to know what memory module (i) these processors are capable of sharing, then by using (a), and (b) above, and observing module number 18 of GMM$_{1a}$ and module 18 of GMM$_{1b}$, the module number "18" is not equal to or greater than the first two digits "24" of the FWAR of GMM$_{1a}$ and GMM$_{1b}$; thus, the module number 18 in each of these GMM's of the first level can not be shared by processor 1400 and processor 8200.

However, if looking at the memory modules No. 24 and 28 of the level zero, Global Memory Module GMM$_o$, it is seen that the module numbers 24 and 28 are equal or greater than the first two digits "24" of the FWAR of GMM$_{1a}$ and GMM$_{1b}$, thus per the above rule (b), then the memory modules 24, 28 of GMM$_o$ located at the level zero GMM are capable of being shared by the processors PID 1400 and PID 8200.

(c) If the memory module number (i) is "less" than the "first" two digits of the FWAR, but equal to or greater than the "second" two digits of the FWAR, then the module (i) is capable of being shared by the two processors and is then known to be located at the "level one" GMM.

Thus, referring to FIG. 7, the memory module 18 of GMM$_{1b}$ is found to be equal to the "second" two digits (18 of FWAR of GMM$_{2a}$). Thus, per rule (c) it is now known that the shareable module (i) is located at the "level 1" GMM and is shareable by processors PID 8120 and PID 8200.

(d) If the memory module number (i) is "less" than the second two digits of the FWAR (of the second processor involved) but the module number (i) is equal to or greater than the "third" two digits of the FWAR, then the shareable memory module (i) would be located at the "level 2" GMM.

Thus, memory module number "16" of GMM$_{2b}$ is less than the second two digits (18) of the FWAR of GMM$_3$—but is greater than the "third" two digits (12) of the FWAR of GMM$_3$; thus, the shareable module (i), where i equals module 16, has to be located at the "level 2" GMM and is shareable by processors PID 8440 and 8414.

(e) If the memory module number (i) is "less than" the third two digits of the FWAR, but is equal to or greater than the "fourth" two digits of the FWAR, then the shareable module number (i) must be located at the "level 3" GMM.

Thus, in FIG. 7, the memory module number 8 of GMM$_3$ has a module number of "8" which is less than the third two digits (12) but equal to, or greater than, the "fourth" two digits (08) of the FWAR of the GMM$_3$. Thus, taking as a "first" processor the processor PID 8440 and considering what memory module number can be shared with another "second" processor PID 8414, then by rule (a) and by rule (e), it will be seen that the memory module number 8 of GMM$_3$ cannot be shared by both processors PID 8414 and PID 8440.

However, another factor is made to enter the situation to determine whether two processors (of a first and second processor) can share a given memory module (i). Here the "level" of the memory module location is used to determine the number of PID digits that must "match" in order for the two processors to share the given module. Thus, the following conditional rules prevail:

(a) If a memory module is at "level 0" (highest level global memory module), then any two processors involved can share this memory module regardless of their respective processor identification PID's.

Thus, in FIG. 7, the processor PID 2000 and processor PID 1400 can share the memory modules 24 and 28, which reside at level 0 in GMM$_o$.

(b) If a memory module is at "level 1" location, then processors can share them if the first digit of their respective PID's "match".

Thus, in FIG. 7, the memory module 18, which is at the "level 1" of GMM$_{1b}$, can be shared by processors PID 8200, PID 8120, PID 8440, PID 8414—since each of these processors have the first digit (8) of their respective PID's "matching" each other.

(c) If a memory module is at "level 2", then the processors which can share this memory module are determined by whether the first "two digits" of their respective PID's "match".

Thus, in FIG. 7, the memory modules number 16 and number 12 reside at "level 2", and it is seen that the processor PID 8440 and the processor PID 8414 actually have the first "two digits" of their PID numbers matching (84); thus, the two processors PID 8440 and 8414 can share the level 2 memory modules number 16 and number 12.

(d) If a memory module is at "level 3", then the processors which can share this memory module must meet the requirement that the first "three" digits of their respective PID's actually "match".

Thus, in FIG. 7, the processor PID 8414 is capable of using memory module number 8 in GMM$_3$; however, since no other processor is seen to have the first three digits of 841, then there is no other processor available to share the memory module number 8 with the processor PID 8414.

OPERATION CODES

The Global System Control 30 will perform operations as specified by the Command Field [47:6] of the SCAN word. These commands are separated into five (5) classes of operations:

Class 1: Interprocessor Messages Operations Addressed by Partial Name
Class 2: Interprocessor Control Operations Addressed by Partial Name
Class 3: Initialization Operations No address Specified
Class 4: Processor I.D. Addressable Operations Address by Processor I.D.
Class 5: GSC Initiated Operations Invoked by GSC Only Each class has restrictions pertinent to that class, and the receiver's address specified in the SCAN word, bits [15:16], will be interpreted differently depending on the sender's name.

The commands and the returned responses are transmitted between the sending and receiving units via the GSC Bus $B_{10}$. If a GSC Bus Parity error is detected in a Receiving GSC, that Receiving GSC will not complete the command and will return a GSC Bus Parity response. That Receiving GSC is also considered "engaged" when doing priority selection where more than one Receiving Unit has been specified.

If the sending unit detects a bus parity error in the response when a TRANSFER i command has been transmitted, the WACR of the sender is not reset.

CLASS 1: INTERPROCESSOR MESSAGES OPERATIONS

Processors are specified by a Partial Name. The sending unit will specify a 4-bit System Name or Qualifier, a 12-bit Mask, and a 2-bit variant to determine direction.

Var=00: within the system or subsystem
01: up to next higher subsystem
10: down to next lower subsystem
11: across systems (different system or subsystem name)

By having a processor specify a 16-bit partial name as the receiver address, and indicating the direction of the communication by the variant bit of the command, restriction can then be placed on its communications. The GSC uses the sender's PNR to build the total 24-bit name that is sent for the receiver's address. The example below illustrate the way the mechanism works.

| Sender Name | | | Variant | Partial Address Specified | | Address Transmitted By GSC | |
|---|---|---|---|---|---|---|---|
| (Fields) | N | $Q_1$ | $Q_2$ | | | | |
| | A | B | 0 | Down | C | MSK | ABC MSK |
| | A | B | 0 | Across | D | MSK | AD0 MSK |
| | A | B | 0 | Up | — | MSK | A00 MSK |
| | A | B | 0 | Within | — | MSK | AB0 MSK |

Receiving GSC's will compare the transmitted address against its own PNR.

The sending processor must have a valid name and its Lock Register set (LR=1) for any Class 1 operations.

The receiver, in order to accept these commands, must have a valid name and its LR set.

The state of the 1st and 2nd Qualifier in the sender's address will invoke the following restrictions:

| Variant | 1st Q = 0 2nd Q = 0 | 1st Q. NE.0 2nd Q = 0 | 1st Q. NE.0 2nd Q. NE.0 |
|---|---|---|---|
| 00 (within) | Allowed | Allowed | Allowed |
| 01 (up) | Denied | Allowed | Allowed |
| 10 (down) | Allowed | Allowed | Denied |
| 11 (across) | Allowed | Allowed | Allowed |

(NE means "not equal")

Those operations that are denied will return an "INVALID COMMUNICATION" response to the SCAN-OUT.

For Class 1 commands, even though a processor may specify itself in the address, for example, with MSK having all ones in a HEYU within, it is excluded from being a receiver.

The following are Class 1 commands:

| TYPE | OP CODE |
|---|---|
| HEYU | 000001 |
| HEYALL | 000010 |
| ARE YOU THERE (PN) | 000011 |
| WHERE ARE YOU | 000100 |
| TRANSFER i | 000101 |
| SHARE WRITE i | 000110 |
| SHARE READ i | 000111 |

CLASS 2: INTERPROCESSOR CONTROL OPERATIONS

Class 2 operations use the same addressing as Class 1 operations.

The sending processor must have a valid name and its Lock Register set (LR=1).

The receiver in order to accept these commands must have a valid name and its LR set.

In Class 2 operations, the following restrictions are invoked:

| Variant | 1st Q = 0 2nd Q = 0 | 1st Q. NE.0 2nd Q = 0 | 1st Q. NE.0 2nd Q. NE.0 |
|---|---|---|---|
| 00 (within) | Allowed | Allowed | Allowed |
| 01 (up) | Denied | Denied | Denied |
| 10 (down) | Allowed | Allowed | Denied |
| 11 (across) | Denied | Denied | Denied |

Those operations that are denied will return an "INVALID COMMUNICATION" response to the SCAN OUT.

For class 2 commands even though a processor may specify itself in the address, it is excluded from being a receiver.

The following are Class 2 commands:

| TYPE | OP CODE |
|---|---|
| HALT | 111000 |
| CLEAR | 111001 |
| LOAD | 111010 |
| START | 111100 |
| ZAP | 111101 |

CLASS 3: INITIALIZATION OPERATIONS

Class 3 operations do not specify a Receiving Address. These commands are executed by the Global System Control of the sending processor. The sending processor must have the LR states as indicated below where 0 represents not set, 1=set and "—" means dont't care.

The following are Class 3 operations:

| TYPE | OP CODE | LR |
|---|---|---|
| I AM | 010000 | 0 |
| WHAT IS MY NAME | 010001 | — |
| WHAT IS MY NUMBER | 010010 | — |
| RESET MY LR | 010011 | 1 |
| TEST AND SET i | 010100 | 1 |
| SET MY DSR | 010101 | 1 |
| RESET MY DSR | 010110 | 1 |
| RESET MY ACR | 010111 | 1 |

CLASS 4: PROCESSOR I.D. ADDRESSABLE OPERATIONS

Processors are addressed by a 16 bit number. The sending processor must have a valid name and its Lock Register set (LR=1) for the YOU ARE command only.

The following are Class 4 commands:

| TYPE | OP CODE |
|---|---|
| READ ACRi | 001001 |
| READ FWAR | 001010 |
| ARE YOU THERE (PID) | 001011 |
| WHO ARE YOU | 001100 |
| YOU ARE | 001101 |
| READ SINGLE BIT ERROR REG. | 001110 |

CLASS 5: GSC INITIATED OPERATIONS

Class 5 operations may only be invoked by the Global System Control. They are used for System Control or reporting abnormal conditions.

The processor associated with the sending and receiving GSC must have a valid name and its Lock Register set.

The following are Class 5 commands:

| TYPE | OP CODE |
|---|---|
| MANUAL HALT | 110000 |
| MANUAL CLEAR | 110001 |
| NOT RUNNING | 110010 |
| SUPER HALTED | 110011 |

OPERATION CODE DESCRIPTIONS

The following 30 items, numbered 1 through 30, are descriptions of the operations that may be executed by the Global System Control.

The message words transmitted to receiving units will contain the Sender's PID in the Sender Address field [15:16] for all operations except:
1. HEYU
2. HEYALL
3. LOAD
4. START
5. ZAP
6. YOU ARE.

For these commands a partial name is transmitted in the Sender Address field as illustrated by the following example:

| Sender's PNR | | Sender's Address | |
|---|---|---|---|
| A00 | MSK | A | MSK |
| AB0 | MSK | B | MSK |
| ABC | MSK | C | MSK |

(1) I AM

This a class 3 command. If the processor's lock register is reset, the GSC will use the 24 bits from the information field of the scan word as the name to be written into the PNR. Before the writing is done, the first 12 bits of the name are compared with all other valid names. If a comparison is not found, the name is written into the PNR. An equal comparison or the sender's LR being set, will cause an "Invalid Communication" response to be placed into the Response Buffer. The unit responding is given the sender's PID and its processor is interrupted. The successful completion of this command causes the WACR and RACR for this requestor to be cleared (except bits 0 and 7) and the LR set.

If any unit detects a GSC bus parity error, the setting of the sender's PNR and LR are inhibited. The Response word will indicate the parity error.

(2) YOU ARE

This is a class 4 command. The sending unit must be initialized, that is, its name must be valid and its LR set. This command is addressed to a processor by a Processor I.D. as specified in the Receiver Address field of the Scan Word and is used in naming an uninitialized processor. The sending unit will specify a Qualifier and a Mask in bits [31:16] of the Information field and a Variant in bits [41:2]. The GSC will use class 2 restrictions to determine the remaining portions of the name to be inserted. These remaining portions are taken from the sender's PNR. The total 24 bits of the name are then written into the Receiver's PNR. The receiver's LR must be off. If the receiver's LR is set or an invalid name is specified, an "Invalid Communication" response is returned. Successful completion of this command causes the receiver's WACR and RACR to rest and its LR to set.

(3) HEYU

This is a class 1 command. If the sending unit is initialized, the GSC will send the information field of the scan word to the Message Buffers of the processors being addressed by the Receiving Address field. The Processor Mask is used to identify all the processors within the addressed group that are allowed to accept this message. One of the processors out of the group is selected to be interrupted. This is done on a "first idle" processor and if none are idle the "first not engaged". Engaged indicates that the receiver's Message Buffer is occupied. The selected processor will then receive an external interrupt. The receiving units must be initialized (valid name and LR set). If all processors are engaged, an ENGAGED Response will be returned.

(4) HEYALL

This is a class 1 command. It functions identically to the HEYU command except all processors specified in the Processor Mask will be interrupted if they are not engaged. The response placed in the sender's Response buffer will indicate if any one or more processors received the command and if any one or more processors were engaged. If a receiver detects a GSC bus parity error, the bus parity bit in the Response buffer is set and the command flagged as unsuccessful. The receiver detecting the parity is considered to be engaged. Any receiving GSC not detecting the bus parity error will still interrupt their processor if they are not engaged.

(5) ZAP

This is a class 2 command. If the sending unit is initialized, the GSC will send the information from the scan word to the processors identified in the Receiver Address field. All processors identified will be interrupted. The receiving unit must be initialized. An Alarm Interrupt is sent to the processor, and if the receiving processor is engaged, the pending message is overwritten, and the External Interrupt line turned off.

(6) SET MY DSR (Dependent Status Register)

This is a class 3 command. If the unit is initialized, this command will cause the GSC to set the Dependent Status Register.

(7) RESET MY DSR (Dependent Status Register)

This is a class 3 command. If the unit is initialized, this command will cause the GSC to reset the Dependent Status Register.

(8) RESET MY LR

This is a class 3 command. This command causes the GSC to reset the sender's Lock Register. This will cause the clearing of the Sender's WACR and RACR.

(9) HALT

This is a class 2 command. If the sending unit is initialized, the GSC will send a Halt to all the processors specified by the Processor Mask. The receiving units must have their LR set. If a dependent subsystem has its DSR set, it will also respond to the command.

(10) CLEAR

This is a class 2 command. This command functions the same as HALT, but causes the receiving units to be cleared. This also clears the receiver's LR, WACR and RACR.

(11) LOAD

This is a class 2 command. This command functions the same as HALT, but causes the receiving units to "LOAD". This also clears the receiver's LR, WACR and RACR.

(12) START

This is a class 2 command. If the sending unit is initialized, the GSC will send to all the units specified in the Receiver Address field of the Scan Word the information contained in the information field. This information is placed in the Message Buffers and the receiving GSC's will transmit to the processor the START SIGNAL.

(13) ARE YOU THERE (NAME)

This is a class 1 command. If the sending unit is initialized, the GSC will send this command to all units specified by the Receiver Address field of the Scan Word. One processor will be selected on a Left to Right priority basis and the GSC will return a status code indicating the state of the receiving unit. This status code will be placed in the sending unit's Response Buffer. This command will not interrupt the receiving processor.

(14) ARE YOU THERE (PID)

This is a class 4 command. The command functions in a similar way to ARE YOUR THERE (NAME) except the Receiver is specified by the Processor Identification number. The sending unit does not have to be initialized. A requestor may address itself to determine its own status.

(15) WHERE ARE YOU

This is a class 1 command. If the sending unit is initialized, the GSC sends this command to all units specified in the Receiver Address field of the Scan Word. One processor is selected on a Left to Right priority basis. The Receiving GSC will then return the PID of the selected processor to be placed in the Response Buffer.

(16) WHO ARE YOU

This is a class 4 command. This command functions in a similar way to WHERE ARE YOU except the command is routed to a receiver by a Processor Identification Number and that Processor's Name is returned. If the Name is Zero, a Zero is returned. The sending unit does not have to be initialized.

(17) WHAT IS MY NAME

This is a class 3 command. The GSC will return to the Response Buffer the contents of the PNR.

(18) WHAT IS MY NUMBER

This is a class 3 command. The GSC will return to the Response Buffer the value of the PID.

(19) TRANSFER i

This is a class 1 command. If the sending unit is initialized, the GSC uses bits [32:8] of the Scan Word as the index to the WACR. The bit of the WACR is verified as being set and the GSC computes the level at which this logical module (4K words of memory) resides. The command is then sent to the processors specified in the Receiver Address field. One of these is selected on a "first idle", "first not engaged" basis. The Receiving GSC then verifies that this logical memory module is common to both the sending and receiving units. If the module is not common or if the sending unit did not have write access to the memory, an "Illegal Communication" response is returned. Successful completion of this command causes the receiver's RACR and WACR to be modified, giving access of the logical memory module to the receiving processor. The receiving processor, if it is running, is then interrupted. The sending GSC will reset the bits in the sender's WACR and RACR, denying further access to the module.

(20) SHARE WRITE i

This is a class 1 command. It functions the same as a TRANSFER i command except the sending GSC does not reset the associated bit of the sender's WACR and RACR.

(21) SHARE READ i

This is a class 1 command. It operates in a similar way to the SHARE WRITE i command. If the sender's RACR(i) is on, the RACR(i) for the receiving unit is set, allowing read access.

(22) RESET MY ACR i

This is a class 1 command. This command will cause the GSC to reset the sender's WACR i and RACR i, denying any further access to the specified Logical Memory block.

(23) TEST AND SET i

This is a class 3 command. If the sending unit is initialized, the GSC uses the bits [23:8] of the scan word as the identification of a logical module of memory. This value is used to index all WACRs and RACRs of the units that are common to that memory area. If any initialized unit has WACR i set, the PN for that unit is returned. If more than one have WACR i set, one will be selected. If no units are found with WACR i set but one or more have RACR i set, the PN of one of those units is returned and bit 11 of the response word is set to one.

The sender's WACR i and RACR i are set to one if one units were found with their WACR i set. Bit 14 of the response word will be set true.

The response word will indicate a successful operation only if there were no errors and no units were found with WACR i or RACR i set.

If the response work is marked as unsuccessful and bit 14 if off, the PN contained in the Response word [39:24] is the name of a unit with WACR i set. If bit 14 is on in the response word, the name is of a unit with RACR i set.

If any unit detects a GSC Bus Parity error, the setting of WACR and RACR is inhibited and the response word marked to indicate the parity error.

(24) READ SINGLE BIT ERROR REGISTER

This is a class 4 command. The GSC routes this request to the unit as specified by the Receiver Address field of the Scan Word, returning the contents of the Single Bit Error Register to the Response Buffer of the sending unit.

The Single Bit Error Register contains a six (6) bit code for a single bit error that was reported to the requester during a scan command and a two bit field to indicate which port in the GSC was performing the scan-out check.

(25) READ FWAR

This is a class 4 command. The GSC will route this request to the unit as specified by the Receiver Address field of the Scan Word, returning the contents of the FWAR to the Response Buffer of the sending unit.

(26) READ ACR i

This is a class 4 command. The command is routed to the unit specified by the Receiver Address field. Bits [23:8] of the scan word is then used to access the receiver's WACR and RACR. The contents of WACR i is placed in bit [25:1] and the contents of RACR i is placed in bit [24:1] of the response word.

(27) MANUAL HALT

This is a class 5 command. If the unit is initialized, the GSC, upon detecting that the processor is halted will send a Halt command addressed to all other units using the processor's System Name and 1st and 2nd Qualifiers as the Receiver Address. All units having the same name will then be halted by the Global System Controls. Subsystems one level lower will also be halted if their Dependent Status is set.

(28) MANUAL CLEAR

This is a class 5 command. It functions the same as Halt but will cause receiving units to clear.

(29) NOT RUNNING

This is a class 5 command. If the unit is initialized, the GSC, upon detecting that a processor is not running (RUNNING/and HALTED/) will use the unit's PNR to generate an address to inform another processor that the unit has failed. The command will be sent to all processors with the same name and one will be selected on a "first idle", "first not engaged" basis. If all other processors are engaged, the command will be retransmitted. The PID of the failing unit will be placed in the Message Buffer of the Receiving Unit and the receiving processor interrupted. If the failing processor is designated as part of a dependent subsystem, this command is addressed to the next higher level.

(30) SUPERHALTED

This is a class 5 command. It functions the same as NOT RUNNING but informs the receiving processor that the failing unit is Superhalted and will send an Alarm Interrupt (AINT).

Status Lines:—Each processor in the system provides "status lines" which the GSC 30 monitors. The status lines include the following:

(1) Idle
(2) Running
(3) Super Halted
(4) Halted

The "idle" status is used by the GSC 30 in selecting a processor from the set addressed by a HEYU command. If a processor stops running or get into a super halted state, the GSC automatically transmits a message to the master system; or in the case where the system has no master (that is to say, a name of the form AOO) the GSC will automatically transmit a message to a processor in the same system.

If a global memory module system deduces that one of its processors (or a processor in a slave system) is stuck in a "control" state, then the processor can send a message via the GSC 30 which causes an "alarm interrupt" designated as ZAP. This causes an overwrite of the receiver's message buffer.

System Initialization:—Each GMM system installation requires initialization which involves the starting up of the processors and the systems, including setting up the access control registers, the name registers and the other registers in the global memory module. Hardware circuitry and devices are provided to assist the software in doing its job of initialization. These hardware circuits and devices provide the following functions:

(i) When a processor names itself or names another processor, the name allocated must be unique. The GSC 30 hardware will check to see that this is the case. The GSC also checks to see that the name has only one bit in its MSK field (FIG. 9).

(ii) A Lock Register (LR) is associated with each processor and resides in the processor port adapter $P_T$ of each of the input ports shown in FIG. 3. The lock register is used to coordinate processors during initialization to ensure that only one processor in the set representing a system can do the initialization work for the system.

Sending Actions:—Referring to FIGS. 2B, 3 and 17, which show the Response Buffer and the Message Buffer of the processor port adapter $P_T$, a processor port, such as $P_{T1}$, becomes a "Sender" when its Response Buffer has received a command scanned out from a processor, such as seen in FIGS. 2B and 11A, where the processor can scan out a signal into the input port. A scan-out command (SORB), or a processor condition (PCON) is detected and the global system control bit is placed in the particular port involved. The global system control bit is passed through the input ports in a sequential order within the GMM cabinet, that is—1, 2, 4, 8, and then is passed in sequential order (by cabinet number) between the GMM cabinets, as illustrated in FIG. 11A.

Figure 11B:
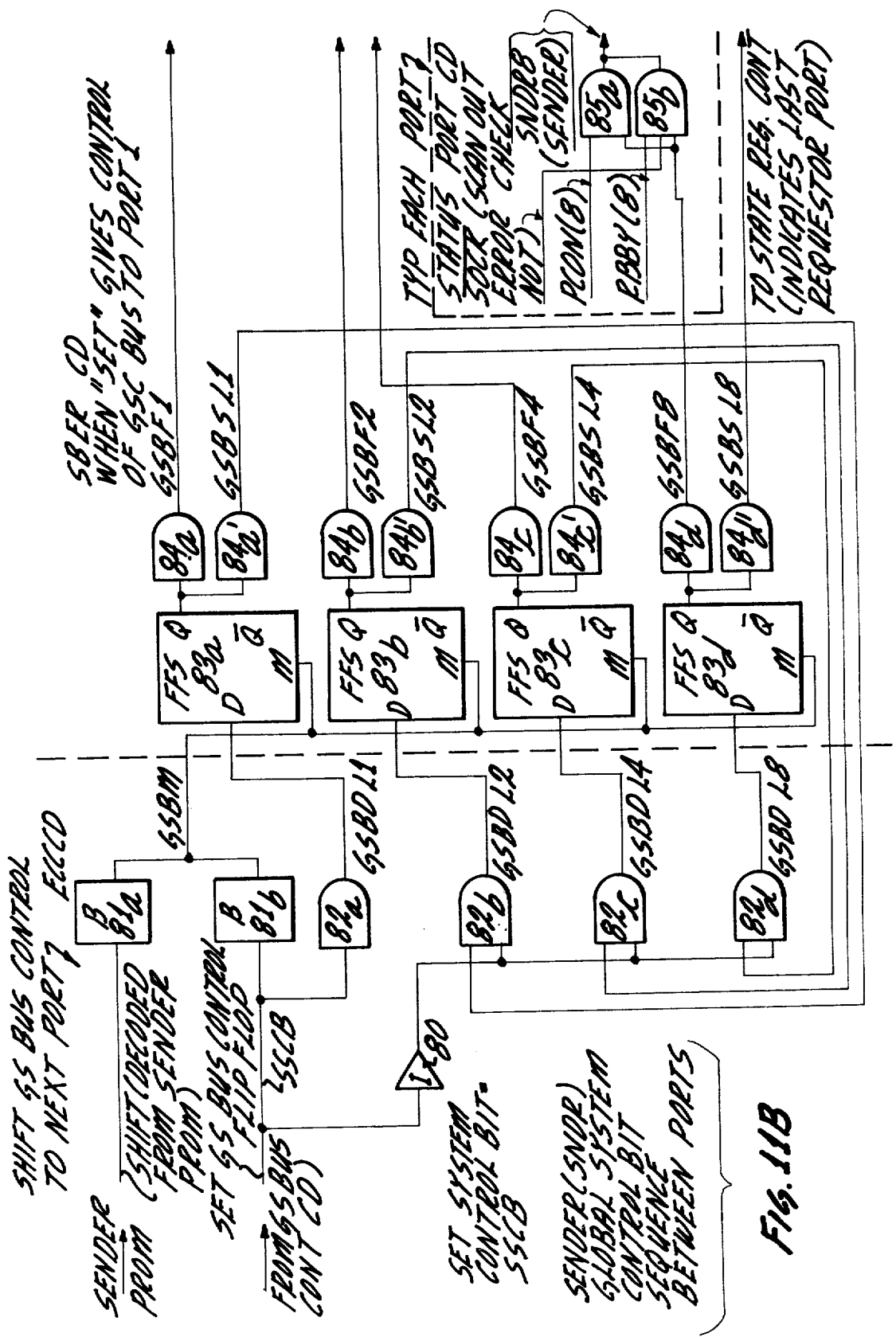
FIG. 11B illustrates the circuit whereby the ports of a global memory module alternately receive a global system control bit which gives the port having the control bit the temporary control of the global system control bus.

In FIG. 11B there is seen the circuitry which is used to pass the global system control bit (GSC bit) between ports within the given Global Memory Module.

In FIG. 11A, when the global system control bit, described at page 135 under Selection of a "Sending" Processor, and the RBBY (Response buffer is busy—means that the Response Buffer contains a command word) correspond, then that port (Port x) will become a "Sender". The global system control bit will remain in that port until released by the port (SHFT from the sender PROM, FIG. 11B). When the global system bit (GSC bit) is in a port, and there is no "request to send", then the micro code (FIG. 18) causes the bit to be passed on to the next port. After passing through all the ports of a GMM, the GSC bit is passed out of port 8 of the GMM and then is sent on to the next level of GMM cabinets.

FIG. 11A shows in diagrammatic sketch form how the global system control adapter GSC 30 sees and interprets the command word and distributes it to all the other global system controls. The global system control adapter interprets the command word through the use of the sender portion of its microcode light, then places the operation code in the sender command register 31 (FIG. 18), and transmits appropriate twelve-bit slices (along with identifying start and data strobes) on the global system control bus, where it is available to all the other global system control adapters (GSC's) and to itself through the receiver portion of the microcode. The first twelve-bit slice transmitted by the Sender contains the OP code which is placed in the receiver command register 41 by each receiving global system control adapter.

All of the receiver microcodes receive the first two slices; however, the second slice contains a portion of the receiver's address. Those receivers that do not match the slice, terminate their reception. Thus, as the Sender sends slice after slice of command data, the receivers continue to terminate until only the receiver (or receivers) which have been addressed remain.

Figures 2, 13:
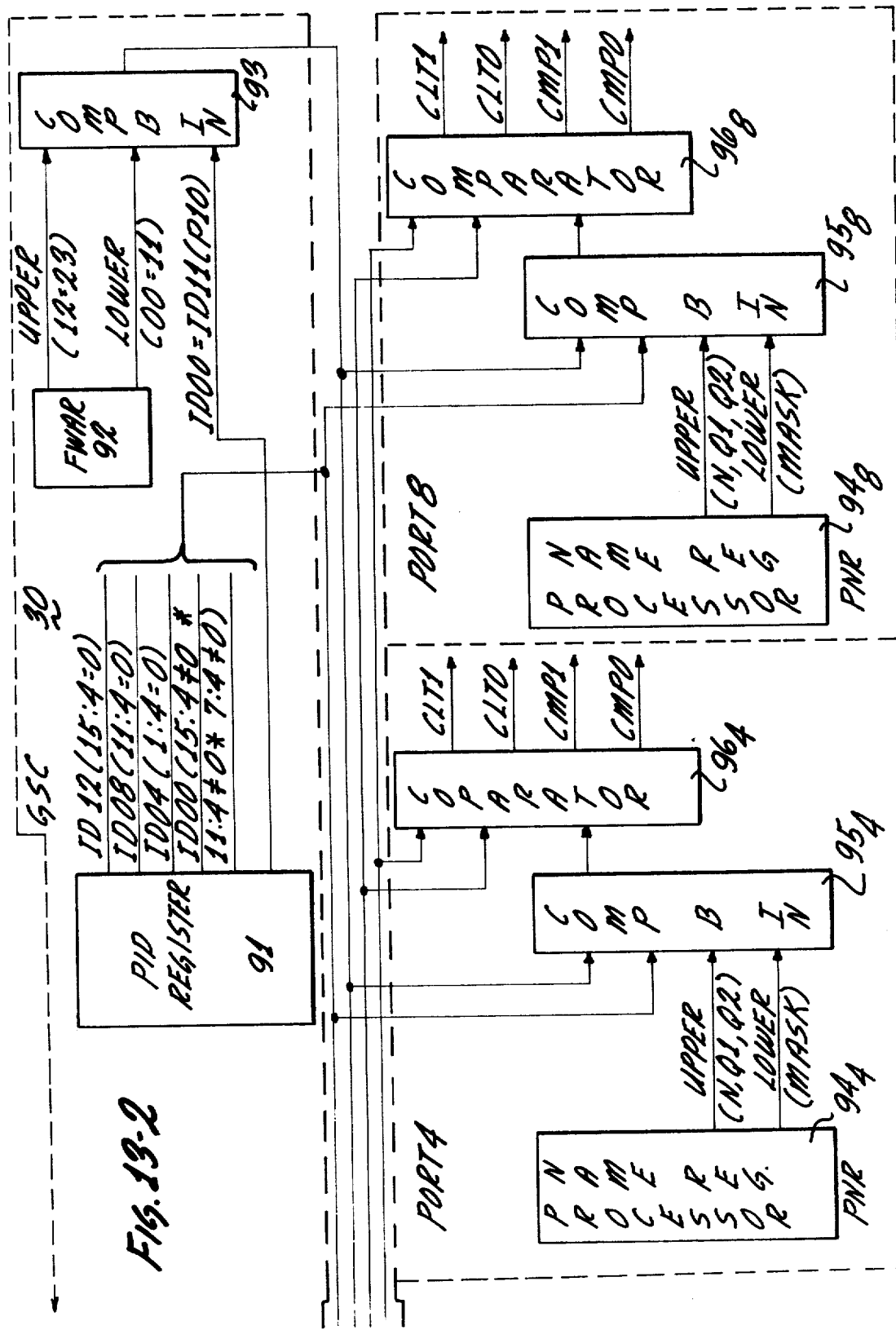
FIG. 13 is a diagram showing how each of the input ports of a global memory module provides comparators for signal comparison and also how the global system adapter (GSC) provides comparator circuitry.

FIG. 12 is a diagram showing how the Scan Out command by a processor to the Response Buffer will generate the $SNDR_P$ or sender signal. Comparators-:—FIG. 13 shows the comparators in the processor port adapter $P_T$ of FIG. 3. The comparators have two basic inputs which are the A and B inputs. The A input is located in the global system control adapter and is therefore common for all of the comparators in the cabinets. However, the inputs of the comparator A 90, which are labeled Message Buffer (MB), Response Buffer (RB) are used only after a single port has been selected. The input from the bus (ZA00 through ZA11) normally is seen by all of the comparators.

The comparator B 93 input can be either from the global system control adapter (for comparing the PID or the FWAR), or from the port for comparing the system name and mask of the port.

FIG. 14 illustrates the pattern for the Comparator PROM PR 40 whereby comparisons may be made as to the relationship of signals to Comparator A 90 and Comparator B 93 to determine if A=B or A is less than B.

The GSC adapter of FIG. 4 shows a unit situated within and designated as the Micro-code Control. This unit involves the Sender and the Receiver micro-code circuitry which is shown in FIG. 15. FIG. 15 shows the Sender Command Register 31 and the Receiver Command Register 41. The PROM decoded output from 31, 41 connect respectively to a State Register Control 32 (Sender) and a State Register Control 42 (Receiver). The outputs of the State Register Controls 32, 42 connect to a Sender State Register 33 and a Receiver State Register 43.

The Sender and Receiver micro-code circuits are functionally the same. Only the micro-codes residing in the respective PROM arrays differ. The circuits each consist of command registers 31, 41, state registers 32, 42, state register controls 33, 43, and PROM arrays 34, 44.

Figure 18:
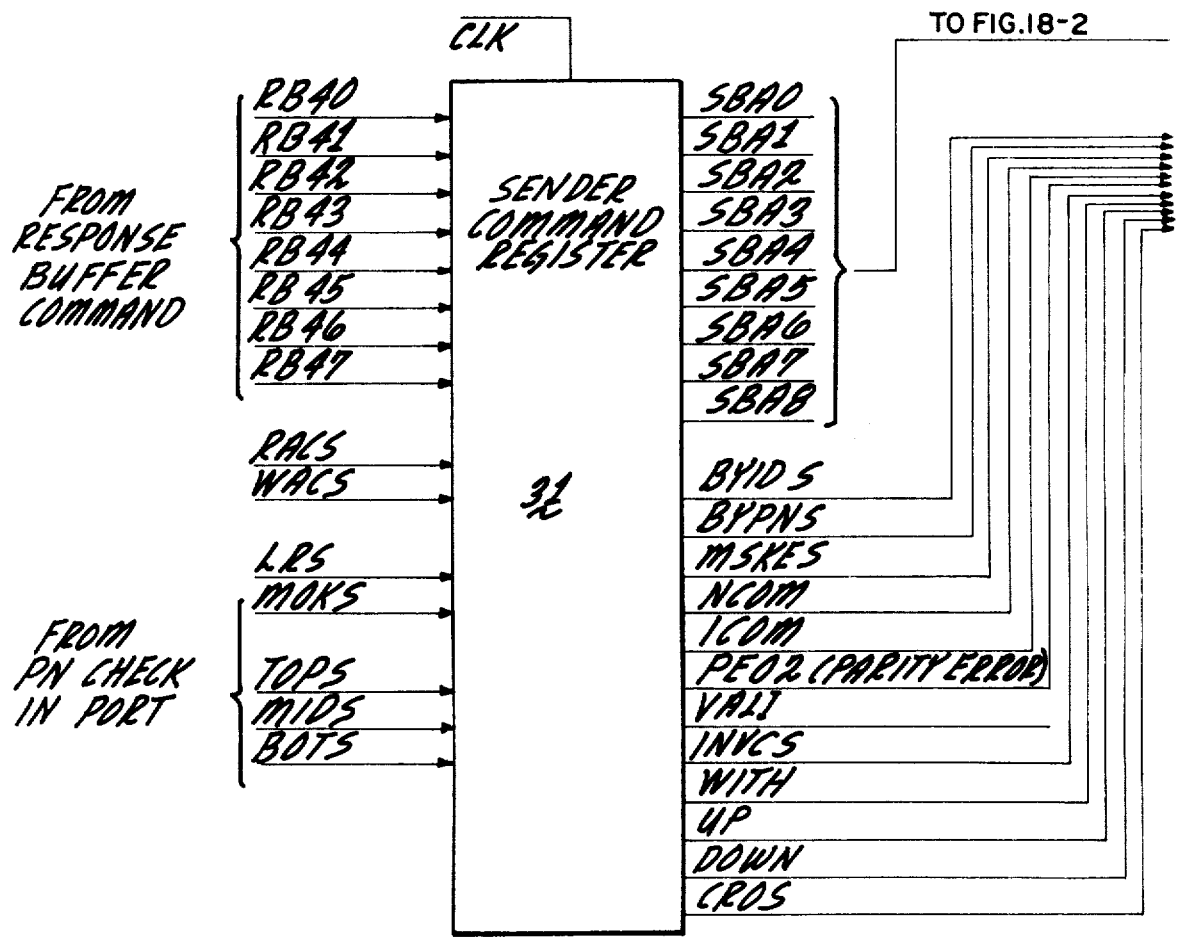
FIG. 18 is a circuit diagram showing the micro-code control circuits of the global system control (GSC) of the global memory module (GMM).
Figure 1:
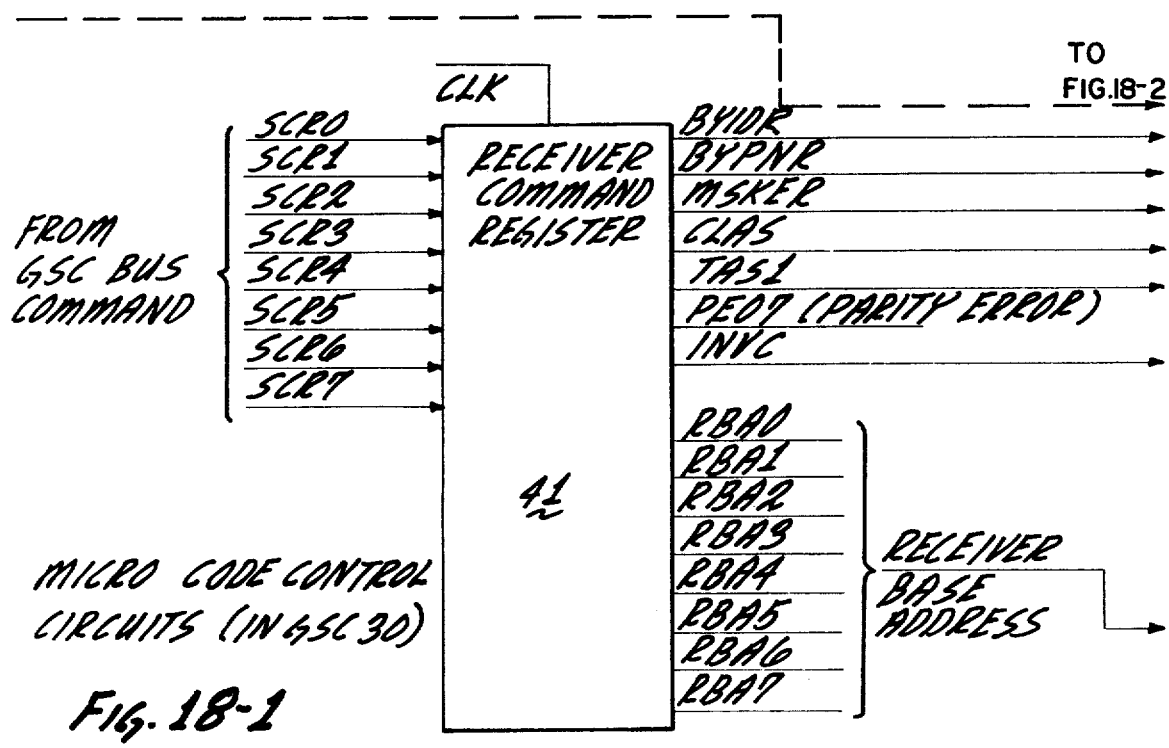
Figures 2, 18:
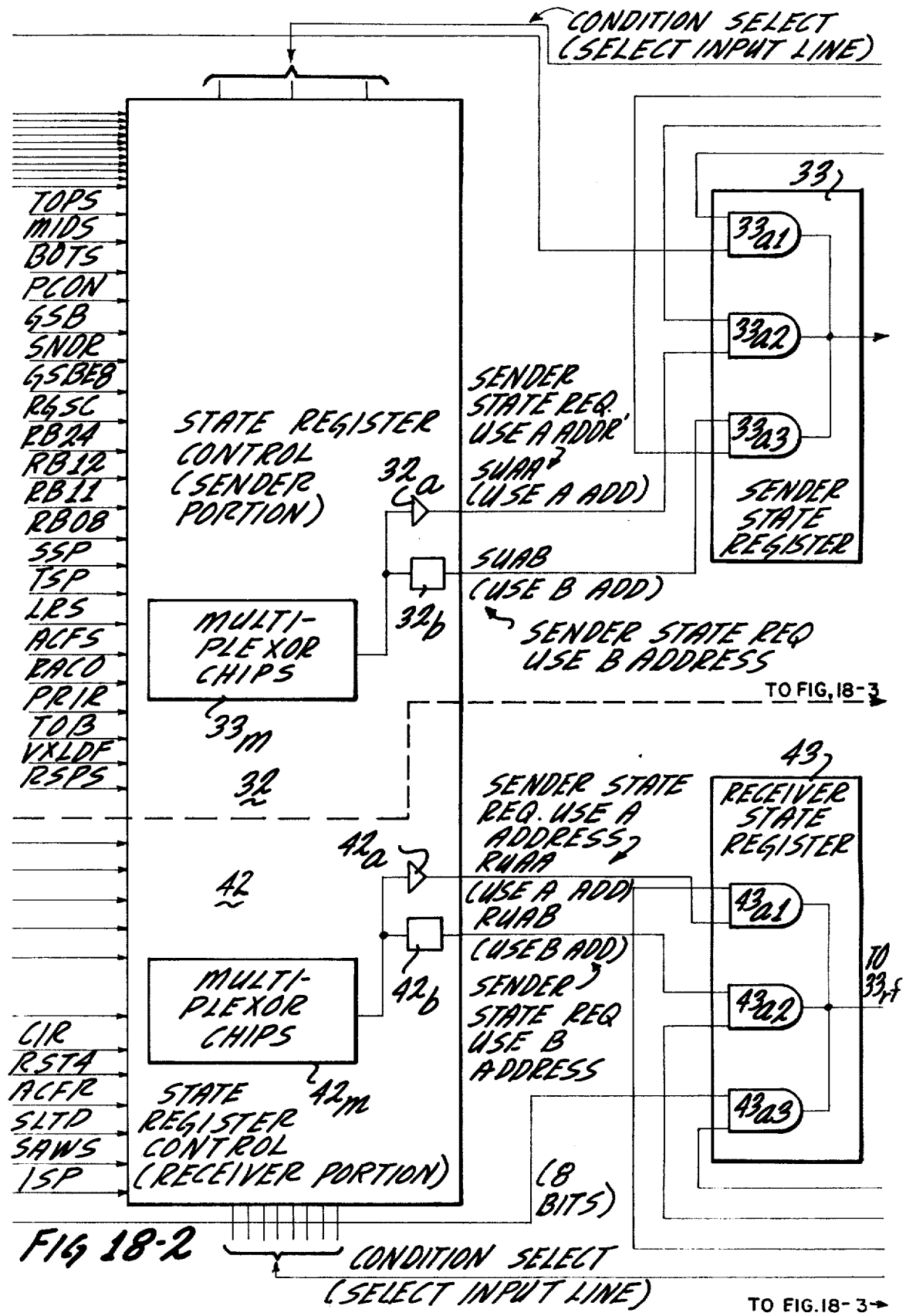
Figure 18:
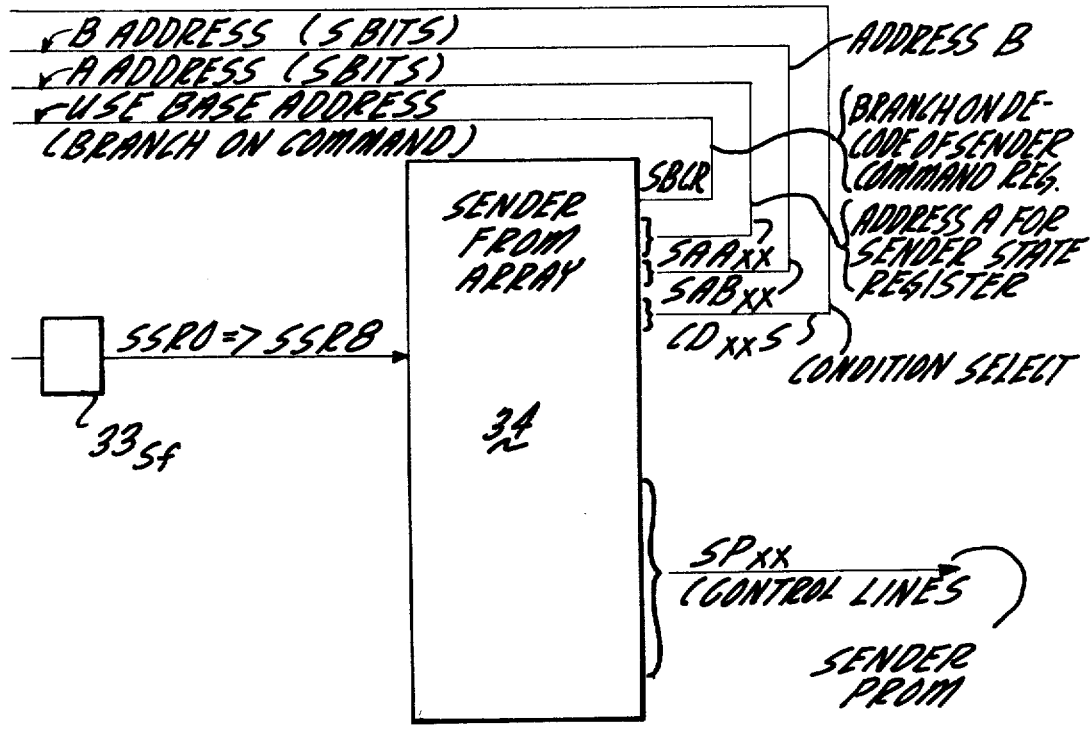

The command register interprets the command to develop a base address and certain condition levels which can be tested by the State Registers 33, 43. In FIG. 18, the State Registers 33, 43 test the condition levels from the command register and other condition levels pertinent to the micro-code, one at a time, to select either Address A (xUUA) or Address B (xUAB), where x is equal to S for Sender or equal to R for Receiver. The particular line to be tested is selected by the condition select lines from the PROM array.

The State Registers accept the control lines xUUA, xUAB and xBCR, and uses these to select the A Address, the B Address or the Base Address as the input address to the PROM array.

Each word (address) of the PROM array has outputs divided into five functions as follows:

(a) A Address (SAAxx for Sender or RAAxx for Receiver);
(b) B Address (SABxx for Sender or RABxx for Receiver);
(c) Condition Select lines (CDxxS for Sender, CDxxR for Receiver);
(d) Control lines (SPxx for Sender or RPxx for Receiver) that are used to set up conditions;
(e) Branch on Command line (SBCR for Sender, RBCR for Receiver) to cause the base address, from the Command Register, to be used.

Thus, the micro-code, starting at some given address (usually 00), selects a condition to be tested, then selects the A or B Address (provided by the micron-code) by the state of the tested condition for its next address, and thus sets up conditions in the GSC or the input port adapters.

The following Tables V-A through V-E will illustrate in detail certain basic inputs and outputs of the Micro-Code circuitry of FIG. 18;

TABLE V-A

SENDER COMMAND REGISTER

The inputs to the Sender Command Register are as follows:

| | |
|---|---|
| RB40 through RB47 | OP code and variant bits from command in Response Buffer with The PNR designated as Sender has read access to the Logical module (i) indicated in the command word. Used only with Transfer (i) and Share (i) commands. If sender does not have read access, command is not valid (i) (VALI) command. |
| WACS | The port designated as Sender has write access to the Logical module (i) indicated in the command word. Used only with Transfer (i) and Share (i) commands. If sender does not have write access, command is not a valid (i) (VALI) command. |
| LR.S | Indicates that the Lock Register associated with the PNR of the sender port is set (processor name is not valid unless LR is set). This level is used to determine that command is not invalid (INVC). |
| MOKS | Indicates that the Mask portion of the sender's PNR is valid (one and only one bit in Mask is set). This level is used to determine that command is not invalid (INVC). |
| TOPS | Indicates that the name in the sender's PNR places the processor at the top of the logical name hierarchy. This level in conjunction with variant bits is used to determine that command is not invalid (INVC). |
| MIDS | Indicates the same as TOPS except processor is in the middle of the hierarchy. |
| BOTS | Indicates the same as TOPS except the processor is at the bottom of the hierarchy. |

TABLE V-B

OUTPUTS OF THE SENDER COMMAND REGISTERS AS FOLLOWS:

SBA0 Through

TABLE V-B-continued
OUTPUTS OF THE SENDER COMMAND REGISTERS AS FOLLOWS:

| | |
|---|---|
| SBA8 | Sender's base address decoded from the OP code. |
| BYID | The receiving processor is to be addressed by its PID. |
| BYPN | The receiving processor is to be addressed by name. |
| MSKE | The receiving processor is to be addressed by Mask as well as name. |
| NCOM | Command is unique and does not use most of the common code string |
| ICOM | Command involves mod (i). |
| VALI | Command is mod (i) type and sender has access to mod (i). |
| INVC | Command is invalid |
| WITH | Receiver is to be within the same system name. |
| UP | Receiver is to be in a system one level higher than system containing sender. |
| DOWN | Receiver is to be within a system one level lower than system containing sender |
| CROS | Receiver is to be within a system at a level equal to system containing sender. |

TABLE V-C
RECEIVER COMMAND REGISTER

The input of the Receiver Command Register is the command received from the GSC bus. The outputs of this register are as follows:

| | |
|---|---|
| BYID | Receivers are addressed by PID. |
| BYPN | Receivers are addressed by name. |
| MSKE | Receiver is addressed by Mask as well as name. |
| CLAS | Command uses common code string for class 1 and class 2 commands. |
| TASI | Command is "Test and Set i". |
| INVC | Command is invalid. |

TABLE V-D
SENDER STATE REGISTER CONTROL

The first eleven inputs of the Sender State Register Control are defined in the Sender Command Register outputs.
The other inputs are as follows:

| | |
|---|---|
| TOPS | Sender is at the top of the name hierarchy. |
| MIDS | Sender is in the middle of the name hierarchy. |
| BOTS | Sender is at the bottom of the name hierarchy. |
| PCON | Processor condition (when a processor is in some abnormal condition other processors in the system are informed by the use of PCON which is transmitted much like a command). |
| GSB | Global system bus control is in this cabinet. |
| SNDR | One of the ports has the GSC bit and either PCON or command word in its response buffer. |
| GSBF8 | Port 8 or last port in this GMM has the Global system bus control flip-flop set. |
| RGSC | Resolve Global system bus control. |
| RB24 | Response Buffer bit 24 |
| RB12 | Response Buffer bit 12 |
| RB11 | Response Buffer bit 11 |
| RB08 | Response Buffer bit 08 |
| SSP | Some cabinet detected Global system bus parity error. |
| TSP | Two or more cabinets detected Global system control bus parity error. |
| LR.S | Lock Register of sender port is true (name is valid). |
| ACFS | Access Control Finish flip-flop set. |
| RACO | Read access only |
| PRIR | Priority level, used to determine if one or more receivers were "engaged". |
| TO B | Timer B has timed out |
| VLDF | Data is valid |
| RSPS | Response strobe |

TABLE V-E
RECEIVER STATE REGISTER CONTROL

The first six inputs of the Receiver State Register Control are defined in the Receiver Command Register outputs.
The other inputs are as follows:

| | |
|---|---|
| Cl.R | Output of comparator (in the port) indicating valid comparison. |
| RST4 | Receiver Status Bit 4. |
| ACFR | Access control finish. |
| SLTD | Selected - a port in this GMM matches all of the compares and is selected as the "receiver". |
| SAWS | Saw start strobe. |
| ISP | I saw parity. |

Receiver and Sender State Registers:—In addition to selecting between A Address, B Address and a Base Address, the State Registers 33, 43, FIG. 18, can delay the changing of the PROM address depending on the state of the INCK (Inhibit Change) and the Wait lines (both signals are decoded from the PROM array control lines). The Inhibit Change/Wait circuit is shown in FIG. 16A and its timing in FIG. 16B. The output of this circuit controls the mode (M) input of the address flip-flops (JKD type flip-flops) in the State Registers 33, 43.

In FIG. 16A the Inhibit Change/Wait circuit comprises a series of buffers, $16_1$, $16_b$, $16_c$, $16_d$ and $16_e$. The output of buffer $16_b$ feeds through inverter $16_f$ to form the mode control signal M which is fed to the state register flip-flops ($33_{sf}$ and $33_{rf}$) of FIG. 18. The Inhibit Change signal feeds to buffers $16_b$ and $16_c$. The output of $16_c$ feeds to the input of AND gate $16_j$. The Wait signal feeds to the input of buffer $16_d$ and also to the input of AND gate $16_j$. The output of buffer $16_d$ feeds to the input of AND gate $16_m$.

The CBTO (Cabinet Timeout) signal is fed as input to buffer $16_e$ which provides an output to the D input of the J-K flip-flop $16_h$. The "no maintenance" signal MNT/provides an input to AND gate $16_g$ whose output feeds to the M input of flip-flop $16_h$. The Q output of $16_h$ feeds to the AND gate $16_i$. The outpt of AND gate $16_i$ feeds as input to AND gate $16_j$ whose output feeds to the D input of the J-K flip-flop $16_k$. The Q output of flip-flop $16_k$ provides an input to AND gate $16_m$ which provides the M or mode control signal onto the state register flip-flops ($33_{sf}$ and $33_{rf}$) of FIG. 18.

In the situation on INCK (Inhibit Change), the output is held "low" for one clock, preventing the address flip-flops from changing state. In the case of Wait, the output is held "low" two clocks beyond the reception of the EXCL (execution complete) signal.

Communication between Processors:—FIG. 17 is a schematic diagram showing how a processor $P_A$ connected to a global memory module GMM3 of one system can communicate with another processor $Q_D$ which is connected to another global memory module GMM2 of another system. For example, in the system GMM3 the processor port adapter $PT_A$ is seen to have a Response Buffer $115_A$ and a Message Buffer $110_A$ associated with the processor $P_A$. Likewise, in the system involving the global memory module GMM2, one of the processor port adapters $PT_Q$ contains a Response Buffer $115_D$ and a Message Buffer $110_D$ connected to the processor $Q_D$.

Operationally, the processor $P_A$ will send a Scan-Out word which includes the error correction code, the OP code, the information data, and the identification of the receiving processor (which will receive the message).

This Scan-Out word is sent out into the Response Buffer 115$_A$ and is then sent, via the GSC bus B$_{10}$, over to the Message Buffer 110$_D$ of the processor port adapter PT$_Q$ of the system GMM$_2$. Subsequently the information in the Message Buffer 110$_D$ can be scanned into the processor Q$_D$.

The processor port adapter PT$_Q$ for processor Q$_D$ can return a Result Word Response back to the Response Buffer 115$_A$ of the processor P$_A$ in the system GMM$_3$. This result word information in the Response Buffer 115$_A$ can then be returned by a "scan-in" back into the processor P$_A$.

Likewise, in FIG. 17 the processor Q$_D$ can "scan-out" a command word into its Response Buffer 115$_D$. This command information can then be sent over the GSC bus B$_{10}$ over to the Message Buffer 110$_A$ of the processor P$_A$ which can "scan-in" this information. Then, likewise, the PT$_A$ for P$_A$ will send a "result response word" back over to the Response Buffer 115$_D$ which can be "scanned-in" back into the processor Q$_D$.

While the simplified schematic of FIG. 17 showed the information flow between a processor P$_A$ of one system over to another processor Q$_D$ of another system, there is intermediate circuitry which is used to help to accomplish this interchange of data. FIG. 15 is a schematic diagram showing a global memory module 10 having its standard global memory control GMC 20 and its global system control GSC 30. The four ports of the global system control are shown schematically with some partial detail in port PT$_1$ and some partial detail of the GSC 30.

The port PT$_1$ is shown partially as containing the Write and Read access registers, WACR, RACR: also the processor name register PNR, the lock register, LR, and the dependent status register, DSR. The processor P$_A$ in FIG. 17 is shown connected to its associated Response Buffer 115$_A$ and its associated Message Buffer 110$_A$ in the processor port adapter PT$_1$.

The GSC 30 is partially shown schematically in FIG. 15 as containing the PIDR, or processor identification register, and the FWAR which is the first word address register. A sender command register SCR 31 (receiving signals from the Response Buffer 115$_A$), a receiver command register 41 and a Sender and Receiver PROM array 34, 44 having several outputs are schematically shown in FIG. 15 and are seen in more detail in FIG. 18. As seen in FIG. 18 the global system control GSC 30 has a set of micro-code control circuits consisting of a Sender Command Register 31, Receiver Command Register 41, a State Register Control 32 (Sender) and State Register Control 42 (Receiver), in addition to sender 33 and receiver 43 state registers and sender 34 and receiver 44 PROM arrays.

As seen in FIG. 15, the GSC 30 is seen to have sender 31 and receiver 41 command registers, sender 33 and receiver 43 state registers and a sender 34 and receiver 44 PROM arrays. FIG. 18 shows in greater detail the micro-code control circuitry which involves these sender-receiver command registers and sender-receiver PROM arrays.

As seen in FIG. 18 the micro-code control circuitry of the GSC 30 is made up of two sections, one of which is the "Sender" section and the other of which is the "Receiver" section.

In the Sender section of FIG. 18, the command signals (RBxx) come from a Response Buffer 115$_A$, FIGS. 15, 17 into the sender command register 31 after which they form a sender base address which is conveyed to the sender state register 33. Referring to FIG. 18, the sender state register 33 has three AND gates 33$_{a1}$, 33$_{a2}$, 33$_{a3}$. The output of these gates is fed into flip-flop 33$_{sf}$, the flip-flop outputs are then sent to Sender PROM Array 34 which provides certain outputs:

SAAxx equals address A for Sender State Register
SABxx equals address B for Sender State Register
SBCR equals branch on decode of sender command register
CDxxS equals condition select for state register control
SPxx equals sender PROM control lines.

The State Register Control (Sender) 32 receives signals from the sender command register 31 and also from various conditions within the GSC 30 or the processor port adapter PT as listed in Tables V-A to V-E.

The State Register Control 32, FIG. 18, has a multiplexor 32$_m$, an inverter 32$_a$ and a buffer 32$_b$ to form the outputs SUAA (sender state register use A address) and SUAB (sender state register use B address), which outputs are fed to AND gates 33$_{a2}$ and 33$_{a3}$.

Likewise, the Receiver section of the micro-code control circuits of FIG. 18 show a receiver command register 41 receiving command signals from the GSC bus (SCRx). The outputs of the receiver command register 41 are fed to the receiver portion of the state register control 42 which has a multiplexor 42$_m$, an inverter 42$_a$ and a buffer 42$_b$ which provide the two output signals of RUAA (receiver state register use address A) and RUAB (receiver state register use address B). These outputs are fed to the receiver state register 43 which has AND gates 43$_{a1}$, 43$_{a2}$, 43$_{a3}$ and flip-flop 33$_{rf}$. The output of the receiver state register 43 then provides an output address line RSR 0-7 which is fed to the receiver PROM array 44 and which provides signals to the receiver PROM control lines RPxx. The receiver PROM array 44 also outputs condition select lines CDxxR for the receiver state register control 42 to select address A or address B for the receiver state register 43. A branch on decode of the receiver command register 41 is also outputted from Receiver Array 44.

A glossary of the acronyms for the various signal lines and terms is shown in the following Table VI:

TABLE VI

| GLOSSARY OF TERMS | |
|---|---|
| ACA$_p$ (7:8) | Access Control Address Register |
| ACCL$_p$ | Access Control RAMS Clear |
| ACC1$_p$ | Access Control FF 1 |
| ACC2$_p$ | Access Control FF 2 |
| ACFN$_p$ | Access Control Clear Finished |
| ACFR | Receiver Has ACFN True |
| ACFS | Sender has ACFN True |
| ACRA$_p$ | Access Control Register Access (For GMC) |
| ACRDL$_p$ | ACR Read Level |
| ACWT$_p$ | ACR Write FF |
| AINF$_p$ | Alarm Interrupt FF |

TABLE VI-continued
GLOSSARY OF TERMS

| | |
|---|---|
| $AINF5_p$ | Alarm Interrupt Level to Proc. |
| BISO | GS Bus Isolate |
| $BOT_p$ | Bottom- Derived from Proc. Name Reg. |
| BOTS | Sender Has Bottom-Derived from Proc. Name Reg. |
| BYID.R | Receiver Decoded Op as Addressed by PID |
| BYID.S | Sender Decoded Op as Addressed by PID |
| BYPN.R | Receiver Decoded Op as Addressed by PNR |
| BYPN.S | Sender Decoded Op as Addressed by PNR |
| CA (11:12) | A Input to Comparator |
| $CB_p$ (11:12) | B Input to Comparator |
| CABA | Cabinet Abort |
| CBTO | Cabinet Timeout |
| CDIV | Divide by 5 Clock Control |
| CICP | Change in Check Bit Parity |
| CIWP | Change in Word Parity |
| CKS | RAM (ACR) Write Strobe |
| CL (2:3) | Level to Comparator |
| CLAS | Class Command |
| (CLASS1) | Decode of Op for Invalid Command |
| (CLASS2) | Decode of Op for Invalid Command |
| $CLER5_p$ | Clear Level to Proc. |
| $CLRD5_p$ | Cleared Level from Proc. |
| CLT (1:2) | Compared Less than |
| $CL1F_p$ | Clear 1FF |
| $CL2F_p$ | Clear 2FF |
| CMDZ | G.S. Bus Command is Zero |
| $CMP0_p$ | Compare 0 FF |
| $CMP1_p$ | Compare 1 FF |
| CN | Cabinet Number |
| CNT1→CNT4 | Counter FFS (MCAB) |
| $CNTF_p$ | Count Finished |
| $COAF_p$ | Condition Allow FF |
| CROS | Across Variant |
| C1.R | Receiver Port(s) has $CMP1_p$ True |
| DCB1→DCB6 | Change in Check Bits |
| $DNYR_p$ | Deny Read Access |
| $DNYW_p$ | Deny Write Access |
| DOWN | Down Variant |
| $DSRF_p$ | Dependent Status Reg. FF |
| DSTBE | Data Strobe From GS Bus |
| DSTBR | Data Strobe From Ext-Int Sw. |
| DSTB.S | Generate Data Strobe |
| DSTBS | Data Strobe on GS Bus |
| DSTFS | Data Strobe to G.S. Bus |
| DSTF1 | Data Strobe 1 FF |
| DSTF2 | Data Strobe 2 FF |
| DSTS/ | Generate Data Strobe Not |
| EC(59:60) | Data Input to Error Code Circuitry |
| $ECCC1_p$ | Gate RB (50:51) to Error Code Circuitry |
| $ECCC2_p$ | Gate RB (59:9) to Error Code Circuitry |
| ED (59:9) | Error Correction Code Data (Check Bits) |
| EG (50:51) | Error Bit Gate (Compliment RB) |
| $EINF_p$ | External Interrupt FF |
| $EINT5_p$ | External Interrupt Level to Proc. |
| EMNT | Enable Maint. (Inhibit Interface Not) |
| EXCL | Execution Complete |
| FW (23-24) | First Word Address Register |
| (F1)→(F4) | Comparator Control Levels |
| $GA_r$ (19:8) | Global Address From Proc. |
| $GAOF_r$ | Global Access Obtained FF (In GMC) |
| GBPE | GS Bus Parity Error |
| GENP | Generate GS Bus Parity Level |
| $GI_r$ (59:60) | Global Info From GMC |
| GSB | GS Bus Control is in this Cabinet |
| $GSBF_p$ | GS Bus Control FFS |
| $GUEJ_p$ | Set Global Unrecoverable Error FF |
| $HALTS5_p$ | Halt Level to Proc |
| $HLTD5_p$ | Halted Level to Proc. |
| $HLTR_p$ | Reset the Halted Processor Condition |
| $HL1F_p$ | Halt 1 FF |
| $HL2F_p$ | Halt 2 FF |
| $HWER_p$ | Hardware Error FF (PROM Parity Error) |
| ICOM | Mod 1 Command |
| $IDLE5_p$ | Idle Level From Proc. |
| $IDLF_p$ | Idle FF |
| INCK.R | Inhibit Change in Receiver State Reg. |
| INCK.S | Inhibit Change in Sender State Reg. |
| INTP | Interrupt Pending |
| INVC.R | Receiver Decoded Op as Invalid |
| INVC.S | Sender Decoded Op as Invalid |
| ISOL | Isolate G.S. Bus |

TABLE VI-continued
GLOSSARY OF TERMS

| | |
|---|---|
| ISP | I Saw Parity on GS Bus |
| ISPF | I Saw Parity FF |
| LDCM.R | Load Receiver Command Register |
| LDCM.S | Load Sender Command Register |
| LD1F$_p$ | Load 1 FF |
| LD2F$_p$ | Load 2 FF |
| LOAD5$_p$ | Load Level to Proc. |
| LRFF$_p$ | Lock Register FF |
| LR.S | Sending Port has LRFF True |
| LTRB | Left to Right Priority FF |
| LV (2:3) | Level FFS |
| MB$_p$ (59:60) | Message Buffer |
| MBRY$_p$ | Message Buffer is Ready |
| MCAB | The MCAB Adapter is Present |
| ME | Multiple Bit Error From ECC |
| MID$_p$ | Middle - Derived from Proc. Name Register |
| MIDS | Sender Has Middle-Derived from Proc. Name Reg. |
| (MODR) | Sender Decoded Op as Needing RACR |
| (MODW) | Sender Decoded Op as Needing WACR |
| MSKE.R | Receiver Decoded Op as Mask Expected |
| MSKE.S | Sender Decoded Op as Mask Expected |
| MYCAB | Send My Cabinet Signal Onto GS Bus |
| NCOM | Not Common Commands |
| NRSH$_p$ | Not Running - Super Halted FF |
| NRSR$_p$ | Reset NR-SH Processor Condition FF |
| NRIF$_p$ | Not Running FF |
| OPOE→OP2E | GS Bus Op Code From GS Bus |
| OP0L5→OP2L5 | GS Bus Op Code on GS Bus |
| OVRI | Override Pending Messages |
| PARL | GS Bus Parity Level From GS Bus |
| PARL5 | GS Bus Parity Level on GS Bus |
| PARS | GS Bus Parity Level to GS Bus |
| PASS | Pass GS Bus Control to Next Cabinet |
| PB51 | Partial Parity For Bit 51 |
| PCON | Sender has Processor Condition |
| PCON$_p$ | Port has Processor Condition |
| PE01→PE10 | PROM Parity Error Levels |
| PPE1→PPE8 | PROM Parity Error Latches |
| POP0→POP7 | Processor Condition Op Code |
| PRI1 | Priority 1 Level |
| PRI2 | Priority 2 Level |
| PRID | Resolve Priority is Done |
| PRIE | Priority Level from GS Bus |
| PRIH | Priority Inhibit Level |
| PRIL5 | Priority Level on GS Bus |
| PRIR | Priority Level from Ext-Int. Sw. |
| PRIS | Priority Level to GS Bus |
| PRS4 | Priority Select 4 FF |
| PRS5 | Priority Select 5 FF |
| PRS6 | Priority Select 6 FF |
| PSL1→PSL7 | Priority Select Levels |
| QAGF$_r$ | Queued Access to GSC FF (In GMC) |
| RAA (7:8) | Address A for Receiver State Reg. |
| RAB (7:8) | Address B for Receiver State Reg. |
| RACO | Read Access Only |
| RACO.S | Sender Has RACO True |
| RACR$_p$ | Read Access Control RAM Result |
| RACS | Sender Has RACR True |
| RACV$_p$ | Value to be Written Into Read Access RAM |
| RB$_p$ (59:60) | Response Buffer |
| RBA (7:8) | Branch Address for Receiver State Reg. |
| RBBY$_p$ | Response Buffer Busy |
| RBCR | Branch on Decode Of Receiver Command Reg. |
| RBRY$_p$ | Response Buffer Ready |
| RCOV | Recover FF (ECC Circuitry) |
| RCR (7:8) | Receiver Command Register |
| RFGT | Read the Data From GSC Time |
| RFGTL$_p$ | Read the Data From GSC Time Level to GMC |
| RG$_p$ (59:60) | Read Data to GMC |
| RGSC | Resolve GS Bus Control FF |
| RNCT | Run the Counter (MCAB) |
| RP0→RP12 | Receiver from Array Fields 0 Thru 12 |
| RPAR | Resolve Parity |
| RPFN | Resolve Priority Finish |
| RPRI | Resolve Priority |
| RSET1$_p$ | Reset Level 1 |
| RSET2$_p$ | Reset Level 2 |
| RSR (7:8) | Receiver State Register |
| RSRM | Receiver State Register Mode Control FF |
| RSPC | Reset Processor Condition |
| RSPS | Response Strobe (GS Bus Command) |

TABLE VI-continued
GLOSSARY OF TERMS

| | |
|---|---|
| $RST0_p \rightarrow RST6_p$ | Receiver Status |
| $RTEC_p$ | Requestor to ECC (Gate ED→RB (59:91) |
| RUAA | Receiver State Register Use ADDR.A |
| RUAB | Receiver State Register Use ADDR.B |
| $RUNG5_p$ | Running Level From Proc |
| $RUNF_p$ | Running FF |
| SAA (8:9) | Address A for Sender State Reg. |
| SAB (8:9) | Address B for Sender State Reg. |
| $SAV5_p$ | System Available from Proc. |
| SAWS | Saw Start Strobe FF |
| SBA (8:9) | Branch Address for Sender State Reg. |
| SBCR | Branch on Decode of Sender Command Reg. |
| SBE (7:8) | Single Bit Err or Register |
| SCR (7:8) | Sender Command Register |
| SE | Single Bit Error from ECC |
| SENG | Selected Port is Engaged FF |
| SENGL | Selected Port is Engaged Level |
| SETC | Set Clear |
| SETE | Set Engaged |
| SETH | Set Halt |
| $SHIF_p$ | Super Halted FF |
| SHFT | Shift GS Bus Control to Next Port |
| $SHLT5_p$ | Super Halted Level from Proc. |
| $SIMB_r$ | Scan In Message Buffer |
| $SIRB_r$ | Scan In Response Buffer |
| SLTD | A Port in this Cabinet is Selected |
| $SLTF_p$ | Port Selected as Receiver |
| $SNDR_p$ | Port is Sender |
| SN01→SN08 | Sender Number Register |
| $SOCK_p$ | Scan Out ECC Check |
| SOCS | Scan Out EC Check Strobe |
| $SORB_r$ | Scan Out Response Buffer |
| $SOTM_p$ | Gate Scan Out Data to Response Buffer |
| SPOE.12 | Sender PROM Array 0 = 12 |
| SP4E.02 | Sender PROM Array 4 = 02 |
| SP0→SP12 | Sender PROM Array Fields 0 Thru 12 |
| SPAD | State Register Advance |
| SSCB | Set GS Bus Control FF (GSBF1) |
| SSP | Some Cabinet Saw GS Bus Parity Error |
| SSR (8:9) | Sender State Register |
| SSRM | Sender State Reg Mode Control FF |
| SST0→SST5 | Sender Status |
| ST.B | Start Timer B |
| $STRF_p$ | Global Start FF |
| STRT | Start Strobe (GS Bus Command) |
| $STRT5_p$ | Global Start Level to Proc. |
| SUAA | Sender State Register Use Addr. A |
| SUAB | Sender State Register Use Addr. B |
| TASI | Sender Decoded Op as Test and Set Command |
| TO.A | Timeout Timer A |
| TO.B | Timeout Timer B |
| TOBF/ | Timeout Timer B FF |
| TOPS | Sender Has Top-Derived from Proc. Name Reg. |
| TSP | Two or More Cabinets Saw GS Bus Parity |
| UBUS | Use GS Bus |
| UP | UP Variant |
| VALI | Valid Mod 1 Command |
| VLDF | Valid Data |
| VLD1 | Valid 1 FF |
| VLD2 | Valid 2 FF |
| $WACR_p$ | Write Access Control RAM Result |
| WACS | Sender Has WACR True |
| $WACV_p$ | Value to be Written into Write Access RAM |
| WAIT.R | Wait to Increment Receiver State Reg. |
| WAIT.S | Wait to Increment Sender State Reg. |
| WITH | Within Variant |
| $WMEG_p$ | Write Multiple Bit Error (Scan Out) |
| $WSEG_p$ | Write single Bit Error (Scan Out) |
| ZA (11:12) | GS Bus Data to A Input of Comparator |
| ZAA (7:8) | GS Bus Data to $ACA_p$ |
| ZCR (7:8) | GS Bus Data to Receiver Command Register |
| ZL (2:3) | GS Bus Data to Level FFS |
| ZR (39:40) | GS Bus Data to Response Buffer |
| ZLVO | GS Bus Data to $WACV_p$ (Shared Line) |
| ZRAC | GS Bus Data to $RACV_p$ |
| ZP12.1→ZP12.4 | GS Bus Command to G.S. Bus |
| Z00E→Z15E | Data From GS Bus |
| Z00R→Z11R | Data from Int-Ext Sw. |
| Z00S→Z15S | Data to GS Bus |

TABLE VI-continued
GLOSSARY OF TERMS

Z005→Z155    Data on GS Bus

Thus, in the schematic drawing of FIG. 17 where a processor $P_A$ is seen to communicate with a receiver processor $Q_D$, the intermediate control actions of the global system control GSC 30 are handled through the micro-code control circuitry (shown in FIGS. 15 and 18) which will send control signals and data from GSC bus $B_{10}$ of global memory module GMM$_3$ over to the global system control of the processor port adapter $PT_Q$ of global memory module GMM$_2$, FIG. 17.

Thus, when the processor $P_A$ in FIG. 17 has sent out a command message to be received by the processor $Q_D$, then when $Q_D$ has received the message it will put out a "result response word" which is placed in the Response Buffer 115$_A$ which when scaned into the processor $P_A$ will let the processor $P_A$ know that the processor $Q_D$ got the message. An interrupt signal is also given to the processor $Q_D$ at which time the processor $Q_D$ will do a "scan in" from its Message Buffer 110$_D$ to find out what the message command is. Likewise, the conditions could have been reversed whereby the processor $Q_D$ could have sent a command message to the processor $P_A$. It is also possible that while there is a message pending in the Message Buffer 110$_D$ waiting to be scanned in by the processor $Q_D$, at the same time there could also be a message residing in the Message Buffer 110$_A$ which is waiting to be scanned in by the processor $P_A$.

Referring to FIG. 18, at the outputs of the sender PROM array 34, there is basically a set of outputs which involve an A address, a B address and a condition field (CDxxS) and a control line to branch (SBCR) on the decode of the command register 31. Thus, depending on the Op command from the sender command register 31, certain condition signals are generated by the sender PROM array 34.

For example, if the OP code command is a "HEYU" command (as in FIG. 10D), then there occurs a situation where the HEYU command sends a message to "one" of the processors in the system. The processor MSK identifies which subset of processors that may be interrupted, and the GSC selects one of them on the basis of the "first idle" and if none are "idle" then the processor is chosen on the basis of the "first not engaged". Any such receiving processor must have a valid name and a lock register setting of LR equal to 1.

Thus, in the example of a HEYU command, the sender command register 31 would decode out a branch address which would select a particular code string. Now depending on whether the OP code command involves a "processor to be chosen by number" or whether it is a "processor to be chosen by name", then a different code string will be provided through the micro-code circuitry. If the command is "by number", then a particular code string will be chosen; likewise, if the command is "by name", then another code string will be chosen. The branch address will connect up a separate subroutine which is concerned only with the HEYU command.

Priority Selection Circuitry:—Operating similarly to the HEYU command, there are other commands which work similarly, such as the ARE YOU THERE command and also the ZAP commands. In these commands when a particular receiving processor is addressed by "number", then there is no particular need for priority resolution since the search is taking place only for connection to one particular receiving processor. On the other hand, when a processor or subset of processors are addressed by "name", then the routine requires that a priority resolution be provided since the "name" of the receiver may fall into the category of any one of a subset of processors. For example, a "system of processors" which may contain up to 12 separate processors may be addressed as a subset "name" and in which it is then necessary for priority selection circuitry to select one of the 12 processors falling within the "name" of that subset to be chosen by means of the priority selection circuitry. Thus, in the case of a HEYU command where it may be desired to deposit a message in one processor of a group of processors within a specifically "named" system, the micro-code circuitry addresses "all of the processors in that system", but then the priority selection circuitry will operate to seek and select, firstly, any processor which may be "idle"; and barring the finding of an "idle" processor in the set, will then seek to find, secondly, a "non-engaged" processor. Since more than one "idle" or "non-engaged" processors may be found, a second type of priority selection designated as "left-to-right" is used, whereby selection of a receiving processor is done by means of number, say from a low number to a higher number whereby the first "idle" or the first "non-engaged" processor in a numbered series of say from 0–6 will be scanned in order to select the first idle or non-engaged processor encountered.

FIG. 19 is a drawing of the "priority select" resolution circuitry whereby different types of priority select signals (PSL) may be used by a given global system control to select a processor based on the type of priority select signal which is commanded. As can be seen from FIG. 19 one section of the priority select circuitry is found within a given processor port adapter PT while the remainder of the "priority select" circuitry is that circuitry which is "common" to all the processor ports in a given global memory module.

Turning first to the circuitry within a given processor port adapter (seen on the lefthand side of the drawing) a series of signal lines (PSL 4, PSL 6, etc.) come from the decoded values of the receiver PRO M 44 of FIG. 18. These input signals come into a series of AND gates 51$_a$–51$_d$. There is also a "message buffer ready" (MBRY) signal which feeds to inverter 50, thence to AND gate 51$_a$. Also into AND gates 51$_a$–51$_d$ are signals for conditions of the processor port adapter (RAC, IDLE, etc.).

The outputs of the AND gates 51$_{a, b, c, d}$, are used as input to AND gates 52$_a$, 52$_b$, and also 52$_c$, one of whose inputs is inverted by inverter 52$_d$. The outputs of AND gates 52$_a$ and 52$_b$ are fed to AND gates 53$_b$ and 53$_c$. The output of AND gate 52$_a$ is also inverted by inverter 53$_a$ and fed to the input of AND gate 54$_a$.

The output of AND gate 53$_c$ is combined with the outputs of buffers 53$_d$ and 53$_e$ and PSL 5 from the micro-code control circuitry to form send cabinet identification signal CAB ID.

The output (PRIS) of AND gate 53$_b$ is fed to AND gate 55$_b$, which also has an input from the USE bus which is inverted by inverter 54$_d$. The output of AND gate 55$_b$ has a signal PRIR (priority level from external-internal switch) which is fed as an input to the AND gate 54$_a$. The output of AND gate 54$_a$ goes to a buffer 54$_c$ to form a cabinet abort signal CABA; the output of gate 54$_a$ also goes to the deselect flip-flop 54$_e$. The flip-flop 54$_e$ has a M input from AND gate 54$_b$ which gate has inputs from AND gates 54$_a$, 53$_f$ and 53$_g$. The output of the deselect flip-flop 54$_e$ is connected around to the deselect buffer 52$_l$.

The output of AND gate 53$_b$ has a signal PRIS (priority level to GS bus) which is fed to buffer 56$_a$ (whose output goes to the global system bus) and to buffer 56$_b$ having signal output PRIE (priority level from GS bus).

Another input to buffer 56$_a$ is from buffer 55$_a$ which has inputs from the "selected engaged" flip-flop and from PRID flip-flop (resolve priority-done).

Another portion in FIG. 19 of the processor port adapter PT of the global system control GSC 30 is a series of AND gates 52$_c$, 52$_e$, 52$_f$, 52$_g$, 52$_h$, 52$_i$, plus buffers 52$_j$, 52$_k$ and 52$_l$.

The receiver PROM array 44 of FIG. 18 will decode out certain priority select level signals such as PSL 4, PSL 5, PSL 6, PSL 7, etc. Ports 1, 2, 4 and 8 may individually receive one of these priority select PSL signals which are then fed as input to AND gates 52$_g$, 52$_h$, 52$_i$. AND gate 52$_f$ has two inputs, one from priority select signal PSL 7 and the other from message buffer ready (MBRY). Buffers 52$_j$ and 52$_k$ receive respectively a start strobe signal and a pass GSC bit signal. The outputs (combined) of gates 52$_e$ through 52$_i$, plus buffers 52$_j$, 52$_k$, 52$_l$ are used to control the select flip-flop 65 as shown in FIG. 24. Also the mode control line M of FIG. 16A will be seen in FIG. 24 as one of the inputs to the M input of the select flip-flop 65.

Timing Relationship:—FIG. 20 shows the timing relationships between signals of a processor and a Global Memory Module. The first (1) line or top line of FIG. 20 shows the requestor clock signal. The second (2) line shows the Global Memory Module clock. The third (3) line shows the global request signal which is the signal sent from the requestor to the GMM to indicate that access is being requested. At the end of this line there is seen the start of the next read/restore or Read-Modify-Write cycle.

The fourth (4) line of FIG. 20 shows the action of the Global Request flip-flop. The fifth (5) line is the Global Access Begun signal which is sent to the requestor from the GMM to indicate that the requested operation has begun. On line six (6) there is seen the Global Access Obtained signal which is sent to the requestor to indicate that the read information will be on the Global Information lines. The CW cycle which is bracketed at the right refers to the Clear-Write cycle.

At line seven (7) the GAOR signal pertains to the Global Access Obtained Return signal which is a return signal from the requestor indicating that it has received GAOX and that it has captured the Read Information and the Error Signals presented to it from the GMM. Line eight (8) shows the possibility of significating an error signal. When the signal GAOR goes false, then the Information, Error signals and the GABX signal will be dropped indicating the completion of the cycle.

Lines nine (9) through thirteen (13) show the Read/Restore cycle or the Read-Modify-Write cycle. Here, line nine (9) shows the Global Access Begun signal which is sent to the requestor from the GMM to indicate that the requested operation has begun. The requestor is then expected to turn-off: his request (GREQ), the Write information that has been on the Global Information lines, the Global Address Parity Level (GAPL) and the Write Protect Control Signal (GPRC). GABX will remain true throughout the remainder of the cycle. Line ten (10) shows the Global Access Obtained signal and line eleven (11) shows the Global Access Obtained Return signal which is a return signal from the requestor indicating that it has received GAOX and that it has captured the Read Information and the Error Signals presented to it from the GMM. Line twelve (12) shows the Global Information signal from the Global Memory Control. Line thirteen (13) shows the possibility of developing an error signal should an error be sensed.

FIG. 21 shows a portion of the global system control GSC 30 circuitry which has to do with the selection of GMM cabinets on a left-to-right priority basis.

Each global memory module cabinet will have a set of coding switches 70 which can be set by a field engineer at the time of installation to provide an identifying number to the particular global memory module cabinet. The outputs of the cabinet number switches are fed to the inputs of AND gates 71$_a$, 71$_b$, 71$_c$, 71$_d$ which also have an input from the pass GS control signal (SP 12 = 7) which originates from the sender microcode of FIG. 18.

The send cabinet identification signal SEND CAB ID of FIG. 21 is fed to decoders 72$_a$ and 72$_b$, in the latter case through inverter 70$_a$.

The outputs of decoder 72$_a$ (Z00–Z07) are fed to a series of flip-flops 74$_a$, 74$_b$, 74$_c$, 74$_d$ to form sender cabinet number signals (SNO 1, 2, 4, 8) which feed to a word PROM 75. Likewise, another set of outputs from decoders 72$_a$ and 72$_b$ are fed on the GSC bus B$_{10}$ as inputs to each of 15 AND gates designated 76$_0$–76$_{14}$. The outputs of the word PROM array 75 are also fed as inputs to the 15 AND gates 76$_0$–76$_{14}$. The outputs of the AND gates 76 form a priority inhibit level PRIHZ signal which means that those AND gates which are turned "on" will "deselect" the cabinet (GMM) number involved.

Using the receiver's cabinet number and the sender's cabinet number as inputs to a table within PROM 75, cabinets that have the correct relationship between the sender cabinet and this receiver cabinet are allowed to inhibit this cabinet (receiver) while other cabinets not meeting this required relationship are not allowed to inhibit this cabinet (receiver).

In the priority select resolution circuitry of FIG. 19 there are certain meanings attributed to the "priority select" signals. For example, the priority select signal PSL 4 is a trigger signal which says that we are going to select one processor out of a set of processors on the basis of finding an "idle non-engaged" processor. The priority select for PSL 4 signal basically says—what processor is in the "idle" condition?; and if none of the processors are in the "idle" condition, then find out the processor which is "not engaged".

The signal PSL 6 is the priority select signal which says—try to find out which processor has Write access control and if none can be found which have Write access, then find out who has Read access.

In FIG. 19 the signal lines RAC and WAC are signals which come from the Read and Write access control registers in the processor port adapter PT (FIG. 15) of a particular processor port.

As an example, the command "Test and SET i" is a class 3 command having an operator which enables a processor to acquire "Read" and "Write" access to a particular memory storage unit module number i, provided that no other processor has access to it. If any processor with its lock register set (LR equal to 1) has its WACR bit set corresponding to that particular unique physical module (identified by the GSC by i at its level), the name (PN) of such processor is placed in the Response Buffer of the requesting processor (result word 39:24) and bit 11 is set to 0. When more than one processor unit has its WACR set for the memory storage module "i", the name (PN) of one processor is selected (using the left-to-right priority signal line associated with selecting an idle processor). If no processor has WACR(i) set and some do have RACR(i) set, then one of the latter type of processors is selected. The "selected" unit transmits its "name" (PINR) which is placed in the Response Buffer of the requesting processor and the bit 11 is set to 1.

With this particular OP code command (Test and Set i), a processor is trying to go in and get access to a certain area of memory. The processor that is trying to do this will send a message telling all the Receivers to sample the memory address that the Sender is trying to get at. That is, to look in their (Receiver's) own (ACR) access control registers and find out whether they already have control of it (the desired memory area) or not. Three possible conditions will occur here, that is to say, a particular Receiver processor will (1) have access or (2) won't have access (don't care); or the conditions could be regarded as:

A processor may have:
(i) full access to a memory area; where "i" defines the area;
(ii) it may not have access to that particular area of memory;
(iii) the processor may have only a Read Access to that area of memory.

Thus, after the sending processor has reached out to the receiving processor to find out "what type" of access the receiving processor has to a specific area of memory, then the receiving processor must inform the sending processor whether or not he (sending processor) is going to get access to that area.

The signal MBRY in FIG. 19 which enters inverter 50 is the "Message Buffer Ready" signal which means that there is a message pending in the Message Buffer and thus the ready line is turned on. It says that the processor has a message in its Message Buffer which can be read and acted upon which, of course, means that that particular processor is "engaged".

In FIG. 19, the AND gate 52$_a$ has an output line PRI 1 which is designated as a priority 1 line or highest priority; the AND gate 52$_b$ has an output line PRI 2 which is the second level of priority. Thus, for the signal PSL 4 having priority 1 (PRI 1 output) this signal would say "I am idle", while if the signal level instead were priority 2 (PRI2), then this would mean "I am not engaged but I am also not idle".

It will also be noted that the priority 1 line (PRI 1) goes to the input of AND gate 52$_c$ (PRI goes to/comes from all of the ports in a GMM cabinet). If the priority line 2 (PRI 2) is "on" alone, it means the processor is saying "I am not idle". However, if the priority 1 line (PRI 1) is "on", then we known that some other processor in the cabinet is "idle" which will cause this port to be deselected, thus its priority 2 line (PRI 2) will be "shut off".

The gates 52$_c$, 52$_e$, 52$_f$, 52$_g$, 52$_h$, 52$_i$, etc. provide an output line M which goes to the Select flip-flop 65 of FIG. 24 so as to turn the "Select" flip-flop for a given port when that port is no longer operative.

Thus, in order to select a processor which is in an "idle" or in a "non-engaged" condition, then during the priority select 4 time period (FIG. 22), PSL 4, one of the requestor ports (processor adapter ports) in the cabinet is left "on"--that is to say, when a Sender is looking for an "idle-non-engaged" processor, and it is found that there is a processor in the GMM cabinet that is "idle", then the circuitry will deselect those processors which are "not idle"; this is done by gate 52$_e$ which, for example, will shut off those processors which are "not idle", such as, for example, processors 1, 2 or 3, leaving then one selected processor in the cabinet which is "idle".

In another situation, a GMM cabinet may have, say, four processors, but none of these are "idle". In that case at the end of the PSL 4 time period, each of these processors would still all be "on" (select flip-flop, FIG. 24, on) so there now exists one cabinet that has one or more "idle" processors turned on, and in another GMM there may be, say, four processors that are "non-engaged" but which also are "not idle". Then immediately following the first clock or priority select 4 (see FIG. 22) the circuitry will then set the priority select 5 level PSL 5 which provides for a straight "left-to-right priority" which means starting from the lower numbered port processor and going to a higher numbered port processor to select the first processor which meets the requested conditions.

In FIG. 19 the gates 52$_g$, 52$_h$, 52$_i$ have inputs from each of the four ports 1, 2, 4, 8. Now if a priority select 5 (PSL 5) signal is placed into these AND gates (which means that the request is for a left-to-right priority), then if a processor is connected to port 1, it is going to be the "leftmost" processor so that no other processor can shut it off. If a processor is connected to port 2, it can be shut off by the processor connected to port 1. A processor connected to port 4 can be shut off by processors connected to ports 1 and 2, and similarly a processor connected to port 8 can be shut off by processors connected to ports 1, 2 and 4. So during the priority 5 select time (PSL 5) of FIG. 22, which is up for one clock period, a given processor is going to take and shut off all those processors to the right of it who have the same priority. Thus, at the end of the PSL 5 time period, there will be only one processor in the GMM cabinet selected, that is to say, that one receiving processor, say out of four possible processors in the GMM, is selected as being the processor to receive the message.

In FIG. 19 the ports 1, 2, 4, 8 entering AND gates 52$_g$, 52$_h$, 52$_i$ are ports which are connected to "receiving" processors. The signals "start strobe" and "pass GSC bit" are commands which come in, in order to clear the Select flip-flop of FIG. 24 (flip-flop 65). It should be noted that the Select flip-flop 65 of FIG. 24 is typical of each port and there is a Select flip-flop for each individual port.

For example, if the signal PSL 4 has been set, then this will cause selection of all the "idle" processors in one GMM and the selection of all the "non-engaged"

processors in other GMMs because in those there were no idle processors. Now, for one clock period, the PSL 5 or priority select signal is set to provide for left-to-right priority. This will result in the selection, in the first GMM, of one "idle" receiver processor and in the other GMM there will be the selection of one "non-engaged" receiver processor.

The next problem involved is to resolve the priority as between these two global memory modules (two different cabinets). At this stage, the micro-code control circuitry of FIG. 18 will send out the "resolve priority-signal" which comes from the sender PROM array 34, FIGS. 15, 18. This decoded signal says—all you receiving processors out there who meet the conditions which we have just presented, you go ahead now and resolve priority as between the cabinets of the GMMs. As seen in FIG. 19, the resolve priority signal is entered in as inputs to AND gates $53_b$ and $53_c$. Also the resolve priority signal from the sender micro-code is combined with the output of AND gate $53_c$ to provide a "send cabinet identification" signal CAB ID which signal is entered at E and I in FIG. 21 into the decoders $72_a$ and $72_b$.

Thus, each GMM cabinet, via the micro-code control circuitry of its GSC, is sending out its cabinet identification number CAB ID. Thus, if the ID is being sent out by cabinet 0, it is going to take and drive the 0 line, Z00 of FIG. 21. Likewise, if cabinet 1 sends out its ID, then it will cause the turning on and driving of the line labeled Z01 of FIG. 21. Thus, in FIG. 21 the gates 76, of which there are 15, each one dedicated to a different GMM cabinet, will determine whether or not any particular GMM cabinet is to be selected or deselected.

In FIG. 21 the cabinet number switches 70 and the cabinet ID are combined through decoders $72_a$ and $72_b$ in order to select and drive the appropriate line (one line goes "true") on the GSC bus. Those priority lines which are "not driven" will then shut themselves off.

In FIG. 19 the priority level line connecting from the GSC bus and buffer $56_b$ designated as PRIE forms an output of buffer $56_b$ which provides an input to gate $55_c$ which combines with the output of gate $55_b$ in order to feed as input to AND gate $54_a$ which can provide a cabinet abort signal CABA via buffer $54_c$. This is called the "deselection" cycle, whereby if a gate such as gate $55_b$ goes back into gate $54_a$ and says "if I'm not driving a priority 1 line then abort my cabinet and shut myself off". Note the output line from gate $54_a$ comes down through the Deselect flip-flop $54_e$ over to the deselect buffer $52_f$ which feeds out through the mode control line M over to the select flip-flop 65 of FIG. 24. Deselection Circuitry:—In FIG. 21 the signals CN01, 02, 04, 08 refer to cabinet numbers which are derived from the cabinet number switches 70 on the multi-cabinet adapter of each GMM. These are also preset by a field engineer before operation. The same cabinet switches are used, via AND gate $71_a$–$71_d$, to be combined with the outputs of the decoder $72_a$.

As a result of the cabinet number switch signal and the cabinet ID number which is fed to the decoders $72_a$ and $72_b$, the output signal lines Z00–Z15 will not be energized except for one particular selected line which may get a "true" signal, for example line Z04. These Z output lines are so called "enabling" lines which can help enable one or more of the associated GMM cabinets, that is to say of the 15 cabinets which have the possiblity of being selected as receiving devices.

The presently described system network may comprise up to 15 GMM cabinets as represented by AND gates $76_0$–$76_{14}$ in FIG. 21. Thus, in FIG. 21 the gates $76_0$–$76_{14}$ are being "enabled" in order to look at the 15 incoming lines from the PROM array 75 in the GSC 30. The PROM array 75 is addressed by the cabinet number lines CN01, 02, 04, 08. In addition, the PROM array 75 is also addressed by the "sender" cabinet number, SN01, 2, 4, 8. Thus, using the AND gates $53_b$ and $53_c$ of FIG. 19 for priority selection and by enabling the 15 gates $76_0$–$76_{14}$ to look at the 15 lines coming in, then it is possible to select on a "left-to-right" basis, where 0 is the left and 15 is the rightmost or "high". Any gate that is "lower" than the selected gate will have its gate enabled which can provide the priority inhibit term "PRIHZ" to shut off the higher level or rightmost gates.

In FIG. 21 the flip-flops $74_1$, $74_b$, $74_c$, $74_d$ are doing a resolution of GSC control, that is to say, the resolution of priority control. In order to answer the question—which GMM cabinet is next going to get control of the GSC bus $B_{10}$? In this case it is not desired to pick from left to right because the cabinet 0 will always end up with the control. It is needed to know who the sender is of the GSC bit.

Thus, if Cabinet 3 is the "sender" of the GSC bit, then Cabinet 4 will be the "highest priority" at that time. The flip-flops 74 are used to capture information as to who the "sender" is, that is, who initiated the message. Thus, the PROM array 75 is working essentially at the "local cabinet number" versus the "sender cabinet number" in order to figure out which cabinet is next going to be enabled with the GSC bit.

In FIG. 21, the PRIH Z is the priority inhibit signal which, if true will deselect or cut out this GMM cabinet.

It should be noted that the PRI H (Z) signal from AND gates 76 of FIG. 21 is picked up on FIG. 19 as input to the AND gate $53_f$ which also has a PSL 5 - resolve priority input line. The output of AND gate $53_f$ is fed through another gate $54_b$ to the M input of the Deselect flip-flop $54_e$ which will influence the deselect buffer $52_f$ to cause the select flip-flop 65 (FIG. 24) of the port to be turned off via mode control line M which connects as seen in FIG. 24.

FIG. 23, labeled "Data Paths", shows relationships between the global memory control, GMC 20, the repeater port 25 and the processor port adapter PT with its response buffer 115 and message buffer 110.

The processor $P_A$ connects to a bi-directional cable which can operate to or from the requesting processor unit. This cable forms an input to the C input of the DFR receiver $112_d$. This cable can also be driven from the cable driver $112_c$.

"Write data" from the processor $P_A$ is routed from the DFR receiver $112_d$ to the requestor data select circuitry $113_a$, $113_b$, or to the processor port adapter's Response Buffer 115.

The data from the requestor data select circuitry $113_a$, $113_b$, can route the data to the repeater port 25 if the control line "Data to Repeater" signal is "true" through gate $113_a$. Or likewise the requestor data select circuitry can route the data to the common bus $114_s$ to the memory storage units within this GMM through the buffers $113_b$ and $114_b$.

"Read data" is returned to the processor from the BLD cable driver $112_c$ via the inputs from the gate $112_a$ or buffer $112_b$.

The cable driver $112_c$ receives data from the repeater port 25 if the control signal "Data from Repeater Port"

is "true". This line is an input to AND gate 112$_a$ as is also the RDxx1R line from Repeater Port 25.

Buffer 112$_b$ will receive data from the read register 111 if the control signal "Read to System" is "true" on the input line to gate 111$_d$. The read register flip-flop 111$_c$ can be set: by data from the common bus 114$_s$, from the memory storage units through gate 111$_a$, or from the Message Buffer 110, or from the Response Buffer 115 through the RBOUT interface circuitry 116.

The response buffer 115 has two AND gates 115$_a$, 115$_b$, a buffer 115$_c$ and another AND gate 115$_d$ whose output is combined with the output of buffer 115$_e$. The signals EGxx 1 BO and the signals ECC are fed to AND gates 115$_f$ and 115$_g$ having outputs which feed to the J-K inputs of J-K flip-flop 115$_h$. The output of flip-flop 115$_h$ forms a signal RBxx.pp which is the response buffer signal which feeds to the inputs of AND gates 116$_a$, 116$_b$ and 116$_c$ of the RB interface 116.

The output of AND gate 116$_b$ is fed to the input of buffer 111$_b$. The output of AND gate 116$_c$ forms a signal RBxx.1ZT over to a bus which takes it to other GMMs.

Selection of a "Sending" Processor:—In the discussion of FIG. 21 on left-to-right priority selection, it was seen how certain GMM cabinets were eliminated and a certain one was selected for operations; thus, after the resolution of the Global System bus Control and the selection of one GMM cabinet, the next operation is the use of the Global System Control Bit to pass operational control from each port of the selected GMM to the next port in the order of one, two, four, eight. Now referring to FIG. 11B there is seen a line from the Sender PROM providing the SHFT signal (shift GS bus control to the next port) feeding to a buffer 81$_a$. Likewise, there is a signal SSCB (from the GS bus CONT CD) which means "set the GS bus control flip-flop". This line feeds to buffer 81$_b$. In addition, the SSCB line feeds as input to AND gate 82$_a$ and also (after inversion through inverter 80) over to AND gates 82$_b$, 82$_c$, 82$_d$.

The significance of the GSC Control Bit should be emphasized in that no processor can be a "Sender" unless that processor has in its port the GSC control bit. Once a GMM cabinet is selected, the control bit is sequenced through the four ports in order to give a chance to each processor to become a "Sender" if conditions are correct.

In FIG. 11B four flip-flops 83$_a$, 83$_b$, 83$_c$ and 83$_d$ receive the outputs of the AND gates 82. A set of four such flip-flops as 83$_a$–83$_d$ will exist in each GMM. The Q output of flip-flops 83 each feed to a pair of dual AND gates, such as 84$_a$, 84$_{a'}$; 84$_b$, 84$_{b'}$; 84$_c$, 84$_{c'}$; 84$_d$, 84$_{d'}$.

In FIG. 11B a typical output for each port is seen where the output of AND gate 84$_d$ is fed as input to AND gate 85$_b$ and 85$_a$. The AND gate 85$_a$ also has an input PCON (Sender has processor condition) while AND gate 85$_b$ has another input RBBY (Response Buffer Busy). The output of AND gates 85 provide a sender signal SNDR, which when "true" would indicate that the port 8 is the Sender at that time.

Another output line from AND gate 84$_{d'}$ goes to the state register control, FIG. 18, which indicates that the last requestor port has the GS Bit.

The signal SSCB of FIG. 11B is the "set system control bit" or GSC Control Bit which is basically used to trigger the first flip-flop 83$_a$. Flip-flop 83$_a$ is a J-K D flip-flop used in the D-mode. Thus, the first flip-flop, 83$_a$, is set in a particular GMM cabinet. There are four of these J-K flip-flops, one for each of the ports in the GMM cabinet. When the flip-flop 83$_a$ is "set", then that gives control of the GS bus to port 1 of that particular GMM cabinet. This occurs after the resolution of the GSC control. Then if the port 1 does not want to become a Sender, the GSC control bit is given to port 2, FF 83$_b$. If port 2 does not want it, the GSC control bit goes to port 4 via FF 83$_c$ and then to port 8 via FF 83$_d$. If port 8 does not want to become a "Sender", then the system provides a "resolve GMC control" and passes the GSC control bit to the next GMM cabinet.

The Select Flip-Flop:—The Select Flip-Flop 65 of FIG. 24 is the unit which indicates that a particular processor (connected to that port) in a system has been chosen for receiving a communication. It is only when the select flip-flop of a processor is "set" that that particular processor is capable of receiving a message from another "sending" processor.

Referring to FIG. 24, priority select signals from the receiver PROM array 44 of FIG. 18 and other signals from the comparators and lock registers are brought into a series of gates. The PSL 1 signal and the GSBF (global system control bit flip-flop - meaning it is the "sender") is inverted by the inverter 61 to form another input to AND gate 62$_a$. The output of inverter 61 forms an input, together with PSL 2, over to the AND gate 62$_b$. The output of AND gate 62$_a$ is fed to AND gate 63$_a$ which also has inputs from the comparator bit 0 and the lock register LR. The AND gate 63$_b$ has inputs from the lock register, the comparator bit 1, and the output of AND gate 62$_b$. The AND gate 63$_c$ has an input from the priority select PSL 3 and also from the comparator bit 1. The outputs of the three AND gates 63$_a$, 63$_b$, 63$_c$ are fed to the D input of the select flip-flop 65 and also through buffer 64$_a$ to the AND gate 64$_b$ which feeds to the M input of the select flip-flop 65. The Q output of the select flip-flop 65 is fed to three buffers 66$_a$, 66$_b$ and 66$_c$ to form three signals SLTD$_p$ (selected port) to allow the gating of the PID signals and the PNR signals. The Q output of flip-flop 65 also goes to the state register control of FIG. 18.

Referring again to FIG. 24, although there is seen one Select Flip-Flop 65, there are four of these "Select flip-flops", one for each of the ports of a GMM cabinet.

One of the inputs to the select flip-flops 65 is the mode control line M (which can be seen in FIG. 19 coming from a bank of AND gates 52$_{g, h, i}$ and buffers 52$_{j, k, l}$). The mode control line M when activated or "true" (and the D input "false" to flip-flop 65) causes a particular port to turn off its Select flip-flop, that is, to "reset" it.

On the other hand, when the Select Flip-Flop 65 is "on" or is "set", it is as a result of the output line from AND gates 63$_a$, 63$_b$ and 63$_c$, FIG. 24. These AND gates provide an output as a result of certain condition signals which include:

(i) PSL 1, that is to say, priority select 1, which says "I want to take and select a receiver-processor which is 'not' the Sender (GSBF/), and which has his lock register "on" (LR, Lock Register line) and a receiver who has his comparator bit zero (CMP-0) flip-flop on". If these conditions are met, then the Select Flip-Flop, such as 65 of FIG. 24, of a particular processor port, will be turned "on" which means that that particular processor has now been selected to be a "receiver".

(ii) The priority select 2 line (PSL 2), on the other hand, looks for the conditions where the port is "not the sender" (GSBF/) and the comparator bit 1 (CMP-1) is set (true).

(iii) The priority select 3 line, PSL 3, which also comes from the receiver PROM of the micro-code control circuit of FIG. 18, as does PSL 1 and PSL 2, only looks for the condition where the comparator bit one (CMP-1) line is set or "true", that is, CMP-1 is "true".

The functions of the compartor bit zero (CMP-0) signal and the comparator bit 1 (CMP-1) signal have to do with the situation of comparing only one part of a processor name or ID as against "two parts" of a processor name or ID. Thus, the comparator 1 signal represents the comparison of two pieces of a name or ID, while the comparator zero signal refers to the operation where there is only the comparison of "one part" of a processor name or ID.

Thus, the situation occurs where the priority select signal from the receiver PROM 44 of FIG. 18 is helping to select a particular port as a receiver which will satisfy the conditions that: the particular port is "not a sender" and it has a certain signal condition with regard to comparator bit zero (CMP-0) or comparator 1 (CMP-1). The output lines of FIG. 24 designated $SLTD_p$ refer to signals which say "a port in this cabinet is selected". The output of buffer $66_a$ goes to the enabling gating of the particular port involved.

As noted in FIG. 24, the output of buffer $66_a$ connects to the PIDR (processor identification register) of the GSC 30; the output of buffer $66_b$ connects to the PNR (processor name register) of the port, that is, PNR of FIG. 3; the output of buffer $66_c$ connects to the state register control of FIG. 18.

COMPARATOR INPUTS

Referring to FIG. 13, there is seen a relationship within a Global Memory Module GMM 10 and between certain elements of the Global System Control 30, which is common to all the ports, and those elements of the Global System Control 30 which are individualized to each particular port and which are indicated as port 1, port 2, port 4, and port 8.

As seen in FIG. 13, each port has a processor name register, PNR, designated as $94_1$, $94_2$, $94_4$ and $94_8$. Likewise, each of the separate ports has a B compartor IN $95_1$, $95_2$, $95_4$ and $95_8$. The output of the PNR 94 in each case is fed to the comparator BIN 95 in each port. The outputs of the B comparator IN 95 in each case provides an input to, respectively, the comparators $96_1$, $96_2$, $96_4$ and $96_8$.

The comparators 96 in each port have two sets of outputs. The first set are CLT 1 and CLT 0. These refer to the "compare-less than" signal. The second set are CMP-1 and CMP-0 (compare flip-flops).

In any given GSC 30 of the Global Memory Module there are certain elements which are "common" to all ports. These are the comparator A IN 90; the PID Register 91; the first word address register, FWAR 92; and the comparator B IN 93.

The comparator A IN 90 has the following inputs:
(a) twelve lines, ZA00–ZA11 which equate to 12 data lines from the GS bus;
(b) the message lines from the message buffer (MB04–MB15);
(c) lines from the response buffer (RB18–RB23);
(d) message buffer lines (MB 25, 26, 27);
(e) lines LV00, 01, 02, latch signals from the GS bus indicating level of memory for "Test and Set i" command.

The comparator A IN 90 has output lines CA and CL which are fed to each of the comparators 96 in each of the ports.

The PID Register 91 (Processor Identification) has one set of output lines which go to the comparator B IN 95 in each of the ports, while another output line of the PIDR 91 goes to the comparator B IN 93.

The first word address register, FWAR 92, has output lines which go to the input of the comparator B IN 93. The output of comparator B IN 93 goes to the input of each comparator B IN 95 in each of the four ports of the Global System Control of the GMM.

The comparator A IN 90 uses information that is common to all the ports. Likewise, comparator B IN 93 uses information that is common to all the ports. However, the comparator B IN 95 which is unique to each port would only use information that is particular to that particular port, such as the processor name coming from the processor name register PNR $94_1$, $94_2$, $94_4$, $94_8$, or certain bits of the PIDR.

Each port has a comparator 96 which compares the A and B inputs from comparators 90 and 93 or 95. Thus, the 12 bits from comparator A IN 90 can be compared with 12 bits from comparator B IN 93, or, for example, 6-bits from comparator A IN 90 may be compared with 6-bits from comparator B IN 93 on two separate occasions. Further, any particular bit of comparator B IN can be compared and matched to the same particular bit of comparator A IN.

The "compare-less than" signal, CLT, is used for determining the "level" of a memory and to find out at which level a particular memory module resides.

The CMP-1 and CMP-0 are signals from the compare flip-flops of comparator 96. The comparators 96 of FIG. 13 are not "adders" but instead are actually a PROM look-up table which acts as a comparator. Part of the PROM table is delineated in FIG. 14.

Thus, the comparator circuitry of FIG. 13 serves to identify:
(1) the lines within the hierarchy where a particular memory module may reside;
(2) whether the first part of the Processor Name Register compared with the first part of the name sent by the sending port;
(3) if the first part of the Processor Name Register, PNR, compared "equal" to the first part of the name sent by the sending port, and the bit within the Mask from the last part of the Processor Name Register compared equally with the Mask being sent by the sending port;
(4) if the PID (processor identification) for the receiving port compared equal with the PID sent by the sender port;
(5) if a memory storage unit module location can be seen by, or is common to, this port.

Scan-Out to Response Buffer From Processor—In order to determine which port (and its associated processor) is going to be the "Sender", the circuit of FIG. 12 illustrates how a given Processor Port Adapter (PT) determines "how" a particular port is going to be a Sender. A particular processor, associated with a specific Processor Port Adapter, provides a Scan-Out Word to the requestor input port (as for example $R_A$ of FIG. 1).

The processor performs this Scan-Out which the memory controller section GMC 20 of the GMM looks at. If it is determined that the Scan-Out is "valid", then it provides a signal SORB$_p$ (FIG. 12) designating the Scan-Out response buffer signal for a particular processor. The processor port adapter PT handles the information which comes into it and in addition it does the error checking with respect to the Write information coming from the processor P$_A$ and determines whether this information is correct or not.

Once the Scan-Out Word is in the Response Buffer (FIGS. 3, 15, 17 and 23) and has been checked for correctness, then the signal "response buffer busy" (RBBY$_p$, FIG. 12) will be "set" which will then cause the generation of a signal called SNDR$_p$ indicating to the sender micro-code 34 (FIG. 18) that this port wishes to send. In order for this to happen, the GSB flip-flop for this port (83$_{a,b,c}$ or $_d$) must be set (FIG. 11B) "true" which means the line GSBF$_p$ is true, that is, when this port has control of the GS bus B$_{10}$, then the Sender signal line SNDR$_p$ can become true.

In FIG. 12 AND gate 102 has inputs from SORB$_p$ (Scan Out Reponse Buffer signal) and from the output of flip-flop 105 (via inverter 101). The output of AND gate 102 is fed to buffer 102$_a$ and also to AND gate 102$_b$ which has an output line going to the M input of flip-flop 103.

The flip-flop 103 is a J-K D flip-flop and the input to D comes from AND gate 102. The Q output of the flip-flop 103 has an output line called SOCK$_p$ (Scan-Out Check) which feeds to the input D of flip-flop 105, in addition to feeding the input of buffer 106$_c$ and to inverter 106$_d$. The M input to flip-flop 105 comes from error check circuitry to indicate when the error check operation has completed, thus allowing the set of flip-flop 105.

The output Q from flip-flop 105 provides the response buffer busy signal RBBY$_p$ which goes to the input of AND gate 107 whose output then is fed to the input of AND gate 109, which provides the SNDR$_p$ signal. Other inputs to gate 109 come from the GSBF$_p$ signal and the processor condition signal, PCON$_p$. Another input to AND gate 109 is from the output of inverter 106$_d$.

Buffer 106$_a$ has inputs from the micro-code control circuitry of FIG. 18 (SP4E=2) and the "no maintenance operation" signal (MNT/). Elements numbered 106 comprise the error check circuitry. Inverter 106$_b$ receives a signal from 106$_a$ and from the signal RCOV which is the recover flip-flop of the error correction circuitry. The output of inverter 106$_b$ is fed to buffer 106$_c$ to provide an error check control signal ECCC which is fed to the input of buffer 102$_c$ and 104$_{b2}$.

Thus, FIG. 12 shows the circuit for a particular processor port adapter PT which has received the GSC bit and has its global system bit flip-flop in the "set" condition. When this port has control of the global system control bus B$_{10}$, then the term "SNDR$_p$ is true" for that port. Thus, the signal conditions are now saying that "this port is a Sender"—that it has control of the Global System Control bus B$_{10}$ and also that "there is a message pending or there is a processor condition that exists".

The micro-code output from the (FIG. 18) Sender PROM (SP10=5—the Sender PROM array field 10=5) is fed as an input to AND gate 104 whose output goes to the input of AND gate 104$_a$ which has an output going to the M input of flip-flop 105. Thus, when the port is finished sending, the micro-code will cause the RBBY$_p$ flip-flop to reset.

THE COMPARE ZERO BIT AND THE COMPARE ONE BIT

Referring to FIG. 25, at the left a number of signals, such as F$_1$, F$_2$, F$_3$, F$_4$ are shown which are decoded signals from the receiver PROM array of FIG. 18. These F signals indicate what "type" of a compare that is being done. Then the other signals, such as CL00, CL01, CL02, are compare level flip-flop signals which indicate what "level"is involved, such as level 0, level 1, level 2, etc., in the hierarchy. It should be recalled that the highest level GMM is level zero, the next is level 1, then level 2, then level 3, etc. These signals are shown as inputs to either the AND gates 120$_a$, 120$_b$, 120$_c$ or to buffers 121$_a$, 121$_b$, 121$_c$, 121$_d$, 121$_e$, or to another AND gate 121$_g$.

A series of buffers 122$_a$, 122$_b$, 122$_c$ receive input signals from the comparator PROMS (such as A[11:4]=B[11:4]) plus signals from the ouputs of the above-mentioned gates and buffers such as 120$_a$ and 121$_a$.

The outputs of the buffers 122$_a$, 122$_b$, 122$_c$ are fed to a decoder 123 having outputs Z$_0$–Z$_7$. These output lines are fed to an eight input multiplexor 124 having inputs I$_0$–I$_7$, plus inputs A$_0$, A$_1$, and A$_2$ from the buffers 122$_a$, 122$_b$, 122$_c$. The output of the multiplexor 124 provides an input to the D input of the flip-flop comparator 0, 125$_0$.

Three buffers 126$_a$, 126$_b$, 126$_c$ receive MASK compare signals from the comparator PROMs. The output of the buffers 126 are fed to an AND gate 127$_b$. The Z output of the multiplexor 124 also is fed to the input of the AND gate 127$_a$. AND gates 127 form an output which goes to the D input of the flip-flop comparator 1, 125$_1$. The M input of the flip-flop comparator 1, 125$_1$ comes from the outputs of AND gates 127$_c$, 127$_d$. The outputs of the flip-flop comparators 125$_0$, 125$_1$ form respectively the compare 0 signal CMP-0 and the compare 1 signal CMP-1.

As seen at the bottom left side of FIG. 25, the Sender signal SNDR and F2 decode from the receiver PROM array are fed to AND gate 121$_g$ whose output is then conveyed as input to buffers 129$_a$ and 129$_b$. Other inputs to buffers 129 come from the outputs of buffers 128$_a$, 128$_b$ and 128$_c$, 128$_d$. The inputs to the buffers 128, for example, A[7:2] being less than B[7:2], come from the comparator PROMs. The outputs of buffers 129$_a$ and 129$_b$ form the "compare-less than signals" and are shown as CLT0 and CLT1.

As an example, during one of the commands such as the "Test and Set i Command", it is desired to find out whether another processor has access to the memory storage unit module "i" that the requesting processor wants to use. Thus, it occurs that the Sender processor and port will need to determine at "what level" the desired memory to be accessed resides at.

The processor port adapter PT of a given processor will become a Sender in that it gets the message which says "test and set for this index" (indicating a memory address). This is an 8-bit field designating some area of memory. The Sender takes and compares this index address of memory against the FWAR which resides in that cabinet. Thus, it is possible to do a 6-bit comparison and the operation of "compare-less than". There will then be an indication via flip-flops which will tell where the desired memory is in the hierarchy of levels. For example, if the indicator flip-flops are all zero, then the desired memory to be accessed is at level zero. If flip-flops read 100, it is known then that the requested memory desired to be accessed is at level 1; 110 would mean level 2; and 111 would mean the desired memory is at level 3.

Thus, as a result of the "Test and Set i" command, a receiver-processor will say "I want to take and compare my processor identification PID against the Sender's processor identification PID for whatever level we are on". Referring to FIG. 8B, if the comparison result is 0000, we know that we are trying to reach the level "O" GMM having a PID of 0000.

Looking at the level 2 of the FIG. 8B, if the comparison shows level 1 and the PIDs of 1100 and 1800 for the processors, then the processors could access the level 1 memory of GMM 1000. In other words, the initial leftmost digit position of "1" compares equally for the two GMMs 1100 and 1800. But the GMM 8000 would not be selected. Thus, what is happening is that the system will take the Sender's PID and compare it against the receiver's PID to determine what level of memory is common to both the sender and receiver and thus which area of memory can be accessed for these two processors.

In most operations for the fulfillment of a command, the system circuitry operates to compare two fields;

(i) The processor name and mask with the "name" of the system, or (ii) The first and second parts of the Sender's PID with the first and second parts of the receiver's PID.

In most cases it is necessary to do two comparisons to determine whether a particular processor can be a receiver or not. Thus, the "first" comparison will set the comparator bit 0 and the second comparison will set the comparison bit 1 if the second comparison turns out to that of "equality" and the comparator 0 is already on.

The system may do a comparison on the "name". For example, a comparison will be made of the name N, Q$_1$, Q$_2$, MASK, whereby the N, Q$_1$, Q$_2$ portion of the name (the first 12 bits of the processor name register PNR) will be compared as between two (a Sender and possible Receiver) processors to see whether equality exists. If "equality" exists, then this means that the processor of one system can communicate with the processor of another system. Then the second 12 bits can be compared to see if the particular bit in the mask name (MSK) corresponds to the desired bit. Thus, if the comparator bit zero is already set, then the comparator 1 flip-flop will be set if the mask bits match.

There has been described herein a modular unit designated as a global memory module GMM which acts as a communication-control apparatus for both a plurality of processors and a plurality of memory storage unit modules. The global memory module performs as a coupling device whereby a connected group of local (local in the sense that they connect to a global memory module GMM) processors may communicate to each other and also may share memory areas in the memory storage unit modules connected to the global memory module. The global memory module provides one area designated as a global memory control for the handling of requests to access memory; and it also provides a section designated as the global system control for the handling of commands and communications between processors.

By the addition of a repeater port in a global memory module and the use of interconnecting busses, it is possible to build a hierarchy of global memory modules each of which supports its own system of processors and its own group of memory storage unit modules. Such a hierarchy may be designated as having a "level O" at the topmost global memory module and its associated processors and memory storage units. Then below this would be a global memory module designated as "level 1" in the hierarchy; and below level 1 would be another global memory module and its processors and memory storage units which would be designated as level 2; and so on down the hierarchy.

The forming of a network of such global memory modules is organized to permit the sharing of memory at different levels in the hierarchy by processors at different levels in the hierarchy, thus enhancing the memory availability of the processors. Further, each processor is provided with a processor port adapter in the global system control of each global memory module, which port adapter provides and supports "access control registers". These access control registers provide individual spaces numbered to represent all of the available memory storage unit modules in the hierarchy and can be set to indicate what areas of memory in the hierarchy may be written into, or read from, by the processor connected to the port adapter which maintains the particular access control register.

A further feature of the network is the provision whereby each processor is given the opportunity to become a "Sender" whereby he may transmit commands and communications to another processor or a group of processors in the hierarchy which are designated as Receiver processors. The addressed and connected receiver processors will then be able to perform the execution of certain command operations and send the results back to the original sending processor, or else to perform certain operations on peripheral units which are attached to the receiving processor.

A Sending processor may communicate to a specific Receiver processor by specifying a processor identification number or it may communicate to a specific processor by "processor name". Further, a Sender processor may address an entire group of processors according to a "system name" provided. While processor identification numbers may be used to physically represent in the network, a system of "names" is used whereby software commands can be used to reconfigure the system in any desirable fashion by the assignment of hierarchical names to the processors via software.

When a Receiving processor is addressed according to a generalized system group name, provision is made for the selection of the Receiving processor according to a system of priorities which seeks to choose the first "idle" processor and if there is none such available in the system having that name, then the Receiving processor is chosen on the basis of the first "not engaged" condition of a processor. This is accomplished by the scanning of processors in the group by using a left to right positional basis assigned to the processor ports of a given global memory module.

Thus, the global memory module as an individual item or as a building block in a network can provide for the coupling and communication of a multiple number of processors, for the extension of memory resources and for the sharing of memory areas among different processors, for the configuration of various processor and memory hierarchy groups useful to a user, and for the development of multi-processor networks which can operate in different master-slave situations in a versatile and optimum fashion.

The following claims are made:

What is claimed is:

1. A module for coupling a plurality of local processors having local memory with a plurality of shareable memory storage units and controllers, said module being designated as a global memory module, said module comprising:
   (a) a plurality of discrete memory storage units, each of said units being identified by a number (i) via manually settable identification means in a system controller, and each of said memory storage units includes:
      (a1) a series of addressable memory locations having addresses which increase sequentially in number value;
      (a2) and wherein the addresses in each higher numbered memory storage unit (i+1) has addresses greater in value than any of the addresses in any lower numbered memory storage unit (i);
   (b) a memory controller connected to said memory storage units and to said plurality of local processors, said memory controller including:
      (b1) means to read from, or write into, an addressed location in said memory storage units;
      (b2) means to transfer a memory request from a processor to a repeater bus should the requested memory address exceed the highest address available in said plurality of memory storage units;
      (b3) a repeater bus to convey memory address requests placed thereon to a global module external to said global memory module;
   (c) a plurality of input ports, each of said ports permitting bus connection to a separate local processor and wherein each of said input ports includes:
      (c1) a requester port adapter for storing and communicating memory requests made, on said discrete memory storage units, from said local processor to said memory controller;
      (c2) a processor port adapter for storing and communicating control, informational and synchronization signals from said local processor to a system controller, said processor port adapter including:
         (c2-1) access control register means which map each of said numbered memory storage units with bit signals that permit or deny access to selected memory areas by the connected local processor;
   (d) a system controller connected via said input ports to each of said separate local processors, said system controller including:
      (d1) means to transfer data or commands stored in a processor port adapter to its associated local processor;
      (d2) bus means to convey commands and data to a global memory module external to said global memory module.

2. The global memory module of claim 1 wherein said system controller includes:
   (d3) means to sequentially enable each connected local processor to become a Sender-processor of commands and data destined for a Receiver-processor.

3. The global memory module of claim 2 wherein said system controller further includes:
   (d4) means for providing to each connected local processor any information residing in the processor port adapter dedicated to that local processor, when such request for information is made by said local processor;
   (d5) means to monitor the status of each locally connected processor to determine whether said processor is in an operational condition or in a halted condition;
   (d6) means to direct message signals to a connected local processor as a receiving processor when message signals are received from a sender processor which addresses the receiving processor.

4. The global memory module of claim 1 wherein said input ports are given position numbers designated 1, 2, 4, 8;

and said global memory module includes:
   register means, designated as an Identification Switch Register, settable to provide a unique identification number to said global memory module;

and wherein said system controller includes:
   register means, designated as a Processor Identification Register, which identifies each processor with a number which concatenates the number of the input port connecting the processor with the number of the global memory module.

5. The global memory module of claim 1 wherein said access control register means includes:
   a Write Access Control Register having bit locations which map the shareable memory locations which can be accessed for write-in by the local processor connected to the input port which houses said Write register;
   a Read Access Control Register having bit locations which map the shareable memory location which can be accessed for read-out by the local processor connected to the input port which houses said Read register.

6. A network of replicatable communication-control modules wherein each communication-control module connects a plurality of local processors, each having a local memory resource, to a plurality of shareable memories in the said communication-control module, and wherein a plurality of said replicatable communication-control modules are connected in a hierarchical series of levels such that the topmost module and its shareable memories and its locally connected processors are designated as level "0", and the subordinate levels are designated as levels "1", "2", "3", etc., the network comprising:
   (a) a plurality of communication-control modules, each of said communication-control modules comprising:
      (a1) a plurality of discrete memory storage units, each of said units being identified by a number (i) via settable identification means in a system controller, and each of said memory storage units including:
         (a1-1) a series of addressable memory locations having addresses which increase sequentially in number value;
         (a1-2) and wherein the addresses in each higher numbered memory storage unit (i+1) has addresses greater in value than any of the addresses in any lower-numbered memory storage unit (i);
- (a2) a memory controller connected to said memory storage units and to a plurality of said local processors, said memory controller including:
  - (a2-1) means to read from or write into an address location in said memory storage units;
  - (a2-2) means to transfer a memory request from a processor to a repeater port should the requested memory address exceed the highest address available in said plurality of memory storage units;
  - (a2-3) a repeater port having means to convey memory addresses on a repeater bus;
  - (a2-4) a repeater bus connected to said repeater port to convey memory address requests placed thereon to the input port of a higher level communication-control module;
- (a3) a plurality of input ports, each of said input ports providing for bus connection to a separate local processor and/or connection from a repeater bus of a lower level repeater port and wherein each of said input ports includes:
  - (a3-1) a requester port adapter for storing and communicating memory requests made on said discrete memory storage units from a requesting local processor to said memory controller;
  - (a3-2) a processor port adapter for storing and communicating control, informational and synchronization signals from said local processor to a system controller, said processor port adapter including:
    - (a3-2a) access control register means which map each of said numbered memory storage units with bit signals that permit or deny access to selected memory areas by the associated local processor;
- (a4) a system controller connected via said input ports to each of said local processors, said system controller including:
  - (a4-1) means to transfer data or commands stored in a processor port adapter to its associated local processor;
  - (a4-2) system controller-adapter means connected to an external bus to convey commands and data to or from a higher level communication-control module;
- (b) a repeater bus connected to said repeater port for transmitting memory address and memory data between a lower level and a higher level communication-control module;
- (c) a system control bus connected to said system controller adapter for connecting a lower level system controller with the next higher level system controller;
- (d) a plurality of processors wherein each communication-control module at a given level connects a group of processors to its input ports at that given level.

7. The network of claim 6 wherein said communication-control module includes:
register means, designated as Identification Switch Register, settable to provide a unique identification number to said communication-control module;
and wherein said system controller includes:
register means, designated as Processor Identification Register, and settable to provide a unique identification number to each local processor connected to said communication-control module;
and wherein the identification number of said communication-control module and the identification number of each processor connected to it are set to have matching numbers for the first "L" digits where L equals the level of the communication-control module in the hierarchy.

8. The network of claim 7 wherein said system controller includes:
means to sequentially enable each connected local processor to become a Sender processor of commands and data destined for a Receiver-processor.

9. The network of claim 8 wherein said system controller includes:
means to address said Receiver-processor by its said processor identification number.

10. The network of claim 8 wherein each processor port adapter includes:
processor name register means whereby each processor can be assigned a name by the software;
and said system controller includes:
means to address a Receiver-processor by its assigned name.

11. The network of claim 10 wherein said name assigned to a processor defines its relation to a "system" of processors which defines all processors that can perform the same service functions for a requesting Sender-processor.

12. The network of claim 11 wherein said processor name may be used as a generalized name to address a system of processors.

13. The network of claim 12 wherein said system controller includes:
means to concatenate a mask bit of data to said generalized name to identify and address a selected processor in a system of processors.

14. The communication-control module of claim 9, wherein said system controller includes:
comparator means for comparing the identification number of a Sending-processor with the identification number of a Receiver-processor in order to determine which level of memory storage units can be shared by said Sending and said Receiving processors.

* * * * *